(12) United States Patent
Sasaki

(10) Patent No.: US 6,873,347 B2
(45) Date of Patent: Mar. 29, 2005

(54) RECORDING METHOD AND RECORDING APPARATUS

(75) Inventor: Yoshiharu Sasaki, Fujinomiya (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 86 days.

(21) Appl. No.: 10/600,467

(22) Filed: Jun. 23, 2003

(65) Prior Publication Data
US 2004/0036667 A1 Feb. 26, 2004

(30) Foreign Application Priority Data

Jun. 21, 2002 (JP) ........................................ 2002-181421
Jul. 4, 2002 (JP) ........................................ 2002-196044

(51) Int. Cl.[7] ............................ B41J 2/325; B41J 2/475; B41M 5/26
(52) U.S. Cl. ........................ 347/176; 347/224; 347/217
(58) Field of Search ............................ 347/171–176, 347/224, 225, 232, 264, 215, 217; 503/201

(56) References Cited

U.S. PATENT DOCUMENTS 5,691,961 A * 11/1997 Paranjpe ..................... 347/217
6,758,932 B2 * 7/2004 Yamamoto et al. ......... 156/235

FOREIGN PATENT DOCUMENTS

JP 2003-72123 * 3/2003 ............ B41J/2/325

* cited by examiner

Primary Examiner—Huan Tran
(74) Attorney, Agent, or Firm—Young & Thompson

(57) ABSTRACT

A transfer sheet separated from a support member is held and its recording position is detected, and the separated transfer sheet is returned and superposed on the recording surface of a support member which is then delivered in. Based on the result of the detection of the recording position, the returning position of the transfer sheet is changed or image data to be recorded are changed, thereby carrying out a recording operation over the support member by using an unrecorded section present between the recorded stripes of the transfer sheet. For example, the transfer sheet is returned to almost the same position as that set before the separation and the recording position is shifted at an arrangement pitch of a stripe corresponding to 1 to 1.5 pitches to carry out the recording operation. Thus, the recording operation is performed over the support member by using an unrecorded section.

28 Claims, 52 Drawing Sheets

FIG. 18

RECORDING PROCESS VIEW

1. FIX SUPPORT MEMBER TO STAGE

2. SUPERPOSE IMAGE RECEIVING SHEET ON SUPPORT MEMBER

3. LAMINATE IMAGE RECEIVING SHEET (IN SOME CASES)

4. SEPARATE IMAGE RECEIVING SHEET → FORM IMAGE RECEIVING LAYER ON SUPPORT MEMBER

EXECUTION IF NECESSARY

5. MOUNT K TRANSFER SHEET

6. LAMINATE K (IN SOME CASES)

7. CARRY OUT LASER RECORDING BASED ON K DATA

8. SEPARATE K → TRANSFER PART OF IMAGE FORMING LAYER FOR K ONTO IMAGE RECEIVING LAYER

9. HERMETICALLY BOND R (RED) TRANSFER SHEET

10. LAMINATE R (IN SOME CASES)

11. CARRY OUT LASER RECORDING BASED ON R DATA

12. SEPARATE R

13. HERMETICALLY BOND G TRANSFER SHEET

14. LAMINATE G (IN SOME CASES)

15. CARRY OUT LASER RECORDING BASED ON G DATA

16. SEPARATE G

17. HERMETICALLY BOND B TRANSFER SHEET

18. LAMINATE B (IN SOME CASES)

19. CARRY OUT LASER RECORDING BASED ON B DATA

20. SEPARATE B

FIG. 19
(a) 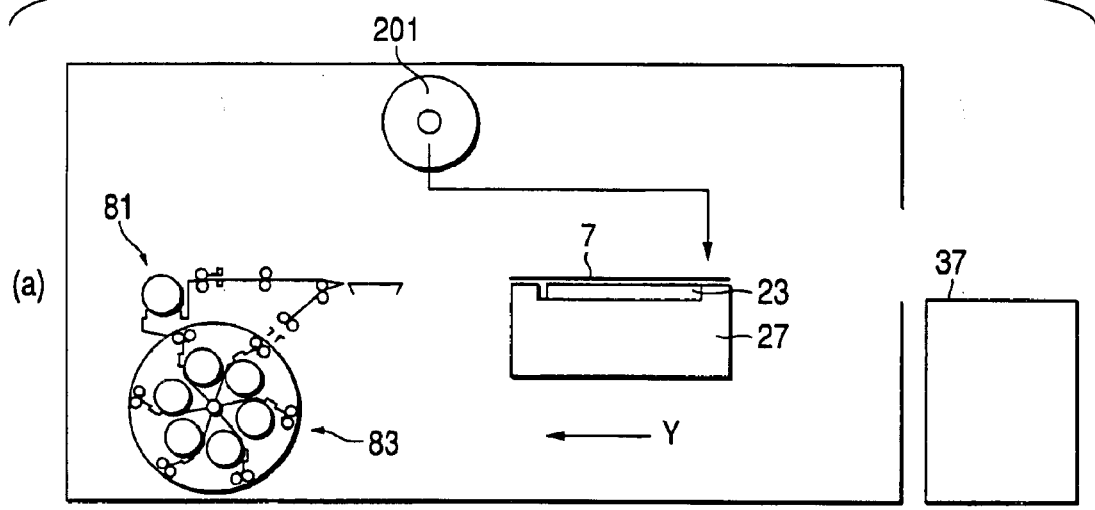
(b) 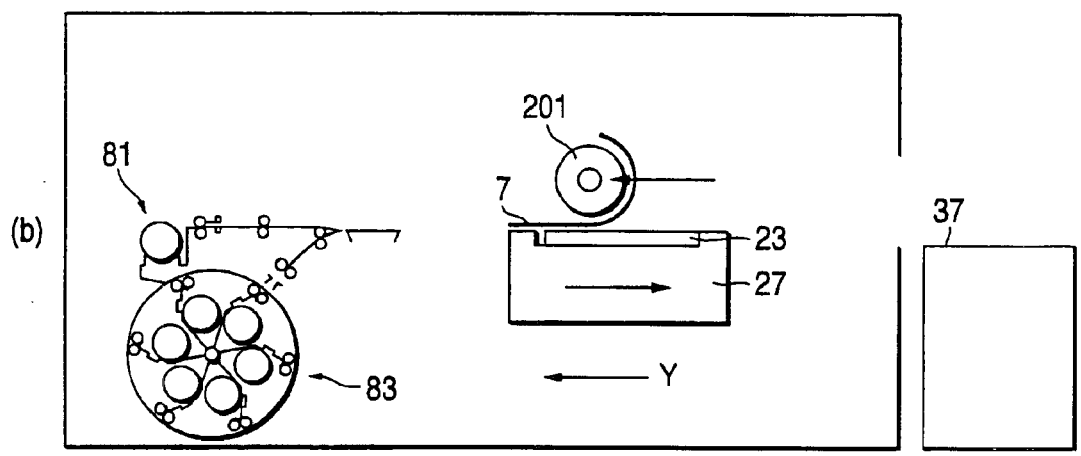
(c) 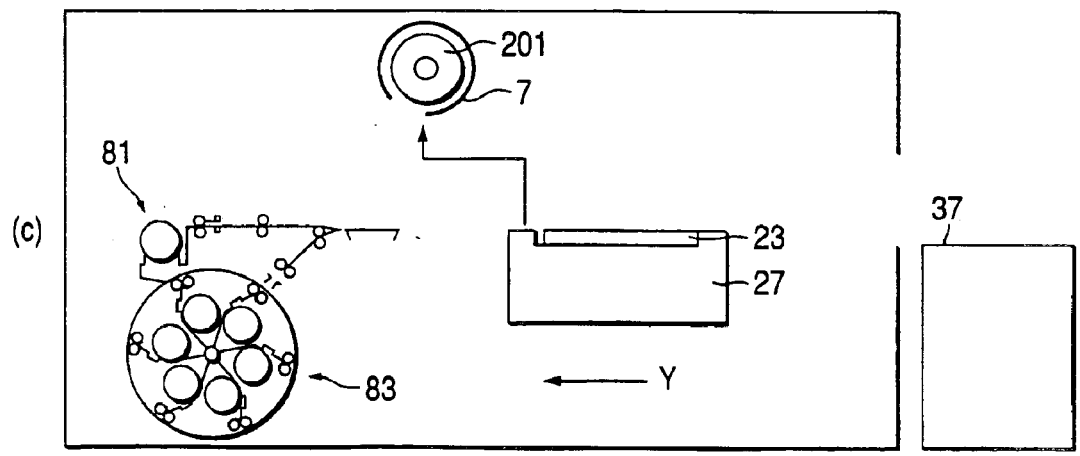

FIG. 43

RECORDING METHOD AND RECORDING APPARATUS

BACKGROUND OF THE INVENTION

1. Field of the Invention

The present invention relates to a recording method and apparatus for recording a pattern image including a stripe shape on the surface of a recording object.

2. Description of the Related Art

A display device such as a liquid crystal display comprises a color filter including a pattern in the form of a black stripe (a black matrix) to improve a contrast ratio and red, green and blue stripes provided alternately between the black stripes, which is attached to a display surface.

FIG. 57 is a plan view showing an example of the color filter, (a) being a general view showing the color filter and (b) being a partially enlarged view thereof. The color filter is provided with a pattern of the black stripe (K) and stripe-shaped patterns which are alternately formed in order of red (R), green (G) and blue (B) between the black stripes (K). Table 1 shows a screen size, the number of pixels (constituting one pixel by a set of R, G and B), each pixel size and a stripe width for each name (inch) in a display to meet SXGA standards, and Table 2 shows the relationship between each black stripe width (BM width) and a numerical aperture (a brightness index) for each name (inch).

TABLE 1

| Display Size (mm) | | Pixel Numbers | | Pixel Size(mm) | | Strip Width |
|---|---|---|---|---|---|---|
| Width | Height | Width | Height | Width | Height | (mm) |
| 28 Inch | 620 | 350 | 1240 | 1000 | 0.5 | 0.35 | 0.167 |
| 32 Inch | 709 | 400 | 1240 | 1000 | 0.571 | 0.4 | 0.19 |
| 36 Inch | 797 | 450 | 1240 | 1000 | 0.643 | 0.45 | 0.214 |
| 42 Inch | 930 | 525 | 1240 | 1000 | 0.75 | 0.525 | 0.25 |

TABLE 2

| | Numerical Aperture to BM Width (mm) | | | |
|---|---|---|---|---|
| | 0.01 | 0.02 | 0.03 | 0.04 |
| 28 Inch | 94.0% | 88.0% | 82.0% | 76.0% |
| 32 Inch | 94.8% | 89.5% | 84.3% | 79.0% |
| 36 Inch | 95.3% | 90.7% | 86.0% | 81.3% |
| 42 Inch | 96.0% | 92.0% | 88.0% | 84.0% |

In the case in which such a color filter is to be fabricated, it is possible to utilize a recording method by the following laser exposure in order to fabricate the pattern of the color filter, for example. More specifically, in the method, a transfer sheet having an image forming layer which can be separated is superposed on the recording surface of a support member, a pattern including the shape of a stripe is recorded from above the transfer sheet by laser exposure in that state, and the transfer sheet is separated from the recording surface of the support member after the recording operation, thereby transferring and forming the image forming layer on the recording surface of the support member in the form of the pattern.

In the case in which a pattern arranging the red (R), the green (G) and the blue (B) like a stripe in order is to be obtained by using the recording method as shown in FIG. 58, for example, the recording operation is caused to progress in such a procedure that a stripe-shaped pattern of the red (R) is first recorded by using the transfer sheet of the red (R), and a stripe-shaped pattern of the green (G) is then recorded by using the transfer sheet of the green (G) and a stripe-shaped pattern of the blue (B) is finally recorded by using the transfer sheet of the blue (B).

In that case, conventionally, the transfer sheet used for the recording operation once for one color is exactly discarded. As shown in FIG. 59, however, a region (a recorded section) 2 used for the recording operation is decolorized and other portions remain as a region (unrecorded section) 3 which can still be used in the transfer sheet 7 used once. Therefore, the fact that the transfer sheet 7 is exactly discarded is not desirable in respect of the effective utilization of resources and a reduction in a manufacturing cost and causes much wastefulness.

SUMMARY OF THE INVENTION

In consideration of the circumstances, it is an object of the invention to provide a recording method and apparatus for using a transfer sheet for plural recording operations to effectively utilize resources and to reduce a manufacturing cost by a decrease in the amount of a material to be used.

A first aspect of the invention is directed to a recording method for superposing a transfer sheet having a separable image forming layer on a recording surface of a support member to record a pattern including a stripe shape and separating the transfer sheet from the recording surface of the support member after the recording operation, thereby transferring and forming the image forming layer on the recording surface of the support member like the pattern, wherein the transfer sheet separated from the support member is held and the support member obtained after the recording operation is delivered out, while when a recording position of the held transfer sheet is to be detected and the transfer sheet obtained after the separation is to be returned onto the recording surface of the support member which is then delivered in, a returning position of the transfer sheet is changed and superposed based on a result of the detection of the recording position or is superposed on almost the same position as that set before the separation to change image data to be recorded based on the result of the detection of the recording position, and the recording operation is thereafter carried out over the support member by using an unrecorded section present between recorded stripes of the transfer sheet.

In the recording method, when one transfer sheet is used to carry out a first recording operation and to then carry out second and succeeding recording operations, the recording operation is performed over the support member by using the unrecorded section present between the recorded stripes of the transfer sheet. Accordingly, the transfer sheet is thus used for the recording operation twice or more so that the transfer sheet can be utilized effectively and the number of the transfer sheets to be used can be decreased. Consequently, a manufacturing cost can be reduced. In the case in which the transfer sheet is used for the recording operation twice or more, moreover, a next recording operation is to be carried out so as not to overlap with a last recording position. Thus, it is necessary to accurately grasp the last recording position to provide for the next recording operation. In this respect, in the recording method according to the invention, the last recording position for the transfer sheet is detected in a state in which the transfer sheet separated from the support member is held, and the returning position of the transfer sheet for the next support member is changed or the image data to be recorded are changed based on the result of the detection of the recording position. Even if the position of the transfer sheet is slightly shifted at time of the separation from the last support member, therefore, the next recording operation can be carried out in a proper position. Accordingly, the recording operation can be carried out with high precision by using the unrecorded section of the transfer sheet, and a reliability can be enhanced when one transfer sheet is to be used for the recording operation plural times.

A second aspect of the invention is directed to the recording method, wherein a recording start position and an inclination angle of the transfer sheet are corrected to return the transfer sheet obtained after the separation onto the support member based on the result of the detection of the recording position, and the recording position is shifted at an arrangement pitch of the stripe shape corresponding to 1 to 1.5 pitches in at least one of a longitudinal direction of the stripe shape and a direction orthogonal to the longitudinal direction.

In the recording method, the transfer sheet is returned to almost the same position as that set before the separation over the support member and the recording position is shifted from the support member. Consequently, the recording operation is carried out over the support member by using the unrecorded section present between the recorded stripes of the transfer sheet. Thus, the transfer sheet can be used for the recording operation twice or more. In addition, when the separated transfer sheet is to be returned onto the next support member, the recording start position and the inclination angle of the transfer sheet are corrected based on the result of the detection of the recording position and the transfer sheet is thus returned onto the support member. Even if the position of the transfer sheet is slightly shifted at time of the separation from the last support member, therefore, the next recording operation can be carried out in a proper position and the recording operation using the unrecorded section of the transfer sheet can be performed with high precision.

For example, when the patterns of red (R), green (G) and blue (B) are to be recorded in order, the transfer sheet is shifted at one pitch for each recording operation so that one transfer sheet can be used for three recording operations in total. Moreover, the recording position is shifted at 1.5 pitches so that one transfer sheet can be used for two recording operations. In this case, the pattern recording operation for one stripe is carried out in an unused region having a larger area than an area for two stripes. Even if the permissible region of the returning position has a margin and precision in a position to which the transfer sheet is to be returned is slightly poor, consequently, the recording operation can be carried out without strain.

A third aspect of the invention is directed to the recording method, wherein the held transfer sheet is shifted at an arrangement pitch of the stripe shape corresponding to 1 to 1.5 pitches in at least one of a longitudinal direction of the stripe shape and a direction orthogonal to the longitudinal direction, and a recording start position and an inclination angle of the transfer sheet are corrected to return the transfer sheet onto the recording surface of the support member based on the result of the detection of the recording position and the recording operation is carried out in almost the same position as that set before the separation of the transfer sheet.

In the recording method, the position of the transfer sheet is shifted from the support member and is thus returned, and the recording position is set to be almost the same as that set before the separation. By using the unrecorded section present between the recorded stripes of the transfer sheet, thus, the recording operation is carried out over the support member. By shifting and returning the transfer sheet side, accordingly, one transfer sheet can be used for the recording operation twice or more.

A fourth aspect of the invention is directed to the recording method, wherein the held transfer sheet is returned to almost the same position as that set before the separation over the recording surface of the support member, and the recording position is shifted at an arrangement pitch of the stripe shape corresponding to 1 to 1.5 pitches in at least one of a longitudinal direction of the stripe shape and a direction orthogonal to the longitudinal direction, and a recording start position and an inclination angle of the image data to be recorded on the transfer sheet are corrected to carry out the recording operation based on the result of the detection of the recording position.

In the recording method, the transfer sheet is returned to almost the same position as that set before the separation with respect to the support member and the recording position is shifted from the support member. Consequently, the recording operation is carried out over the support member by using the unrecorded section present between the recorded stripes of the transfer sheet. Moreover, the correction is carried out in a recording stage. Accordingly, the recording operation can be carried out over the transfer sheet in an accurate position and one transfer sheet can be used for the recording operation twice or more.

A fifth aspect of the invention is directed to the recording method, wherein the held transfer sheet is shifted at an arrangement pitch of the stripe shape corresponding to 1 to 1.5 pitches in at least one of a longitudinal direction of the stripe shape and a direction orthogonal to the longitudinal direction and is thus returned onto the recording surface of the support member, and a recording start position and an inclination angle of the image data to be recorded on the transfer sheet are corrected to carry out the recording operation based on the result of the detection of the recording position.

In the recording method, the position of the transfer sheet is shifted from the support member and is thus returned, and the recording position is once set to be almost the same as that set before the separation, the correction is carried out and the recording operation is carried out over the support member by using the unrecorded section present between the recorded stripes of the transfer sheet. Accordingly, an accurate alignment can be carried out and one transfer sheet can be used for the recording operation twice or more by shifting and returning the transfer sheet.

A sixth aspect of the invention is directed to the recording method, wherein when the unrecorded section of the transfer sheet obtained after the recording operation is narrower than a region of the stripe shape to be recorded, the transfer sheet is discharged.

In the recording method, the recording operation is repetitively carried out until the unrecorded section of the transfer sheet is narrower than the region of the stripe shape to be recorded. Consequently, the transfer sheet can be used up without strain.

A seventh aspect of the invention is directed to a recording apparatus for superposing a transfer sheet having a separable image forming layer on a recording surface of a support member to record a pattern including a stripe shape, separating the transfer sheet from the recording surface of the support member after the recording operation, thereby transferring and forming the image forming layer on the recording surface of the support member like the pattern, the apparatus comprising support member holding means for movably supporting the recording surface of the support member, transfer sheet supply means for supplying the transfer sheet onto the support member provided on the support member support means, a recording head for recording a desirable pattern onto the transfer sheet in cooperation with the support member holding means, separating and holding means for separating the transfer sheet supplied to the support member holding means and recorded by the recording head from the support member and holding the transfer sheet, while supplying the held transfer sheet onto the recording surface of the support member which is then delivered in, and a holding state detecting section for detecting a recording start position and a recording inclination angle of the transfer sheet held by the separating and holding means, wherein a position is corrected depending on a result of the detection obtained by the holding state detecting section and an unrecorded section present between recorded stripes of the transfer sheet is used to repetitively carry out the recording operation over the support member.

In the recording apparatus, the support member holding means, the transfer sheet supply means, the recording head and the separating and holding means are sequentially operated to repetitively carry out the recording operation over the support member by using the unrecorded section present between the recorded stripes of the transfer sheet. Consequently, the transfer sheet can be used for the recording operation plural times. Accordingly, the transfer sheet can be utilized effectively and the number of the transfer sheets to be used can be decreased. Consequently, a manufacturing cost can be reduced. In addition, there is provided the holding state detecting section for detecting the recording start position and the recording inclination angle of the transfer sheet held by the separating and holding means. By changing the returning position of the transfer sheet to the next support member or changing the image data to be recorded based on the result of the detection, therefore, it is possible to correct the recording start position and the inclination angle of the transfer sheet. Even if the position of the transfer sheet is slightly shifted in a stage in which the transfer sheet is held by the separating and holding means, accordingly, the next recording operation can be carried out in a proper position and the recording operation using the unrecorded section of the transfer sheet can be carried out with high precision. In other words, a reliability can be enhanced when one transfer sheet is to be used for the recording operation plural times.

An eighth aspect of the invention is directed to the recording apparatus, wherein the holding state detecting section includes an image pick-up camera for picking up an image of the transfer sheet held by the separating and holding means.

In the recording apparatus, the image picked up by the image pick-up camera is processed. Consequently, it is possible to accurately detect the recording position of the transfer sheet held by the separating and holding means.

A ninth aspect of the invention is directed to the recording apparatus, wherein the separating and holding means is a separating roller for holding the transfer sheet on a peripheral surface of a cylinder.

In the recording apparatus, the separating and holding means is formed by the separating roller for holding the transfer sheet on the peripheral surface of the cylinder. Consequently, the separating roller is moved relatively with the support member with a rotation so that the transfer sheet can be wound upon the outer peripheral surface of the separating roller and can be thus separated from the support member, and the transfer sheet thus separated can be held as it is. Accordingly, it is possible to separate and hold the transfer sheet by a simple mechanism.

A tenth aspect of the invention is directed to the recording apparatus, wherein the separating roller includes a rotating direction position detecting section for detecting a position in a rotating direction of the separating roller.

In the recording apparatus, the separating roller includes the rotating direction position detecting section. When the held transfer sheet is to be returned onto the recording surface of the support member, the rotating position of the separating roller is detected with high precision so that the returning position of the transfer sheet to the recording surface of the support member can be adjusted accurately.

An eleventh aspect of the invention is directed to the recording apparatus, wherein the separating roller connects a driving source for controlling a rotating angle.

In the recording apparatus, the separating roller is connected to the driving source capable of controlling a rotating angle. When the held transfer sheet is to be returned onto the recording surface of the support member, therefore, the rotating position of the separating roller can be controlled with high precision. Consequently, the returning position of the transfer sheet to the recording surface of the support member can be changed optionally. Accordingly, the transfer sheet can be returned to the next support member with a shift in a circumferential direction over the separating roller.

A twelfth aspect of the invention is directed to the recording apparatus, wherein the separating roller includes an axial direction position detecting section for detecting a position in an axial direction of the separating roller.

In the recording apparatus, the separating roller includes the axial direction position detecting section. When the held transfer sheet is to be returned onto the recording surface of the support member, therefore, the position in the axial direction of the separating roller is detected with high precision so that the returning position of the transfer sheet to the recording surface of the support member can be adjusted accurately.

A thirteenth aspect of the invention is directed to the recording apparatus, further comprising an axial direction slide mechanism for moving the separating roller in the axial direction of the separating roller.

In the recording apparatus, there is provided the axial direction slide mechanism for sliding the separating roller in the axial direction. Therefore, the position of the transfer sheet held on the outer peripheral surface of the separating roller can be moved in the axial direction in the holding state. When the transfer sheet is to be returned from the separating roller onto the recording surface of the support member, accordingly, it is possible to optionally change the returning position of the transfer sheet to the recording surface of the support member by controlling the position in the axial direction of the separating roller.

A fourteenth aspect of the invention is directed to the recording apparatus, wherein the axial direction slide mechanism has stop positions in two places which are provided apart from each other at a predetermined interval in at least the axial direction.

In the recording apparatus, the stop position in the sliding operation of the separating roller in the axial direction is predetermined. By predetermining the stop position corresponding to the arrangement pitch of the stripe, therefore, it is possible to easily shift and return the position of the transfer sheet onto the recording surface of the support member on the basis of the arrangement pitch of the stripe.

BRIEF DESCRIPTION OF THE DRAWINGS

FIG. 18 is an explanatory view showing the basic procedure of a recording step, FIG. 19 is an explanatory view showing the separating operation of the transfer sheet which is to be carried out when the transfer sheet is used for a recording operation plural times, FIG. 43 is a view showing a second example of the pattern including the stripe shape.

DESCRIPTION OF THE PREFERRED EMBODIMENTS

A preferred embodiment of a recording method and apparatus according to the invention will be described below in detail with reference to the drawings.

First Embodiment

A recording apparatus according to the embodiment is of an XY stage type which serves to supply a support member to be a recording object onto an XY stage and to superpose and hermetically bond a transfer sheet having a separable image forming layer onto the recording surface of the support member, to record a pattern image including a stripe shape on the transfer sheet by a laser beam and to separate the transfer sheet from the support member after the recording operation, thereby transferring and forming a pattern image on the recording surface of the support member, and can carry out the recording operation over a support member having a small flexure and deformation which cannot be wound upon a drum.

The support member to be the recording object is assumed to be formed of a glass substrate, a stone, metal or ceramic which cannot be bent. In the case in which the glass substrate is used as the support member, a black matrix for a liquid crystal or a color filter for a liquid crystal can be formed by the recording apparatus. For example, it is possible to form the color filter of a color liquid crystal display on a support member such as a glass substrate by forming a stripe-shaped pattern having red, green and blue stripes provided repetitively with the use of transfer sheets having three different colors, that is, red, green and blue transfer sheets. In this case, it is possible to cause a tone for each color to be uniform by using a transfer sheet which is special for each color. Consequently, a color filter having high precision can be obtained. By using stereo typed measures, for example, sticking a soft material as well as the hard material to a fixed plate, moreover, the recording operation can be carried out in the same manner as in the recording apparatus.

Furthermore, the recording apparatus serves to supply, to a recording section, an image receiving sheet having an image receiving layer for receiving an image forming layer before feeding a transfer sheet to the recording section, to superpose the image receiving layer on the recording surface of a support member and to hermetically bond the image receiving layer of the image receiving sheet to the support member and to then separate the image receiving sheet from the support member, thereby transferring the image receiving layer to the support member to form a recording layer. Thus, image recording using this method can also be applied to the support member having no image receiving layer.

First of all, description will be given to the basic structure and operation of the recording apparatus.

Figure 1:
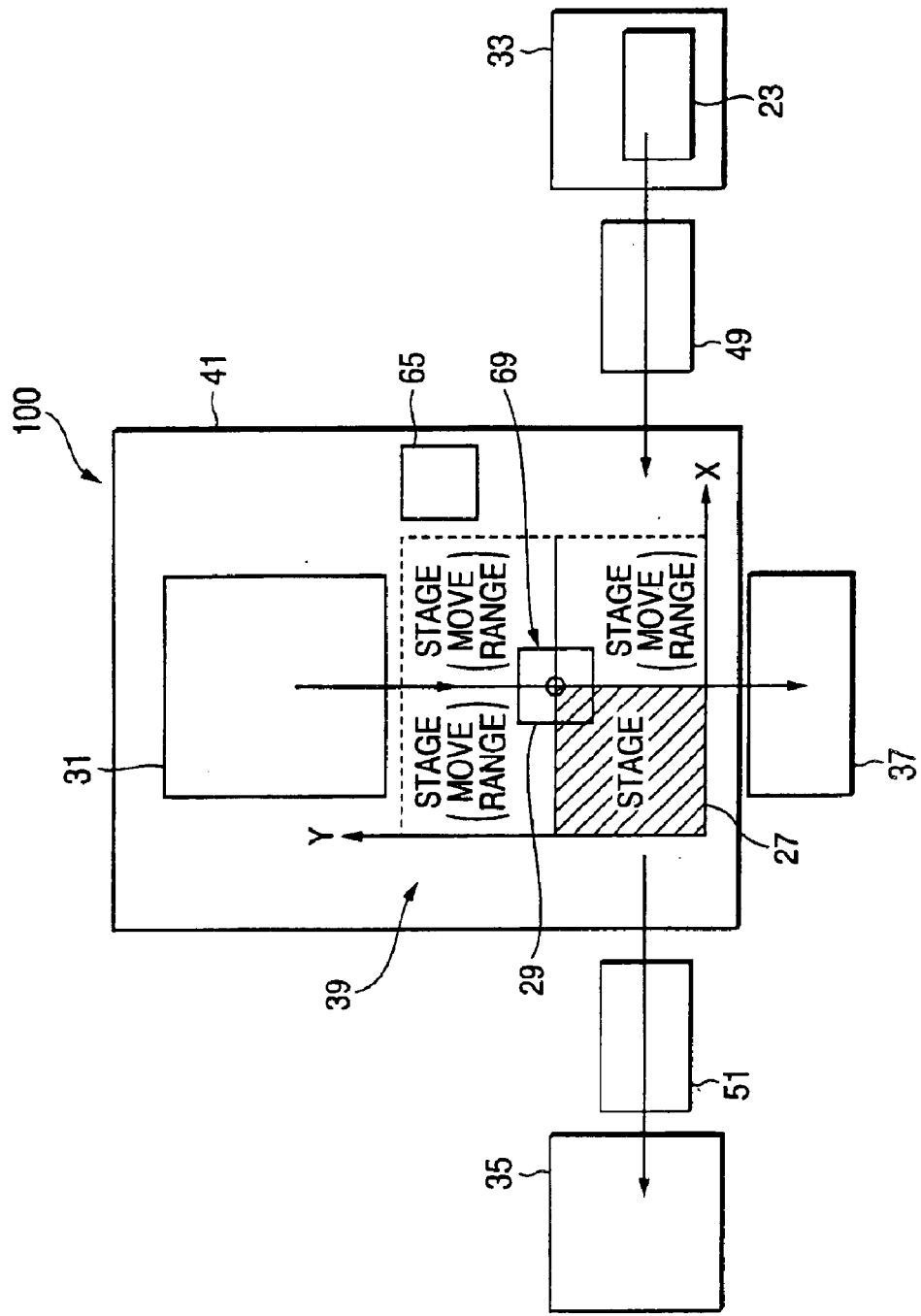
FIG. 1 is a block diagram illustrating the conceptual structure of a recording apparatus according to the invention.
Figure 2:
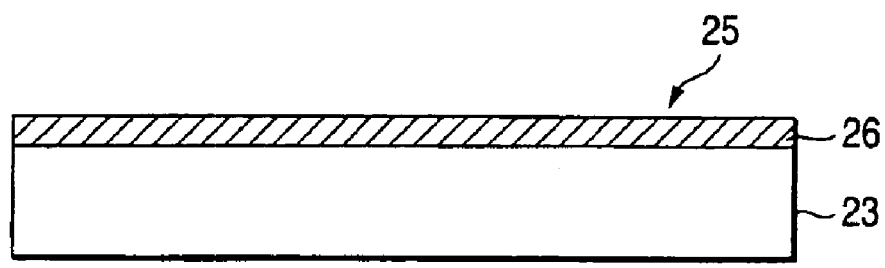
FIG. 2 is a sectional view showing a support member.
Figure 3:
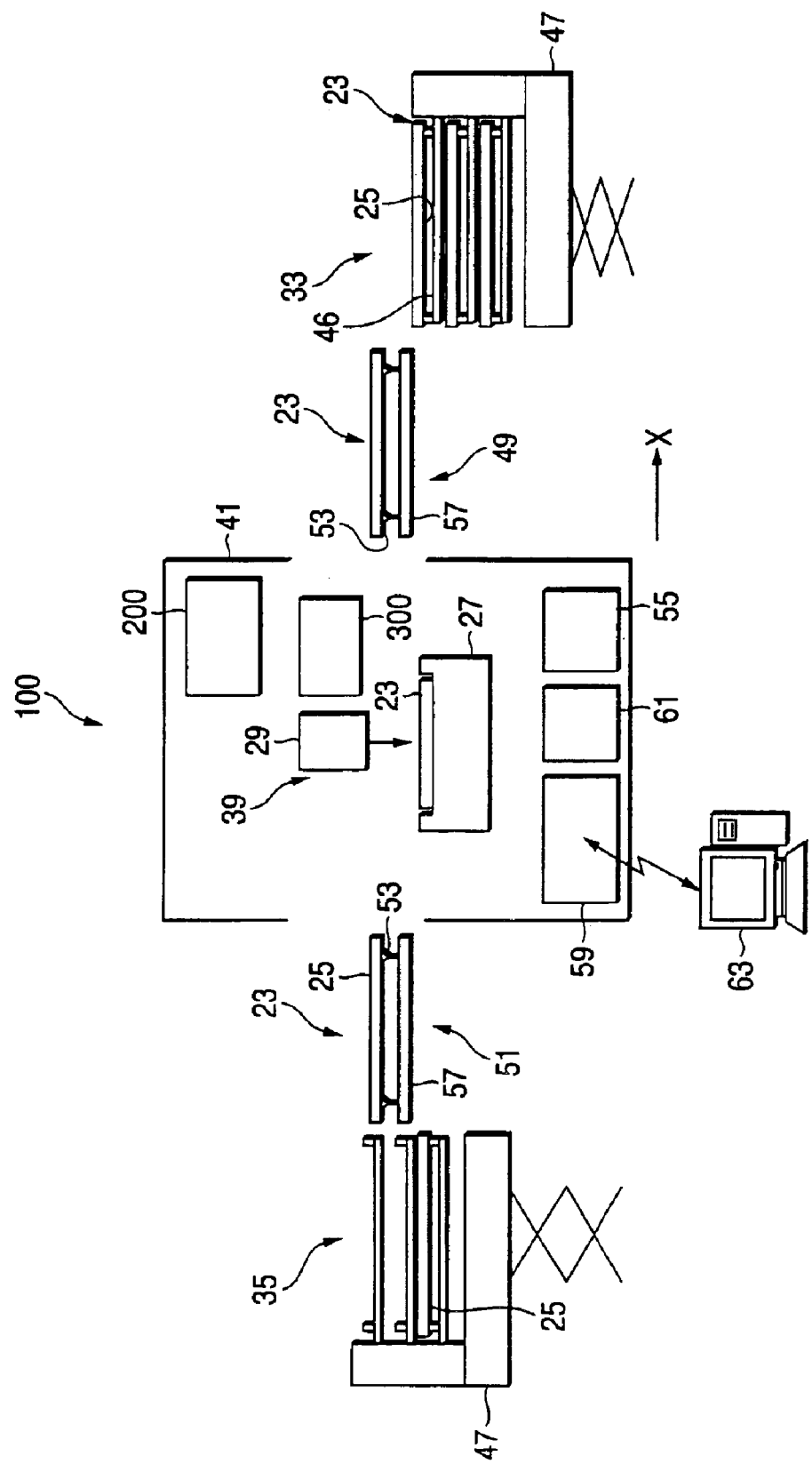
FIG. 3 is a side view showing the structure of the recording apparatus illustrated in FIG. 1.

FIG. 1 is a block diagram illustrating the conceptual structure of the recording apparatus according to the invention, FIG. 2 is a sectional view showing a support member and FIG. 3 is a side view showing the structure of the recording apparatus illustrated in FIG. 1.

A recording apparatus 100 according to the embodiment comprises, as a main structure thereof, a stage (support member holding means) 27 which holds a support member 23 to be a recording object and is movable along a parallel surface with a recording surface 25 of the support member 23, a recording head 29 for being moved from a standby position 65 to a recording origin position 69 to record an image in a plurality of spots formed by a laser beam, a recording medium supply section 31 for supplying a recording medium (an image receiving sheet or a transfer sheet) on the support member 23 held in the stage 27, a pressurizing roller for pressing the recording medium and hermetically bonding the recording medium to the recording surface 25 of the support member 23 which will be described below in detail, first separating means (not shown) for separating the recording medium from the support member 23, and second separating means (separating and holding means) 200 for separating a transfer sheet subjected to the recording operation from the support member 23 when using the transfer sheet in the recording medium for plural recording operations and holding the same transfer sheet, and then supplying the held transfer sheet onto the recording surface of the support member 23 which is then delivered onto the stage 27. The recording apparatus according to the invention is characterized in that the second separating means 200 is provided. The second separating means 200 will be described below in detail.

In addition to the main structure, the recording apparatus 100 is additionally provided with a support member supply section 33 for stacking and mounting the support member 23, a delivery-in mechanism 49 for delivering the support member 23 from the support member supply section 33 to the stage 27 which will be descried below in detail, a discharging mechanism 51 for discharging the support member 23 having an image transferred thereto from the stage 27 which will be described below, and a support member receiving section 35 for stacking and mounting the support member 23 discharged by the discharging mechanism 51. Moreover, 37 in FIG. 1 denotes a discarding box for discarding a used recording medium.

It is desirable that the recording apparatus 100 should cover the outer peripheries of a recording section 39 having the stage 27 and the recording head 29 and the recording medium supply section 31 with a shielding frame 41 in respect of the safety of a laser leakage prevention. The shielding frame 41 is provided with a passage opening section which can be opened and closed to deliver in and discharge the support member 23 and a passage opening section for discharging a used recording medium.

In the case in which the recording apparatus 100 is used in order to form a black stripe for a liquid crystal or a color filter for a liquid crystal, at least the body of the recording apparatus 100, the support member supply section 33 and the support member receiving section 35 are provided in a clean room.

As shown in FIG. 2, the support member 23 having a functional layer (that is, an image receiving layer 26 for receiving a toner layer (an image forming layer)) formed previously on the recording surface 25 may be used. The functional layer can also be obtained by a silane coupling processing, for example. Consequently, the transferring property of a toner layer can be enhanced and a recording process can be simplified. Moreover, the support member 23 does not have the functional layer but may transfer and form the image receiving layer 26 in the recording apparatus 100. Moreover, some sheets can directly carry out a transfer onto the support member. In this case, the recording operation can be carried out without providing the functional layer. In the embodiment, description will be given by taking, as an example, the case in which an image receiving layer 87c is transferred and formed on the support member 23 having no image receiving layer 26 by using the recording apparatus 100.

Next, the recording apparatus 100 according to the embodiment will be sequentially described below in detail.

Figure 4:
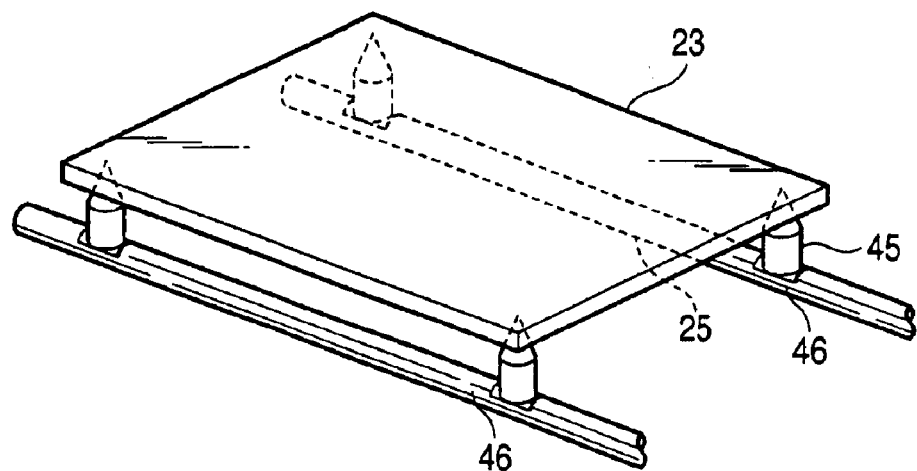
FIG. 4 is a perspective view illustrating the loading state of the support member in a support member supply section.

FIG. 4 is a perspective view illustrating the mounting state of a support member in a support member supply section.

The support member supply section 33 is constituted to stack and mount a plurality of support members 23 at a predetermined interval. Usually, the support member 23 is mounted with the recording surface 25 provided on the underside in order not to lay dust thereover. Moreover, it is desirable that the support member 23 should be supported in point contact in order to stick a foreign substance to the recording surface 25 as less as possible. For the support in point contact, a pin 45 having a sharp tip shown in FIG. 4 or a pin having a spherical tip is used, for example. In the case in which the support member 23 is a square, at least four pins 45 are provided in such a manner that four corners can be supported. Moreover, four pins or more may be provided depending on the size or bending stiffness of the support member 23 if necessary.

Two of the four pins 45 supporting one support member 23 are protruded upward from each of two support bars 46, respectively. Each of the support bars 46 is provided in multiple steps on a pedestal 47 of the support member supply section 33 as shown in FIG. 3. It is preferable that the pedestal 47 should have an up-down moving mechanism in such a manner that the support member 23 of an uppermost layer has a desirable height. In this case, it is possible to employ, for a method of controlling the height of the up-down moving mechanism, a method of detecting the weight of the support member 23 to manage the height to be constant corresponding to the number of decreases of the support member 23, a method of detecting the position of the support member 23 of the uppermost layer to manage the height to be constant or a method of storing the thickness of the support member 23 to manage the height while decreasing the number of sheets to be used.

The recording apparatus 100 has the delivery-in mechanism 49 between the support member supply section 33 and the stage 27. Moreover, the recording apparatus 100 has the discharging mechanism 51 between the stage 27 and the support member receiving section 35. The delivery-in mechanism 49 and the discharging mechanism 51 have a sucker 53 of a vacuum sucking type which serves to hold the support member 23. At least three, preferably four suckers 53 are provided. An air piping which is not shown is connected to each of the suckers 53 and a sucking source 55 such as a vacuum pump or a blower is connected to the end of the air piping. The number of the suckers may be increased depending on the size of the support member 23 if necessary.

The delivery-in mechanism 49 and the discharging mechanism 51 have the suckers 53 attached to the pedestals 57. The pedestal 57 can be reciprocated between the stage 27 and the delivery-in mechanism 49 or discharging mechanism 51 by a slide rail or a guide groove which is not shown. The pedestal 57 is driven by using a driving source such as an electric motor, an air cylinder or a hydraulic cylinder. Moreover, the delivery-in mechanism 49 and the discharging mechanism 51 may use a linear motor or a robot arm which has the structures integrated.

The body of the recording apparatus 100 comprises a main control section 59 for controlling the image forming circuit of the recording head 29, the driving motor of the recording head 29, the driving motor of the stage 27, the delivery-in mechanism 49, the discharging mechanism 51, the second separating means 200 and the sucking source 55, and a power section 61 for supplying a power to the main control section 59, the sucking source 55 and each driving motor. Moreover, the recording apparatus 100 connects the main control section 59 to a host computer 63 through a communicating line so that image forming control and the control of the supply and discharge of the support member 23 can be carried out by the transmission and receipt of a control signal.

Next, description will be given to an operation for taking the support member 23 out of the support member supply section 33 and delivering the same support member 23 into the stage 27.

Figure 5:
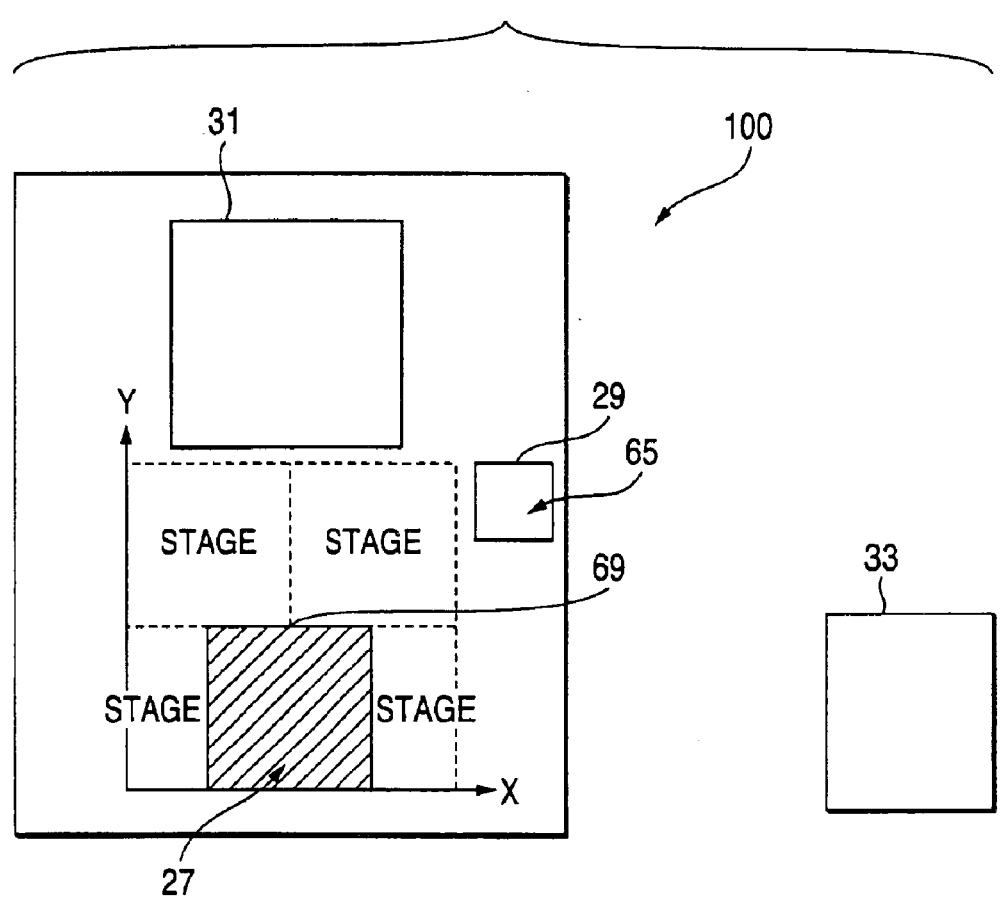
FIG. 5 is a plan view for explaining the operations of a recording head and a stage.
Figure 6:
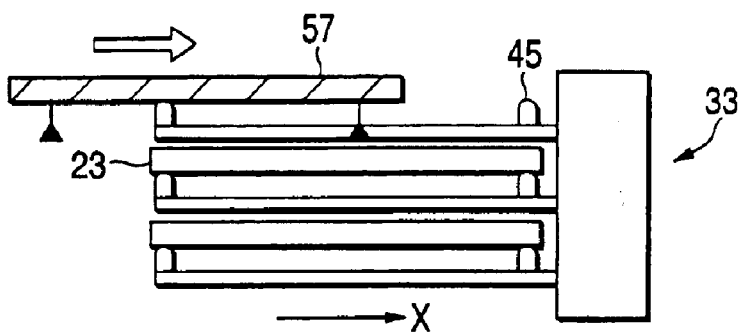
FIGS. 6(a) to 6(d) are explanatory views showing an operation in which a delivery-in mechanism enters the support member supply section and adsorbs the support member.
Figure 6:
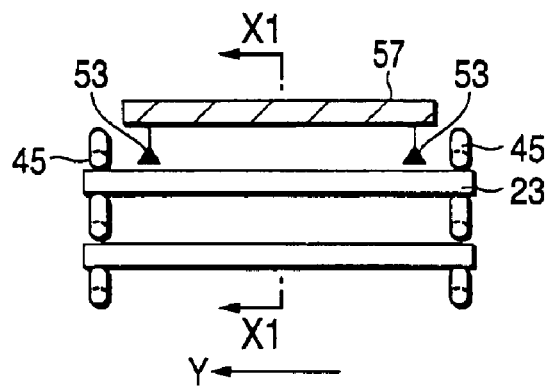
Figure 6:
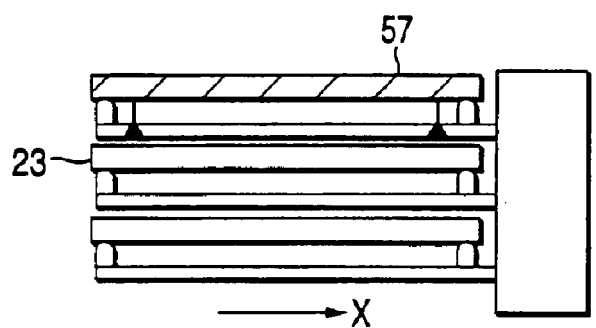
Figure 6:
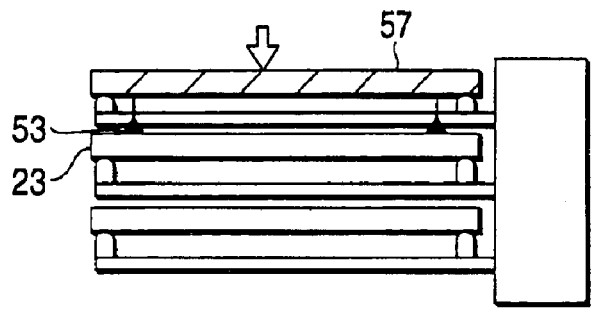

FIG. 5 is a plan view for explaining the operations of the recording head 29 and the stage 27, FIGS. 6(a) to 6(d) are explanatory views showing an operation in which the pedestal 57 of the delivery-in mechanism 49 enters the support member supply section 33 and adsorbs the support member 23, and FIGS. 7(e) to 7(h) are explanatory views showing an operation in which the delivery-in mechanism 49 holds the support member 23 and is moved upward in this state, and takes the support member 23 from the support member supply section 33. FIGS. 6(a), 6(c) and 6(d) and FIGS. 7(e) to 7(h) show sections from a central part in the direction of the depth of the support member supply section 33 shown in FIG. 3 (a vertical direction to a paper) and correspond to an X1—X1 section in FIG. 6(b) showing the positional relationship of the support member supply section 33 seen from the recording apparatus 100 side.

As shown in FIG. 5, in the body of the recording apparatus 100, the recording head 29 is retreated from the stage 27 to a recording head standby position 65. Moreover, the stage 27 is moved to a supply position 67 of the support member 23. As shown in FIG. 1, the recording section 39 has a center position set to be the recording origin position 69 of the recording head 29. Furthermore, the moving range of the stage 27 includes first, second, third and fourth quadrants having the same areas as the area of the stage 27 around the recording origin position 69. In other words, the stage 27 can be moved over a double distance of a vertical and horizontal size. Consequently, the recording head 29 positioned in the recording origin position 69 can be scanned relatively in all positions on the stage 27.

As shown in FIG. 6(a), the delivery-in mechanism 49 moves the pedestal 57 in an almost horizontal direction to the upper part of the support member 23 mounted on the uppermost layer of the support member supply section 33. The pedestal 57 has such a dimension as not to interfere with the support bar 46 and the pin 45 protruded upward from the support bar 46 in the support member supply section 33. For example, as shown in FIG. 6(b), there is such a positional relationship that the pedestal 57 and the sucker 53 can enter the inside of the pins 45 and 45 arranged in a Y direction.

The pedestal 57 moved in an almost horizontal direction is stopped over the support member 23 as shown in FIG. 6(c). As shown in FIG. 6(d), next, the pedestal 57 starts a downward movement and stops the downward movement when the sucker 53 abuts on the support member 23. The stoppage can be controlled by detecting a reaction force applied to the sucker 53 by means of a pressure sensor, for example. Moreover, the stoppage can also be controlled by detecting the amount of the downward movement.

The delivery-in mechanism 49 drives the sucking source 55 to apply a negative pressure to the sucker 53 in such a state that the sucker 53 abuts on the support member 23. In this case, an operation for lifting the pedestal 57 is maintained until the degree of vacuum in the air piping has a predetermined value. After the degree of vacuum in the air piping has the predetermined value, the pedestal 57 is moved upward to float the support member 23 from the pin 45 and to adsorb and hold the support member 23. In the support member 23, a surface on the opposite side of a surface adsorbed by the sucker 53 (a lower surface in FIG. 7(f)) is set to be the recording surface 25. For this reason, an adsorbing track caused by the sucker 53 does not remain on the recording surface 25.

Figure 7:
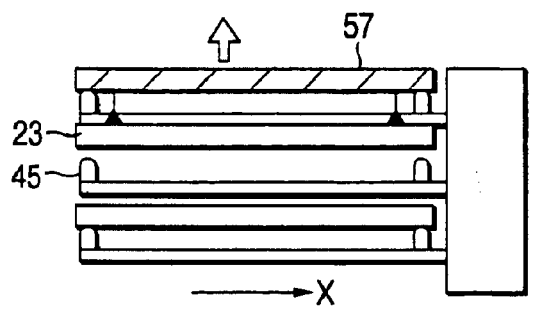
FIGS. 7(e) to 7(h) are explanatory views showing an operation in which the delivery-in mechanism holds the support member and is moved upward to take the support member from the support member supply section.
Figure 7:
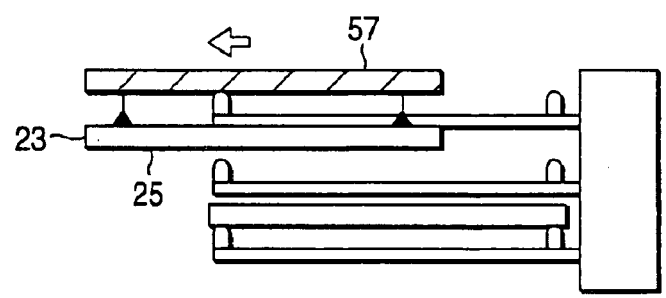
Figure 7:
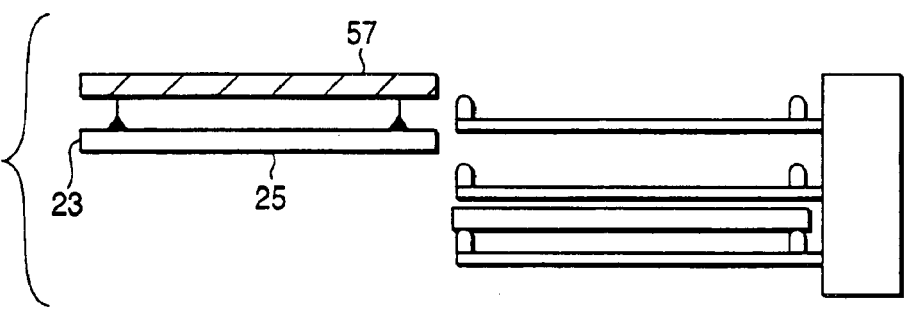
Figure 7:
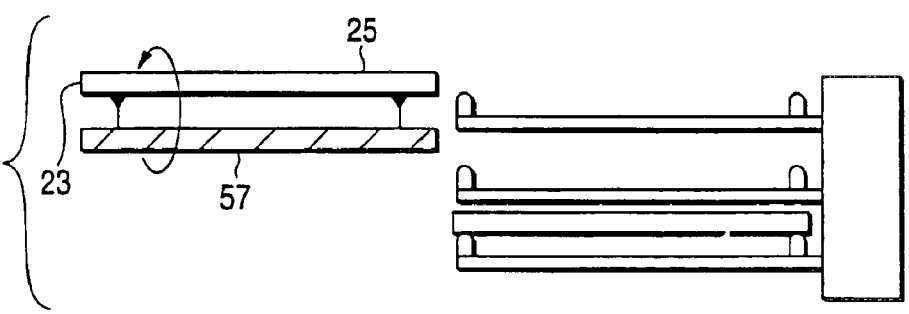

As shown in FIG. 7(f), the pedestal 57 holding the support member 23 is moved to the body side of the recording apparatus 100 in an almost horizontal direction. Thus, the pedestal 57 taking the support member 23 from the support member supply section 33 is once stopped on this side of the body of the recording apparatus 100 as shown in FIG. 7(g). As shown in FIG. 7(h), next, the pedestal 57 is inverted vertically by an inverting device of the delivery-in mechanism 49 which is not shown and supports the support member 23 in such a manner that the recording surface 25 is turned upward. The pedestal 57 passes through a delivery-in opening section formed on the shielding frame 41 which is not shown and delivers the support member 23 to the upper part of the stage 27 in a support attitude.

Figure 8:
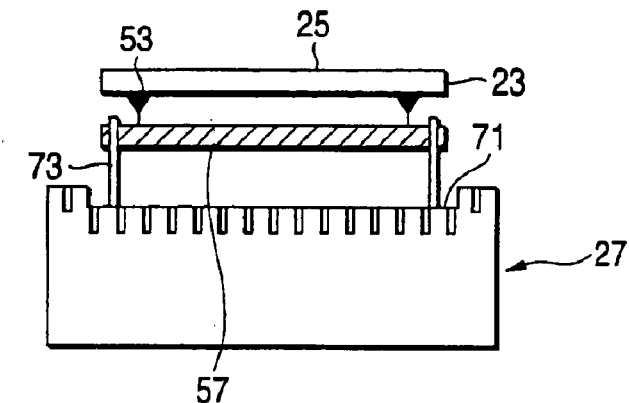
FIG. 8 is a sectional view showing a stage seen in a Y direction with a pin protruded.
Figure 9:
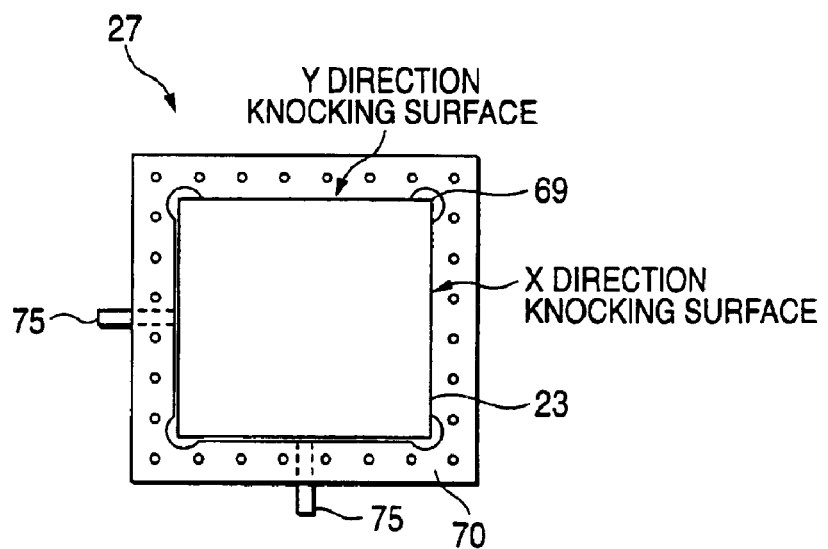
FIG. 9 is a plan view showing the stage accommodating the support member in a concave section.
Figure 10:
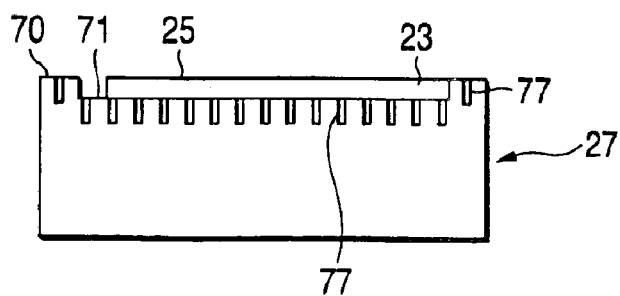
FIG. 10 is a sectional view showing the stage accommodating the support member in the concave section.

FIG. 8 is a sectional view illustrating the stage 27 seen in a Y direction in such a state that the pin is protruded from a bottom surface, FIG. 9 is a plan view showing the stage 27 accommodating the support member in a concave section, and FIG. 10 is a sectional view showing the stage 27 accommodating the support member in the concave section.

As shown in FIG. 8, the upper surface of the stage 27 is provided with a concave section 71 which has an almost equal depth to the thickness of the support member 23 and takes the shape of a square seen on a plane. The concave section 71 is formed by boring and accommodates the support member 23 therein as shown in FIG. 9. A distance between the side surfaces of the concave section 71 taking the shape of a square which are opposed to each other is set to be greater than a distance between the opposed side surfaces of the support member 23 which correspond to these side surfaces. As a result, the concave section 71 accommodates the support member 23 with a play.

Moreover, a plurality of pins 73 which support and raise the support member 23 and can be freely moved upward and downward are erected on the bottom surface of the concave section 71. In the concave section 71, furthermore, an offset pin 75 which is offset toward the opposed side surfaces and can be freely protruded is provided on two side surfaces which are orthogonal to each other.

As shown in FIG. 10, the stage 27 has a plurality of sucking holes 77 formed on the bottom surfaces of a bank section 70 on the peripheral edge of the concave section 71 and the concave section 71. The sucking hole 77 is connected to the sucking source 55 through the air piping. The stage 27 serves to suck air from the sucking hole 77, thereby sucking and fixing the support member 23 into the bottom surface of the concave section 71. The sucking hole 77 provided in the bank section 70 of the peripheral edge of the concave section 71 in the stage 27 serves to adsorb and fix a recording medium which will be described below.

As shown in FIG. 8, when the pedestal 57 of the delivery-in mechanism 49 is stopped above the stage 27, the stage 27 protrudes the pin 73. In this state, the pedestal 57 is moved downward. The pedestal 57 stops the downward movement when the support member 23 comes in contact with the pin 73. The stoppage of the downward movement can be controlled by detecting a reaction force applied to the sucker 53 by means of a pressure sensor, for example. Moreover, the stoppage may be controlled by detecting the amount of the downward movement.

When the pedestal 57 is stopped, the delivery-in mechanism 49 opens the air piping to the air. Consequently, the support member 23 is supported by the pin 73. After stopping an operation until a degree of vacuum in the sucker 53 is set to be an atmospheric pressure, the delivery-in mechanism 49 retreats the pedestal 57 from the passage opening section of the shielding frame 41 to the outside of the body of the planar recording apparatus 100. The stage 27 moves the pin 73 downward, thereby mounting the support member 23 in the concave section 71. The stage 27 moves the offset pin 75 from the two orthogonal side surfaces toward the opposed side surfaces when the support member 23 comes in contact with the bottom surface of the concave section 71. Consequently, the support member 23 has two orthogonal side surfaces abutting on the two orthogonal side surfaces of the concave section 71 so that positioning in an XY direction is carried out as shown in FIG. 9. The support member 23 shown in FIG. 9 has a right upper corner portion set to be the recording origin position 69.

Next, the stage 27 sucks the air from the sucking hole 77 by means of the sucking source 55, thereby sucking and fixing the support member 23 to the bottom surface in the concave section 71. Consequently, the support member 23 is completely held in the stage 27.

The stage 27 has the concave section 71 provided on an upper surface thereof. Consequently, when a recording medium having a larger area than that of the support member 23 is superposed, therefore, a recording medium protruded from the support member 23 can be mounted flatly on the bank section 70 at the peripheral edge of the concave section 71 in the stage 27. Accordingly, the recording medium is flexed or wrinkled due to a step with difficulty. Thus, the adhesion of the recording medium to the recording surface 25 can be enhanced.

Figure 11:
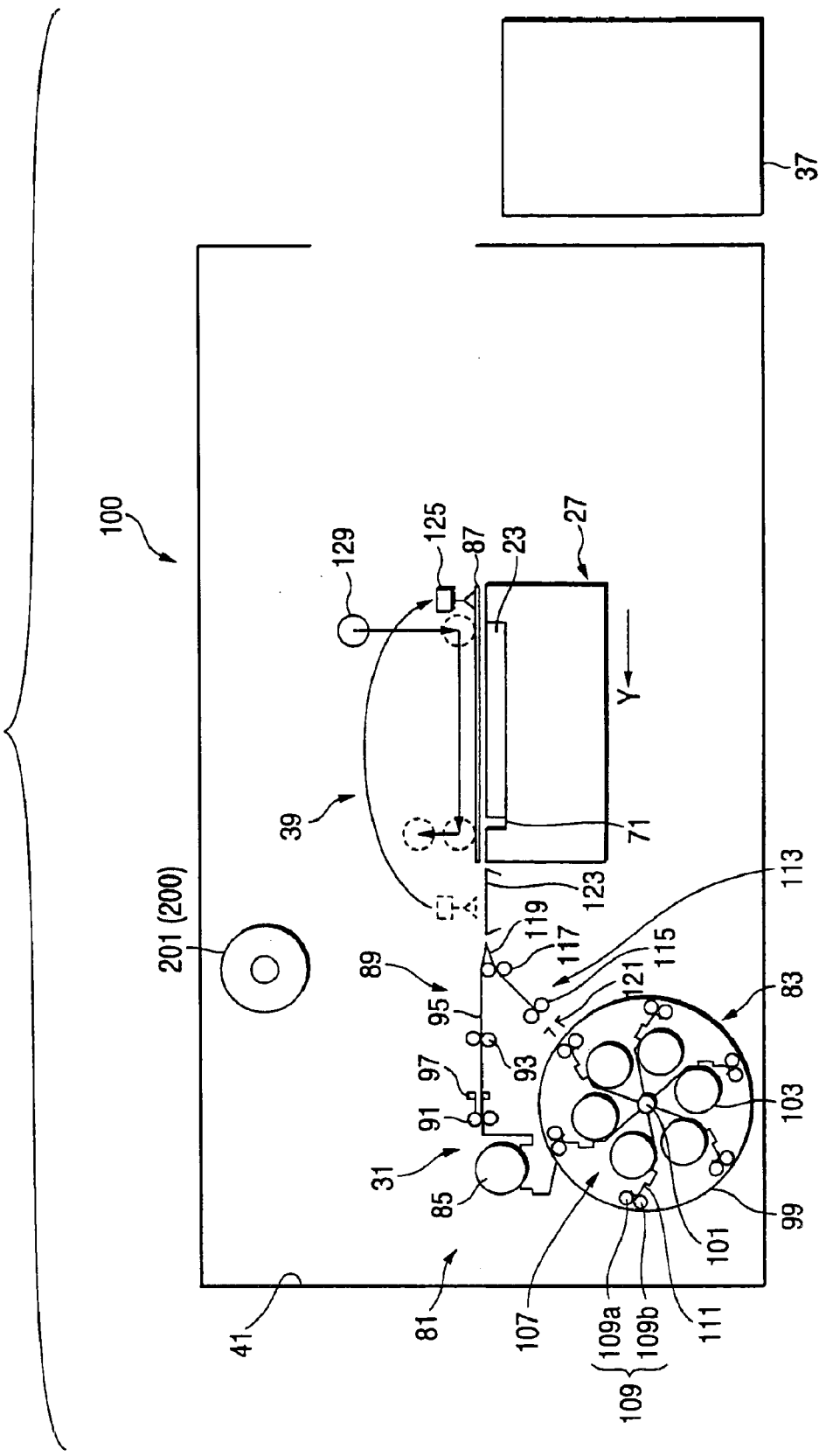
FIG. 11 is a view showing the structure of the main parts of a recording medium supply section and a recording section.
Figure 12:
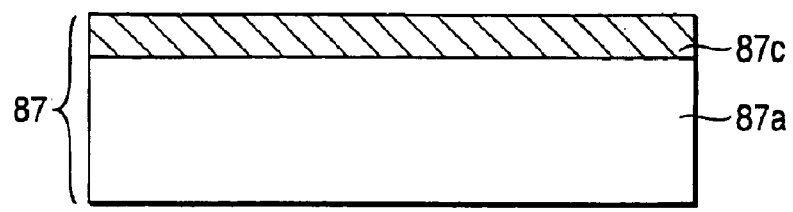
FIG. 12 is a sectional view showing an image receiving sheet and a transfer sheet which are used in the recording apparatus of FIG. 1.
Figure 12:
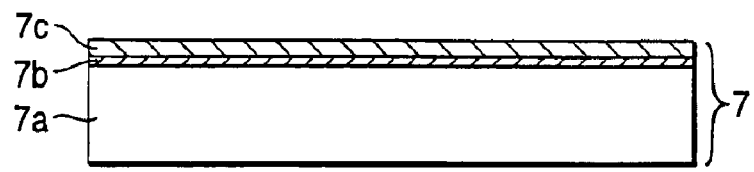

Next, description will be given to a structure for carrying out a recording operation over the support member held in the stage. FIG. 11 is a view showing the structure of the main parts of the recording medium supply section 31 and the recording section 39 and FIG. 12 is a sectional view showing an image receiving sheet and a transfer sheet which are used in a planar recording apparatus.

As shown in FIG. 11, the recording medium supply section 31 includes an image receiving sheet supply section 81 and a transfer sheet supply section (transfer sheet supply means) 83. The image receiving sheet supply section 81 can supply an image receiving sheet to the recording section 39. Moreover, the transfer sheet supply section 83 can supply plural kinds of transfer sheets and can selectively feed one kind of transfer sheet from the plural kinds of transfer sheets to the recording section 39.

The image receiving sheet supply section 81 has an image receiving sheet roll 85. The image receiving sheet roll 85 has a core upon which the image receiving sheet 87 is wound. The image receiving sheet 87 has an image receiving layer 87c laminated on a support layer 87a as shown in FIG. 12(a). For the support layer 87a, it is possible to use a PET (polyethylene terephthalate) base, a TAC (triacetylcellulose) base, and a PEN (polyethylene naphthalate) base. The image receiving layer 87c acts to receive a toner to be transferred.

The image receiving sheet supply section 81 further has an image receiving sheet delivery section 89. The image receiving sheet delivery section 89 has a motor (not shown), a belt or chain for driving transmission (not shown), delivery rollers 91 and 93, a support guide 95, an image receiving sheet cutting section 97 and a detecting sensor (not shown) for detecting the end point of an image receiving sheet. The delivery roller 91 and the delivery roller 93 have a pair of rollers, respectively. By such a driving mechanism, it is possible to send the image receiving sheet 87 to the recording section 39 or to return the image receiving sheet 87 from the recording section 39.

The image receiving sheet roll 85 pulls out the image receiving sheet 87 by the driving mechanism such as a motor with a tip portion interposed by the delivery rollers 91. Consequently, the image receiving sheet roll 85 is rotated so that the image receiving sheet 87 is reeled out. The image receiving sheet 87 is further interposed between the delivery rollers 93 and is guided and delivered to the support guide 95.

The image receiving sheet 87 delivered by the image receiving sheet delivery section 89 is cut to have a predetermined length by the image receiving sheet cutting section 97. A detecting sensor such as an optical sensor is utilized for the measurement of a length. More specifically, the tip of the image receiving sheet 87 is detected by the detecting sensor to take the number of rotations of the motor into consideration so that a length can be measured. The image receiving sheet 87 is cut to have a predetermined length based on the result of the measurement and is then supplied to the recording section 39. The image receiving sheet cutting section 97 has a support section and a guide in addition to a cutter which is not shown. By the driving operation, the image receiving sheet 87 reeled from the image receiving sheet roll 85 is stopped to be delivered based on the result of the measurement for the image receiving sheet length and is then cut to have a predetermined length by the cutter.

As described above, the image receiving sheet supply section 81 reels and cuts a part of the image receiving sheet roll 85, thereby supplying the image receiving sheet 87 having a predetermined length to the recording section 39.

On the other hand, the transfer sheet supply section 83 has a rotating rack 99. The rotating rack 99 is rotated around a rotating shaft 101 as will be described below. Moreover, the rotating rack 99 accommodates a plurality of (six in the drawing) transfer sheet rolls 103 and each of the transfer sheet rolls 103 is arranged "radially" around the rotating shaft 101. Each transfer sheet roll 103 has a core, a transfer sheet 7 wound thereupon and a flange (not shown) inserted from both sides of the core. Each of the transfer sheet rolls 103 is rotatably held around each core. The outside diameter of the flange is set to be larger than that of the transfer sheet portion so that the transfer sheet portion can be prevented from collapsing.

Each transfer sheet 7 has a support layer 7a, a photothermal converting layer 7b and a separable image forming layer (toner layer) 7c provided thereon in this order as shown in FIG. 12(b). For the support layer 7a, it is possible to select any of general support member materials (for example, the same support member material as a support layer 87a of the image receiving sheet 87 described above) through which a laser beam is transmitted. The photothermal converting layer 7b is a portion serving to convert a laser energy into heat. For the material of the photothermal converting layer 7b, it is possible to select any of general photothermal converting materials, that is, substances for converting an optical energy into a thermal energy such as carbon, a black substance, an infrared absorption pigment and a specific wavelength absorption substance. Examples of the toner layer 7c to be an image forming layer include cyan (C), magenta (M) and yellow (Y) for printing and gold, silver, orange, gray and pink which are referred to as special colors in addition to four colors of black (K), red (R), green (G) and blue (B).

In the transfer sheet roll 103, the toner layer 7c is wound on the outside with respect to the support layer 7a. As will be described below, the toner layer 7c has a toner ink and the toner ink is transferred onto the image receiving sheet by laser exposure.

FIG. 11 shows the case in which six transfer sheet rolls 103 are accommodated in the rotating rack 99. For example, six kinds of transfer sheets include transfer sheets having four colors of black, red, green and blue.

The rotating rack 99 further has a transfer sheet reeling mechanism 107 corresponding to each of the transfer sheet rolls 103. The transfer sheet reeling mechanism 107 is constituted by a feed roller 109 and a support guide 111. In an example of the drawing, six transfer sheet reeling mechanisms 107 are provided. The feed roller 109 has rollers 109*a* and 109*b*. The roller 109*a* is connected to a motor through a gear mechanism as will be described below and is driven by the motor. The roller 109*a* can interpose the transfer sheet 7 together with the roller 109*b* by a predetermined pressure. Then, the roller 109*b* is rotated in a reverse direction to the rotation of the roller 109*a*, thereby delivering the transfer sheet 7. The transfer sheet 7 is interposed by the rollers 109*a* and 109*b* and can be sent or returned reversely. Moreover, the transfer sheet roll 103 is rotated with the delivery of the transfer sheet 7.

By the transfer sheet reeling mechanism 107 having such a structure, the transfer sheet 7 is supplied to the recording section 39. In a state in which the tip of the transfer sheet 7 is interposed between the feed rollers 109, the feed roller 109 is driven by the driving mechanism such as a motor. By the driving operation, the transfer sheet 7 is reeled out. Moreover, the transfer sheet 7 is further cut to have a predetermined length and is supplied to the recording section 39 in the transfer sheet delivery section 113 which will be described below.

As described above, the rotating rack 99 accommodating the transfer sheet rolls 103 can selectively supply a desirable kind of transfer sheet 7 to the transfer sheet delivery section 113.

The transfer sheet delivery section 113 has a motor (not shown), a belt or chain for driving transmission (not shown), delivery rollers 115 and 117, a guide 119, a transfer sheet cutting section 121, and a detecting sensor (not shown) for detecting the end of the transfer sheet. The delivery rollers 115 and 117 have a pair of rollers, respectively. These rollers 115 and 117 are connected to a motor through a belt or chain for driving transmission and are driven by the motor to deliver the transfer sheet 7.

By such a driving mechanism, the transfer sheet 7 can be sent to or returned from the recording section 39. Moreover, the transfer sheet 7 thus delivered is cut to have a predetermined length by the transfer sheet cutting section 121. For the measurement of the length of the transfer sheet 7, a detecting sensor such as an optical sensor is utilized. More specifically, the end of the transfer sheet 7 is detected by the detecting sensor to take the number of rotations of the motor into consideration so that the length can be measured. The transfer sheet 7 is cut to have a predetermined length based on the result of the measurement and is thus supplied to the recording section 39. The transfer sheet cutting section 121 has a support section and a guide in addition to a cutter which is not shown.

As described above, the transfer sheet supply section 83 reels and cuts a part of the transfer sheet roll 103, thereby supplying the transfer sheet 7 having a predetermined length to the recording section 39.

When the transfer sheet 7 is reeled out and consumed, it is necessary to remove the used transfer sheet roll 103 and to exchange the used transfer sheet roll 103 with the new transfer sheet 7. The transfer sheet roll 103 can be exchanged by opening a cover provided in the upper or side portion of the recording apparatus 100 which is not shown. In this case, the rotating rack 99 is rotated to move the transfer sheet roll 103 to be an exchange object to a predetermined exchange position corresponding to the cover. On the other hand, the image receiving sheet roll 85 is also exchanged by opening the cover.

A guide plate 123 mounting the recording medium (the image receiving sheet 87 or the transfer sheet 7) sent from the recording medium supply section 31 is provided between the guides 95 and 119 in the recording medium supply section 31 and the recording section 39. The guide plate 123 is moved upward or folded to retreat so as not to interfere with the movement of the stage 27.

A sucking line 125 having a plurality of suckers arranged in the transverse direction of the recording medium (the vertical direction of a paper in FIG. 11) is provided above the guide plate 123. The sucking line 125 is connected to the sucking source 55 through an air piping, and furthermore, is movably supported in an up-down direction and a parallel direction with the moving surface of the stage through a support arm. The sucking line 125 is moved downward from above the guide plate 123, thereby pressing and adsorbing the end of the image receiving sheet 87 (or the transfer sheet 7) mounted on the guide plate 123 against and onto the guide plate 123. The sucking line 125 sucking and holding the end of the image receiving sheet 87 (or the transfer sheet 7) is moved to an end (a starting end side) on the opposite side to the recording medium supply section 31 side of the stage 27, thereby pulling out the image receiving sheet 87 (or the transfer sheet 7). Consequently, the image receiving sheet 87 (or the transfer sheet 7) is superposed on the upper surface of the support member 23 held on the stage 27. It is desirable that the width of the image receiving sheet 87 (a length in an X direction) should be almost equal to that of the support member 23.

Figure 13:
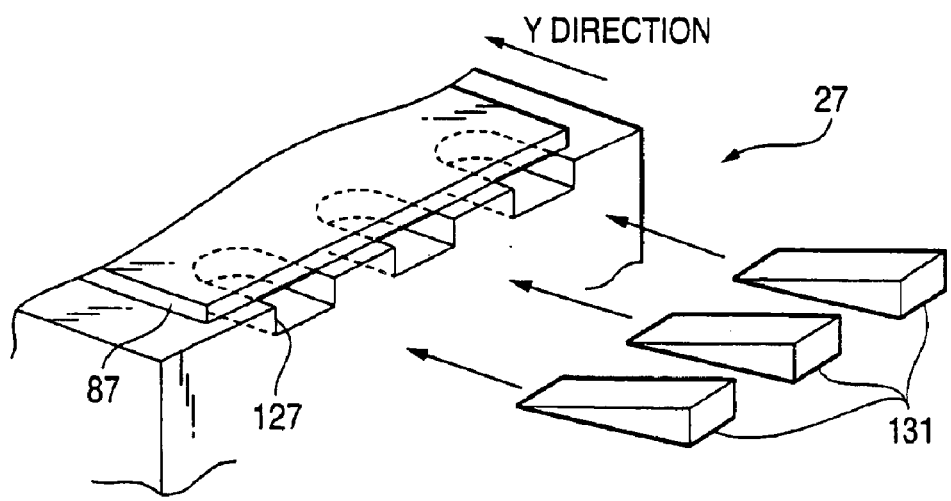
FIG. 13 is an enlarged perspective view showing the peripheral edge of the concave section of the stage provided with a separating groove.

FIG. 13 is an enlarged perspective view showing the peripheral edge of the concave section of the stage provided with a separating groove.

As shown in FIG. 13, a separating groove 127 to be a component of first separating means is formed on the peripheral edge of the concave section 71 to be the starting end side of the stage 27. The separating groove 127 is opened on the right side surface of the stage 27 and a separating click which will be described below can be inserted therein. The end of the image receiving sheet 87 (or the transfer sheet 7) pulled out by the sucking line 125 is put over the stage 27 to cover the separating groove 127.

Moreover, a pressurizing roller (a squeeze roller) 129 is provided above the stage 27 of the recording section 39 shown in FIG. 11, and the squeeze roller 129 is supported to be movable in the up-down direction and a Y direction. The squeeze roller 129 is brought downward in the vicinity of the recording medium supply section 31 side of the sucking line 125 moved to the starting end side and presses the end of the image receiving sheet 87 (or the transfer sheet 7), and is then rolled toward the recording medium supply section 31 side while pressing the image receiving sheet 87 (or the transfer sheet 7), thereby squeezing the image receiving sheet 87 (or the transfer sheet 7) to the support member 23 and operating to smooth out the wrinkles of the image receiving sheet 87 (or the transfer sheet 7).

The recording section 39 may include an auxiliary heat roller in addition to the squeeze roller 129. The heat roller is rolled over the image receiving sheet 87 (or the transfer sheet 7) subjected to the squeezing by the squeeze roller 129 while further carrying out heating and pressing. If such a heat roller is provided, it is possible to hermetically bond the image receiving sheet 87 (or the transfer sheet 7) to the support member 23 by a higher adhesion force, thereby more enhancing a separating strength as compared with the case in which the image receiving sheet 87 (or the transfer sheet 7) is hermetically bonded to the support member 23 by using only the squeeze roller 129. Moreover, the squeeze roller 129 itself may serve as the heat roller.

After the image receiving sheet 87 is hermetically bonded to the recording surface of the support member 23 by using the means described above, the image receiving sheet 87 bonded hermetically to the support member 23 is separated so that the image receiving layer 87c is formed on the recording surface 25 of the support member 23.

Figure 14:
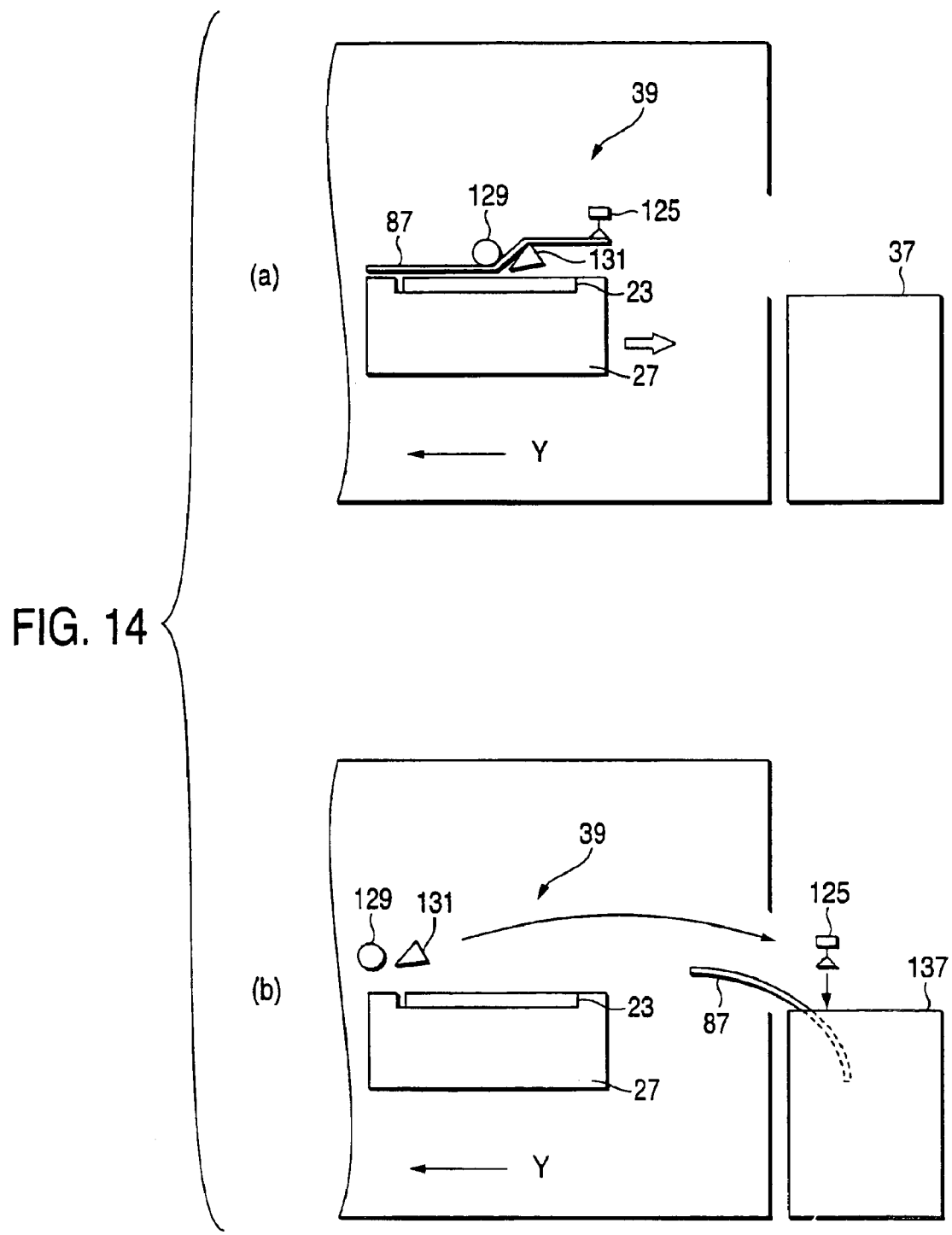
FIG. 14 is an explanatory view showing the separating operation of the image receiving sheet in the recording section.

FIG. 14 is an explanatory view showing an operation for separating the image receiving sheet 87 in the recording section 39. The recording section 39 has a first separating roller moved in the up-down direction and the Y direction. In the recording apparatus, the squeeze roller 129 also serves as the first separating roller.

Moreover, the recording section 39 has a separating click 131 on the starting end side of the stage 27 as shown in FIGS. 13 and 14. The separating click 131 is provided to enter the separating groove 127 provided on the upper surface of the stage 27 and is moved to a retreat position in order to avoid an interference with the stage 27 during non-use.

At time of the separation of the image receiving sheet 87, the squeeze roller 129 serving as the separating roller is moved downward to the vicinity on the upstream side in the progress direction of the separation of the sucking line 125 and presses the vicinity of the end of the image receiving sheet 87 by means of the squeeze roller 129. Next, the sucking line 125 is slightly lifted to cause the separating click 131 to enter the separating groove 127. Then, the separating click 131 is slightly lifted to such a position as not to interfere with the stage 27 and the support member 23 and is moved in such a direction as to approach the squeeze roller 129.

As shown in FIG. 14(a), then, the sucking line 125, the image receiving sheet 87, the support member 23 and the stage 27 are moved together in such a direction as to go away from the squeeze roller 129 (a negative Y direction) with the position of the squeeze roller 129 fixed so that a separation force is applied to the pressing section of the squeeze roller 129, and furthermore, the pressing section is relatively moved from one of the ends of the support member 23 to the other end so that the image receiving sheet 87 can be separated from the whole recording surface.

When the image receiving sheet 87 is separated from the support member 23, the image receiving layer 87c is transferred to the recording surface 25 of the support member 23 and only the support layer 87a remains. The support layer 87a is maintained to be sucked and held into the sucking line 125. The sucking line 125 is moved in a rightward direction (the negative Y direction) in FIG. 14(b) with the support layer 87a sucked and held, and passes through the passage opening section provided on the shielding frame 41 to put the unnecessary support layer 87a in the discarding box 37 so as to be discarded.

Subsequently, the transfer sheet 7 is supplied from the recording medium supply section 31 to the upper surface of the support member 23 provided with the image receiving layer 87c in the same manner as the image receiving sheet 87. The transfer sheet 7 is supplied from the transfer sheet delivery section 113 of the recording medium supply section 31. The area of the transfer sheet 7 is larger than the area of the concave section 71 of the stage 27, that is, the area of the support member 23, and the peripheral edge of the transfer sheet 7 protruded from the support member 23 is brought into such a state as to be mounted on the bank section 70 at the peripheral edge of the concave section 71 in the stage 27. In this state, air is sucked from the sucking hole 77 (see FIG. 10) and adsorbs and fixes the peripheral edge of the transfer sheet 7 to the bank section 70 on the peripheral edge of the concave section 71, thereby hermetically bonding the transfer sheet 7 to the recording surface of the support member 23.

Figure 15:
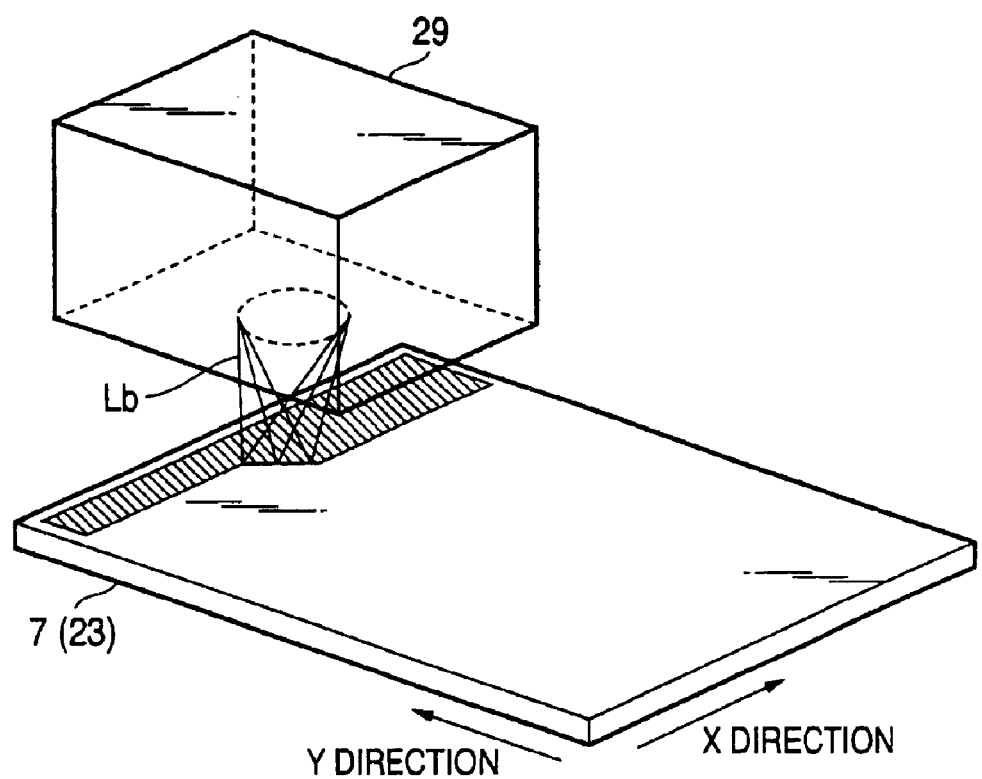
FIG. 15 is a perspective view illustrating the direction of the relative movement of the recording head and the support member.

Next, the recording head 29 is scanned relatively with the transfer sheet 7 from above the transfer sheet 7 to carry out exposure recording. FIG. 15 is a perspective view illustrating a relative moving direction of the recording head 29 and the support member 23 (the transfer sheet 7) and FIG. 16 is an explanatory view showing a recording operation based on the spot line of the recording head, (a) being an explanatory view illustrating the spot line formed by the recording head 29 and (b) being an explanatory view showing a recording process carried out by scanning the spot line.

The recording operation is performed by carrying out fast scanning over the recording head 29 in an X direction from the recording origin position and slow scanning in a Y direction. At time of the start of a recording operation, the stage 27 is set in an origin position and the recording head 29 is moved from the standby position 65 (see FIG. 1) to the recording origin position 69. In the recording operation, the recording head 29 scans the whole recording surface 25 and the scanning may be carried out by moving only the recording head 29, moving only the stage 27 or moving both the recording head 29 and the stage 27. In other words, the recording head 29 and the support member 23 may be moved relatively. In the embodiment, description will be given by taking, as an example, the case in which the recording head 29 is fixed to the recording origin position 69 and the stage 27 is moved in an XY direction.

Figure 16:
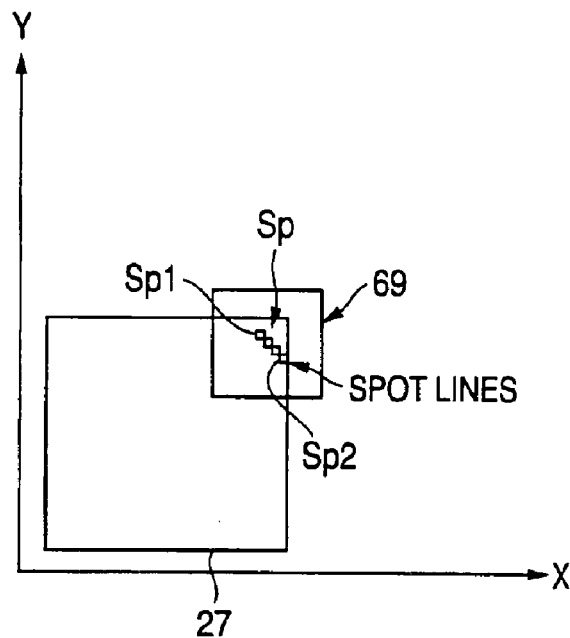
FIGS. 16(a) and 16(b) are explanatory views illustrating a recording operation to be carried out by the spot line of the recording head, (a) being an explanatory view illustrating the spot line formed by the recording head and (b) being an explanatory view illustrating a recording process for scanning the spot line.
Figure 16:
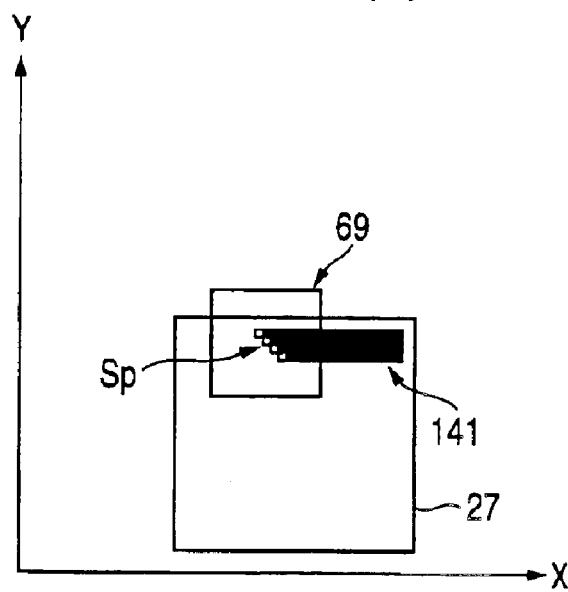
Figure 17:
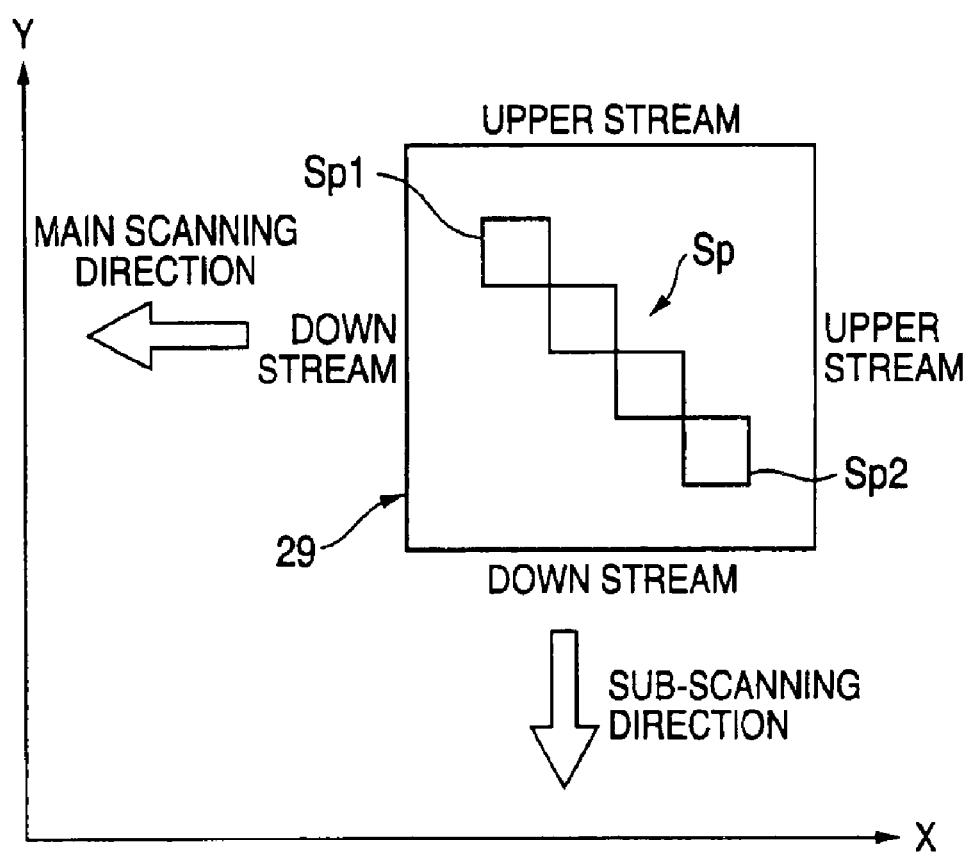
FIG. 17 is a typical enlarged view showing the recording head.

The recording head 29 forms a plurality of spots Sp on the rear surface of the transfer sheet 7 by the irradiation of a laser beam Lb as shown in FIG. 16. A plurality of spots Sp are arranged in at least the slow scanning direction. It is preferable that the spots Sp should be inclined in such a direction that a spot Sp1 on an upstream end in a slow scanning recording direction should be provided on the downstream side in a fast scanning recording direction from a spot Sp2 on a downstream end in the slow scanning recording direction as shown in a typical enlarged view of the recording head 29 in FIG. 17. In other words, a spot array is set to be a one-dimensional array and the spot Sp1 on the upstream end in the slow scanning recording direction is inclined in such a direction as to be arranged on the downstream side in the fast scanning recording direction from the spot Sp2 on the downstream end in the slow scanning recording direction. Consequently, a gas generated in the local recording part is discharged toward the downstream side in the slow scanning recording direction in the recording operation. Thus, the gas does not remain between the toner layer 7c and the image receiving layer 87c in a recorded region. As a result, the adhesion of the toner layer 7c to the image receiving layer 87c is maintained and an image defect can be prevented so that an excellent image can be obtained.

Pattern data such as an image and a character are sent from the host computer 63 to the recording head 29 through the main control section 59 (see FIG. 3). Moreover, a movement control signal is sent from the host computer 63 to the driving motor such as the stage 27 through the main control section 59. Consequently, the movements of the recording head 29 and the support member 23 are relatively controlled and an image is formed on the transfer sheet 7. In the embodiment, the whole surface of a recording range is scanned by the relative operation and the laser beam Lb is irradiated on only a portion in which image data are present, thereby carrying out the recording operation.

Next, description will be given, with reference to FIG. 18, to a series of basic procedures in which a desirable image is recorded on the support member 23 by the recording apparatus 100 having the structure described above. A procedure for using a transfer sheet in plural recording operations will be described below in detail.

Description will be given to an operation procedure in which an image (a stripe-shaped pattern) for forming a black matrix and a color filter is recorded by using four colors of black (K), red (R), green (G) and blue (B).

FIG. 18 is an explanatory view conceptually showing a recording process.

As shown in FIG. 18, at a step 1, the support member 23 is first supplied from the support member supply section 33 (see FIG. 3) to the recording section 39 by means of the delivery-in mechanism 49. More specifically, the support member 23 is fixed to the concave section 71 in the operation procedure in the stage 27 of the recording section 39 (see FIG. 10).

At a step 2, next, the image receiving sheet 87 is supplied from the recording medium supply section 31 to the support member 23 disposed on the stage 27 and is mounted thereon (see FIG. 11). The image receiving sheet 87 is hermetically bonded to the support member 23 by means of the squeeze roller 129.

Then, the image receiving sheet 87 may further be heated and pressure welded (that is, laminated) by using a heat roller at a step 3.

At a step 4, then, the image receiving sheet 87 is separated from the support member 23 to transfer the image receiving layer 87c of the image receiving sheet 87 to the support member 23. The support layer 87a to which the image receiving layer 87c is transferred is delivered from the recording section 39 by means of the sucking line 125 and is discarded into the discarding box 37. The steps 2 to 4 described above are not required in case of a direct transfer onto a support member and case of a support member including an image receiving layer in advance.

At a step 5, next, the transfer sheet 7 is supplied from the transfer sheet supply section 83 of the recording medium supply section 31 onto the stage 27. The transfer sheet 7 cut to have a predetermined length is caused to come in close contact with the support member 23 by means of the squeeze roller 129. Then, the transfer sheet 7 may further be heated and pressure welded (that is, laminated) by using the heat roller at a step 6 in the same manner as the case of the image receiving sheet 87.

At a step 7, thereafter, the laser beam Lb is emitted from the recording head 29 onto the transfer sheet 7 based on image data given in advance and a predetermined spot Sp is ON/OFF controlled, and furthermore, the stage 27 is moved synchronously therewith. In other words, the predetermined spot Sp scans the rear surface (the upper surface in FIG. 18) of the transfer sheet 7 like an image. The image data thus given are further color separated into images having respective colors and the laser exposure is carried out based on the image data for each color which is color separated. Consequently, the toner layer 7c of the transfer sheet 7 is transferred to the image receiving layer 87c of the support member 23 and an image of black (K) to be an initial recording color in the example is formed on the support member 23.

When the image recording operation of black (K) is completed as described above, the transfer sheet 7 of black is separated from the support member 23 at a step 8. The separation of the transfer sheet 7 in a basic operation (in the discard of the transfer sheet) is carried out in the same procedure as that in case of the image receiving sheet 87. When the transfer sheet 7 is used plural times, moreover, the separation is carried out by using second separating means (separating and holding means) which will be described below. In any case, the transfer sheet 7 bonded hermetically to the support member 23 is separated so that an image having the color of the transfer sheet 7 is formed on the image receiving layer 87c of the support member 23.

In the case in which another kind of transfer sheet 7 is to be supplied, the processings of the steps 5 to 8 are repeated. More specifically, each of the operations of the steps 5 to 8 is repeated in the transfer sheet 7 having each of colors of red, green and blue. As a result, toner inks K, R, G and B of the toner layer 7c having four colors are transferred to one support member 23 and a desirable pattern image is formed on the recording surface 25 of the support member 23.

The support member 23 completely subjected to the recording operation is discharged from the recording section 39 and is stacked in the support member receiving section 35 by means of the discharging mechanism 51. In the discharging operation, first of all, the suction from the sucking hole 77 of the stage 27 (see FIG. 10) is released. Next, the pin 73 is protruded from the bottom surface of the concave section 71 to support the support member 23 in a floating state from the stage 27. Subsequently, the pedestal 57 of the discharging mechanism 51 is caused to enter the lower surface side of the support member 23. In this case, the pedestal 57 has the sucker 53 turned upward. Then, the pedestal 57 starts an upward movement and stops the upward movement when the sucker 53 abuts on the support member 23.

The discharging mechanism 51 drives the sucking source 55 to apply a negative pressure to the sucker 53 in such a state that the sucker 53 abuts on the support member 23. In this case, the upward moving operation of the pedestal 57 is maintained until a degree of vacuum in the air piping has a predetermined value. After the degree of vacuum in the air piping is set to have the predetermined value, the pedestal 57 is moved upward and the support member 23 is floated from the pin 73 and is thus adsorbed and held. In that case, in the support member 23, a surface (an upper surface) on the opposite side of a surface to be adsorbed by the sucker 53 is set to be the recording surface 25. For this reason, an image formed on the recording surface 25 is not damaged.

The pedestal 57 holding the support member 23 is moved in an almost horizontal direction. Immediately after passing through the passage opening section of the shielding frame 41, the pedestal 57 thus taking the support member 23 from the recording section 39 is once stopped. The pedestal 57 is inverted vertically in this position by the inverting device of the discharging mechanism 51 which is not shown and supports the support member 23 with the recording surface 25 turned downward. The pedestal 57 delivers the support member 23 to the upper part of the support member receiving section 35 in the support attitude.

The support member receiving section 35 has a pin 45 for stacking the support member 23 at an interval in the same manner as the support member supply section 33. The pedestal 57 of the discharging mechanism 51 is moved horizontally to align the support member 23 above the pin 45 and is thus stopped. Subsequently, the pedestal 57 starts a downward movement and stops the downward movement when the support member 23 abuts on the pin 45.

The discharging mechanism 51 holds the upward moving operation of the pedestal 57 until the decree of vacuum in the air piping is set to have a predetermined value in the stop position. After the degree of vacuum in the air piping is set to have the predetermined value, that is, the sucking and holding operation of the sucker 53 is released, the pedestal 57 is moved upward to deliver the support member 23 onto the pin 45. The pedestal 57 discharging the support member 23 to the support member receiving section 35 is moved to a standby position for the discharge of the next support member 23.

By repeating each of the operations described above, it is possible to continuously form a pattern of a black matrix or a color filter on the support members 23.

While there has been described the example in which the recording head 29 is fixed into the recording origin position 69 and the stage 27 is moved in the fast scanning direction and the slow scanning direction, it is also possible to employ such a structure that the stage 27 is fixed and the recording head 29 is moved in the fast scanning direction and the slow scanning direction.

The basic structure and operation of the recording apparatus 100 has mainly been described above. Next, description will be given to a structure and an operation in the case in which a transfer sheet is used for plural recording operations. For simplicity of explanation, description will be given to the case in which one kind of transfer sheet (for example, red=R) is used for the recording operation plural times.

FIG. 19 is an explanatory view showing an operation for separating a transfer sheet which is to be carried out when the transfer sheet is used for plural recording operations.

For the structure, first of all, a separating roller 201 constituting second separating means (separating and holding means) is a main component as shown in FIG. 19. The separating roller 201 serves to separate the transfer sheet 7 from the support member 23 after the recording operation is carried out and to hold the transfer sheet 7 thus separated, and to superpose the held transfer sheet 7 on the recording surface of the support member 23 delivered into the stage 27 for a next recording operation. The separating roller 201 is provided movably in the upper space of the stage 27 and is retreated to an initial position as shown in FIG. 19(a) in order to avoid an interference with another means in the basic operation.

The separating roller 201 is provided toward an axis in a direction (an X direction) orthogonal to the direction of supply of the transfer sheet 7 (a longitudinal direction=a Y direction). When an instruction for starting a separating operation is given, the separating roller 201 is moved from the initial position to the upper position of a starting end (a right end in the drawing) of the transfer sheet 7 superposed on the support member 23 in the stage 27 through a predetermined path and is moved downward to the upper surface of the transfer sheet 7.

As shown in FIG. 19(b), in that state, the separating roller 201 and the stage 27 are relatively moved in the Y direction, and at the same time, the separating roller 201 is rotated at a speed corresponding to a moving speed, thereby winding the transfer sheet 7 upon the outer periphery of the separating roller 201 (the peripheral surface of a cylinder) from the starting end. When the winding is finally completed and the separating roller 201 holds the transfer sheet 7, the separating roller 201 is moved to the initial position or a storage position and is then stopped therein as shown in FIG. 19(c).

Figure 20:
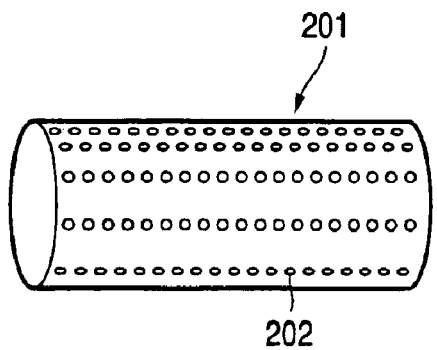
FIGS. 20(a) and 20(b) are a perspective view showing an appearance according to an example of the specific structure of a separating roller and a developed view showing an outer peripheral surface thereof, respectively.
Figure 20:
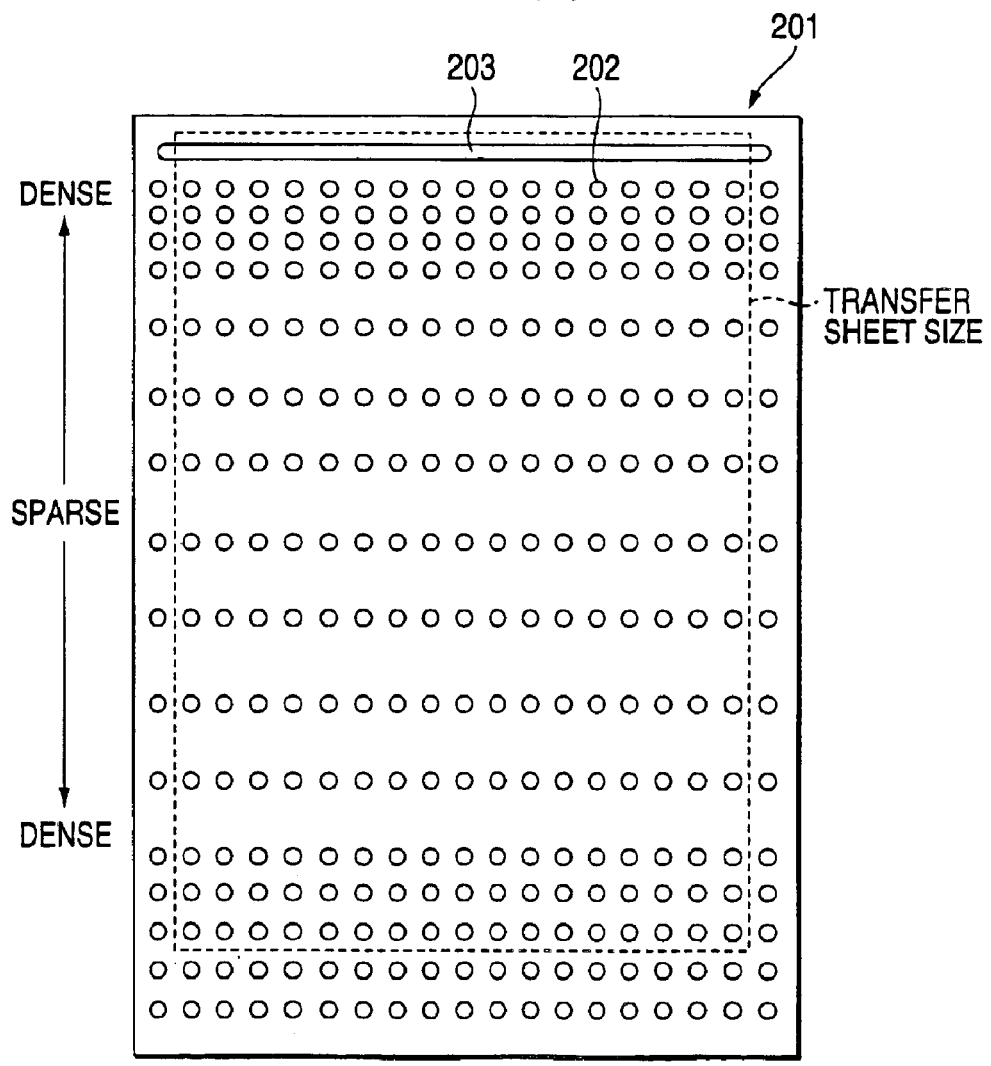

In FIG. 20, (a) is a perspective view showing an appearance according to an example of the specific structure of the separating roller 201 and (b) is a developed view showing an outer peripheral surface thereof. The separating roller 201 is constituted to be of such a type as to adsorb and hold the transfer sheet 7 by vacuum suction.

The separating roller 201 is set to have a greater circumferential length than a length in the longitudinal direction of the transfer sheet 7 (a length in the Y direction) and has a large number of sucking holes 202 for sucking the transfer sheet 7 on an outer peripheral surface. The sucking hole 202 is provided like a line in the axial direction of the separating roller 201 and each line is arranged in a circumferential direction at a predetermined interval. In this case, the distribution of the sucking hole 202 in the circumferential direction of the separating roller 201 has an arrangement density which is high to suck an end in the longitudinal direction of the transfer sheet 7 and is gradually reduced toward a position in which a middle portion in the longitudinal direction is sucked. The distribution of the density is formed by changing an interval in the circumferential direction of the line of the sucking hole 202. In particular, a sucking hole 203 in such a position as to suck the starting end of the transfer sheet 7 is formed as a groove hole coupling the sucking holes, thereby increasing an adsorbing force.

The separating roller 201 sucks outside air from the sucking holes 202 and 203 by applying a negative pressure to a space portion in the roller by means of a sucking source which is not shown (a vacuum pump or a blower), thereby adsorbing the transfer sheet 7 to come in contact with the outer peripheral surface. In this case, the sucking source such as the stage 27 can be used in common. In that case, switching means for switching a sucking path is provided.

While the separating roller 201 of such a type as to suck and hold the transfer sheet 7 by the vacuum suction has been described in the embodiment, it is also possible to employ a structure in which the separating roller may be provided with a mechanism capable of mechanically chucking the tip of the transfer sheet 7 to separate and hold the transfer sheet. In that case, the chucking mechanism can be driven by air or a motor. Moreover, it is also possible to employ a structure in which a holding member, for example, a spring is incorporated such that a chucking state can be always maintained even if an energy, for example, a power is not applied.

In order to carry out an operation for separating and holding the transfer sheet and returning the transfer sheet to the support member by a simple structure and manipulation, such a type as to adsorb and hold the transfer sheet 7 by the vacuum suction is more excellent than a type using the mechanical chucking mechanism.

Figure 21:
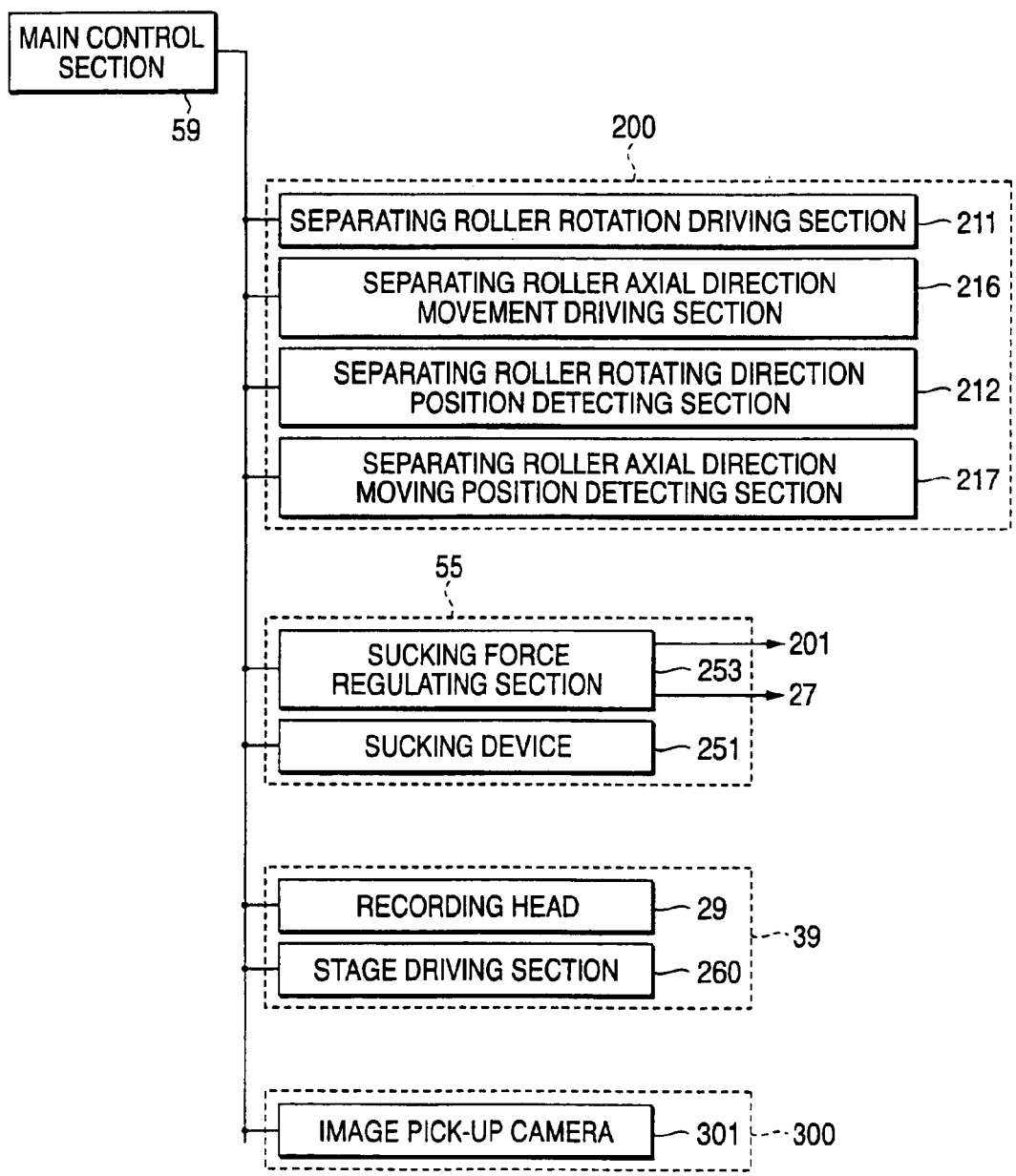
FIG. 21 is a diagram showing the partial structure of the control system of the recording apparatus comprising separating means.

FIG. 21 is a block diagram showing a control system including the second separating means 20. The second separating means 200 has a separating roller rotation driving section 211 for rotating the separating roller 201 and a separating roller rotating direction position detecting section 212 for detecting a position in the rotating direction of the separating roller 201. In the case in which the separating roller is constituted slidably in an axial direction as will be described below, moreover, the second separating means 200 has a separating roller axial direction movement driving section 216 and a separating roller axial direction moving position detecting section 217 for detecting a moving position in the axial direction of the separating roller. All of these components are connected to the main control section 59 and the main control section 59 gives a driving signal to each of the driving sections 211 and 216 based on the detection signal of each of the detecting sections 212 and 217, thereby controlling a position in the rotating direction and a position in the axial direction of the separating roller 201.

The separating roller rotating direction position detecting section 212 is constituted by an angle detecting device with high precision such as an encoder. Consequently, an accurate position in a rotating direction can be detected. In the case in which it is sufficient that a reference position in the rotating direction can be detected, moreover, the separating roller rotating direction position detecting section 212 can also be constituted by a simple sensor such as a photosensor. For the driving source of the separating roller rotation driving section 211, furthermore, it is preferable that a stepping motor or a servo motor should be employed in order to obtain high precision in a rotation and the easiness of control. In addition, it is also possible to further control a rotating position with high precision by combining a gear mechanism with various motors.

The second separating means 200 has, as another component, a roller moving mechanism for moving the separating roller 201 through a predetermined path and positioning means in order to carry out the operations for separating and returning the transfer sheet 7. Moreover, the second separating means 200 has a position detecting sensor for aligning the separating roller 201 above the position of the starting end of the transfer sheet 7. Thus, it is desirable that a sensor should be provided in a proper position to detect the position of the separating roller 201.

Moreover, the control system of the recording apparatus 100 is provided with a sucking device 251 and a sucking force regulating section 253 as components constituting the sucking source 55 as shown in FIG. 21. The sucking device 251 is formed by a vacuum pump or a blower and the sucking force regulating section 253 is formed by a combination of a passage switching valve and a flow rate regulating valve. Sucking rooms provided in the separating roller 201 and the stage 27 are connected to the sucking device 251 through the sucking force regulating section 253. Consequently, a sucking force can be regulated freely. In addition, a recording head 29 and a stage driving section 260 are provided as other elements of the recording section 39. The stage driving section 260 serves to move the stage 27 in X and Y directions.

Moreover, the recording apparatus 100 is provided with an image pick-up section 300 including an image pick-up camera (a CCD camera) 301 to be holding state detecting means for a transfer sheet. The image pick-up camera 301 confirms a last recording position (a recorded position) in the transfer sheet 7 when separating the transfer sheet 7 from the support member 23 by means of the separating roller 201 and holding the same transfer sheet 7. In the case in which the transfer sheet 7 is used for the recording operation twice or more, consequently, a next recording operation can be carried out so as not to overlap with the last recording position. In other words, the last recording position can be grasped accurately to provide for the next recording operation. The image pick-up data of the image pick-up camera 301 are sent to the main control section 59 and the main control section 59 analyzes the image pick-up data by a method such as an image processing, thereby calculating the recorded position of the transfer sheet 7, that is, a recording start position in the transfer sheet 7 and an inclination angle.

Figure 22:
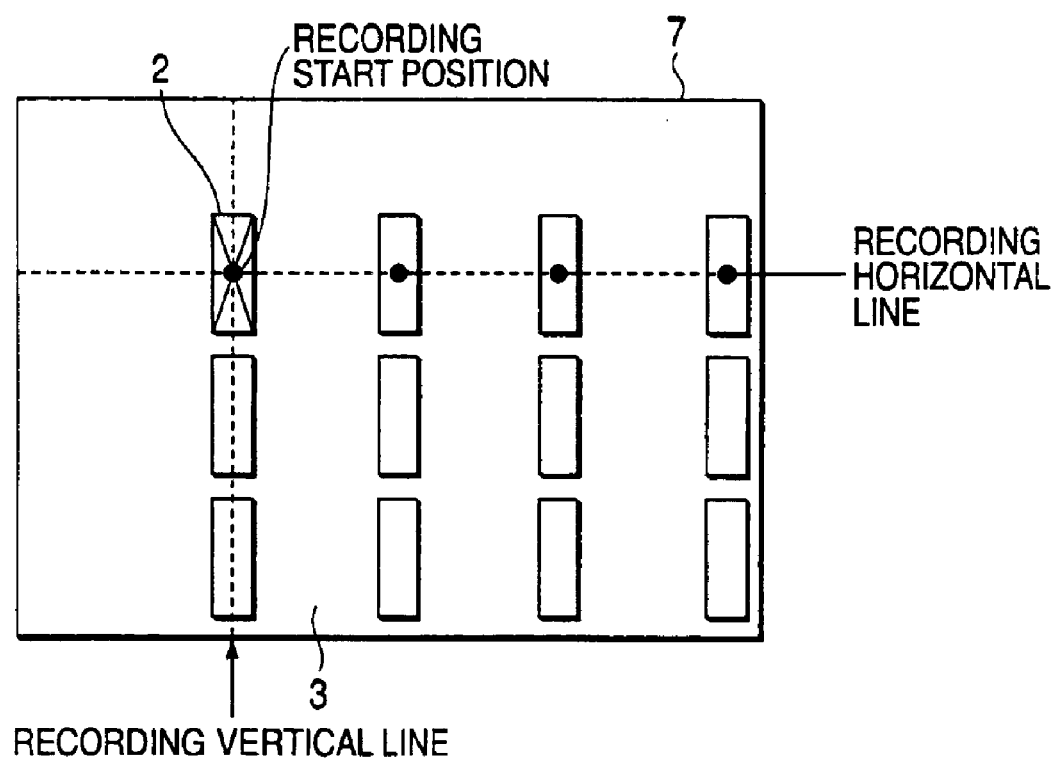
FIG. 22 is an explanatory view showing the detection item of a recorded position (a recorded section) on the transfer sheet.

FIG. 22 is an explanatory view showing the detection items of the recorded position (the recorded section 2) on the transfer sheet 7. For example, a recording mark shown in the drawing, that is, the recorded section 2 remains in the transfer sheet 7 subjected to a first recording operation. Information about a recording start position, information about a recording horizontal line and information about a recording vertical line are extracted from the image pick-up data of the recorded section 2. The recording start position is defined as a recording mark on a recording start end, that is, a rectangular center point in the example shown in the drawing. Moreover, the recording horizontal line is defined as a line passing through the center point of recording marks arranged in a transverse direction and the recording vertical like is defined as a line passing through the center point of recording marks arranged in a longitudinal direction. The degree of a shift of the recording position of the transfer sheet 7 from a reference point provided in the recording apparatus 100 itself in advance is apparent from the information about the recording start position. Furthermore, the degree of an inclination of the recording position of the transfer sheet 7, that is, a recording inclination angle with respect to a horizontal reference line and a vertical reference line provided in the recording apparatus 100 itself in advance is apparent from the information about the recording horizontal line and the recording vertical line.

In the case in which the transfer sheet 7 is separated and is then attached again to carry out the recording operation in an unrecorded section 3, first of all, a position for returning the transfer sheet 7 to the support member is corrected or image data to be recorded are corrected based on data on a last recording position thus detected. In other words, a correcting method includes a method of returning the transfer sheet 7 onto the next support member 23 while correcting a position and a method of reflecting data on a shift to correct image data to be recorded next. The former method of correcting the returning position of the transfer sheet 7 includes a method of changing and correcting the position of the separating roller 201 and the direction (angle) of a roller shaft and a method of changing and correcting the position of the stage 27 and a rotating angle in a horizontal plane when returning the transfer sheet 7 held by the separating roller 201 onto the stage 27.

In the case in which the position and angle of the separating roller 201 are changed to correct the position in which the held transfer sheet 7 is returned to the support member 23, the following operation can be carried out. First of all, the position of the separating roller 201 is changed by controlling a position in the rotating direction or controlling a position in an axial direction in the separating roller 201. Moreover, the angle of the separating roller is changed by rockably supporting the support shaft of the separating roller 201 in a horizontal direction (a parallel direction with an XY plane) in advance and carrying out an inclination by a necessary angle by means of an actuator such as an air cylinder. By controlling the position and inclination angle of the separating roller 201, thus, the transfer sheet 7 can be superposed on the support member 23 in the stage 27 in a state in which a recording start position and a recording inclination angle are corrected.

In the case in which the position in which the transfer sheet 7 held by the separating roller 201 is returned to the support member 23 is to be corrected by changing the position and angle of the stage 27, the following operation can be carried out. First of all, the position of the stage 27 is changed by displacing the stage 27 in the X and Y directions by means of the stage driving section 260. In addition, the angle of the stage 27 is changed by previously constituting the stage 27 rotatably at a minute angle in the XY plane to carry out a rotation by a necessary angle through an actuator such as a ball screw nut. By thus controlling the position and rotating angle of the stage 27, consequently, the transfer sheet 7 held by the separating roller 201 can be superposed on the support member 23 in the stage 27 in a state in which the recording start position and the recording inclination angle are corrected.

Figure 23:
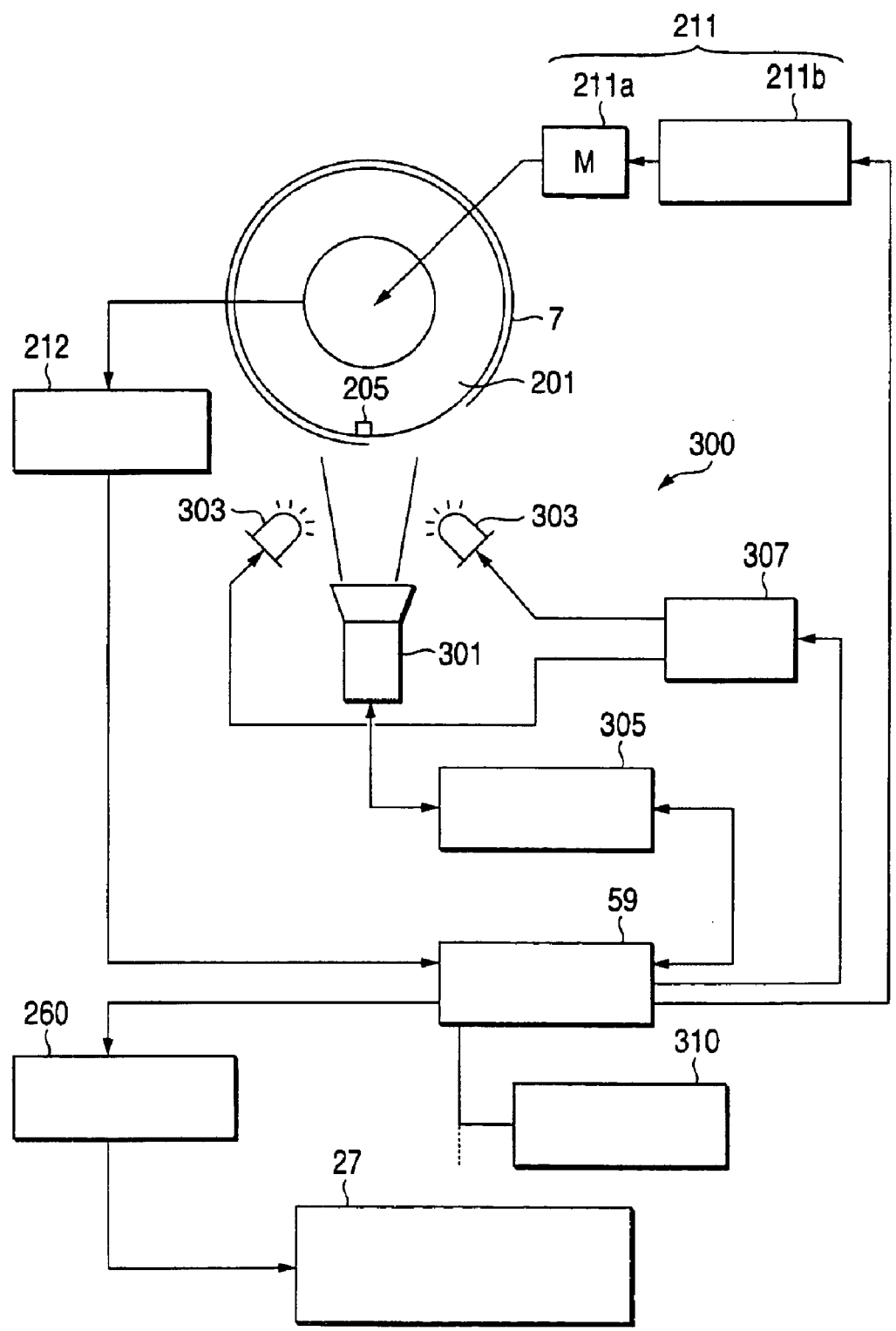
FIG. 23 is an explanatory view showing the control system, mainly illustrating an image pick-up section.

FIG. 23 is an explanatory view showing a control system, mainly illustrating the image pick-up section 300. The image pick-up section 300 has an image pick-up camera 301 for picking up the image of the periphery of the starting end of the transfer sheet 201 (the vicinity of the starting end adsorbing section 205) separated and held by the separating roller 201, a lamp 303 for illuminating a photographing object portion, an image pick-up control section 305 for controlling the image pick-up camera 301, and an illumination control section 307 for controlling the lamp 303. A control signal is input from the main control section 59 to the image pick-up control section 305 and the illumination control section 307 to control the image pick-up timing of the image pick-up camera 301 and the lighting timing of the lamp 303. Image pick-up data obtained by the image pick-up camera 301 are input to the main control section 59 and the main control section 59 analyzes the image pick-up data transmitted from the image pick-up camera 301, thereby detecting the last recording position on the transfer sheet 7. Based on the result of the detection, the position in which the transfer sheet 7 is returned to the next support member 23 is corrected.

For the operation to be carried out in the correction, for example, the main control section 59 transmits a signal to the roller rotation control section 211b in response to the signal of the rotating direction position detecting section 212 in the separating roller 201 and the separating roller 201 is rotated by an angle corresponding to the amount of the correction by means of the motor 211a. Moreover, the main control section 59 sends a driving signal to the stage driving section 260 to displace the stage 27 by an amount corresponding to the amount of the correction. The main control section 59 is additionally provided with an image memory 310 for storing image data necessary for carrying out a series of correcting operations.

By providing the rotating direction position detecting section 212 of the separating roller described above, the second separating means 200 controls the rotating position of the separating roller 201 with high precision when the adsorbed and held transfer sheet 7 is to be returned onto the recording surface of the support member 23. Consequently, it is possible to optionally and accurately change the returning position of the transfer sheet 7 to the recording surface of the support member 23. Accordingly, it is possible to return the transfer sheet 7 to the support member 23 delivered next while shifting the transfer sheet 7 over the separating roller 201 in a circumferential direction. This respect will be described below.

FIGS. 24(a) to 24(d) are explanatory views showing an operation in which the transfer sheet 7 is separated and held by using the separating roller 201, and FIGS. 26(a) to 26(f) are explanatory views showing an operation in which the held transfer sheet 7 is returned on to the support member 23 delivered next onto the stage 27 and is superposed thereon.

Figure 24:
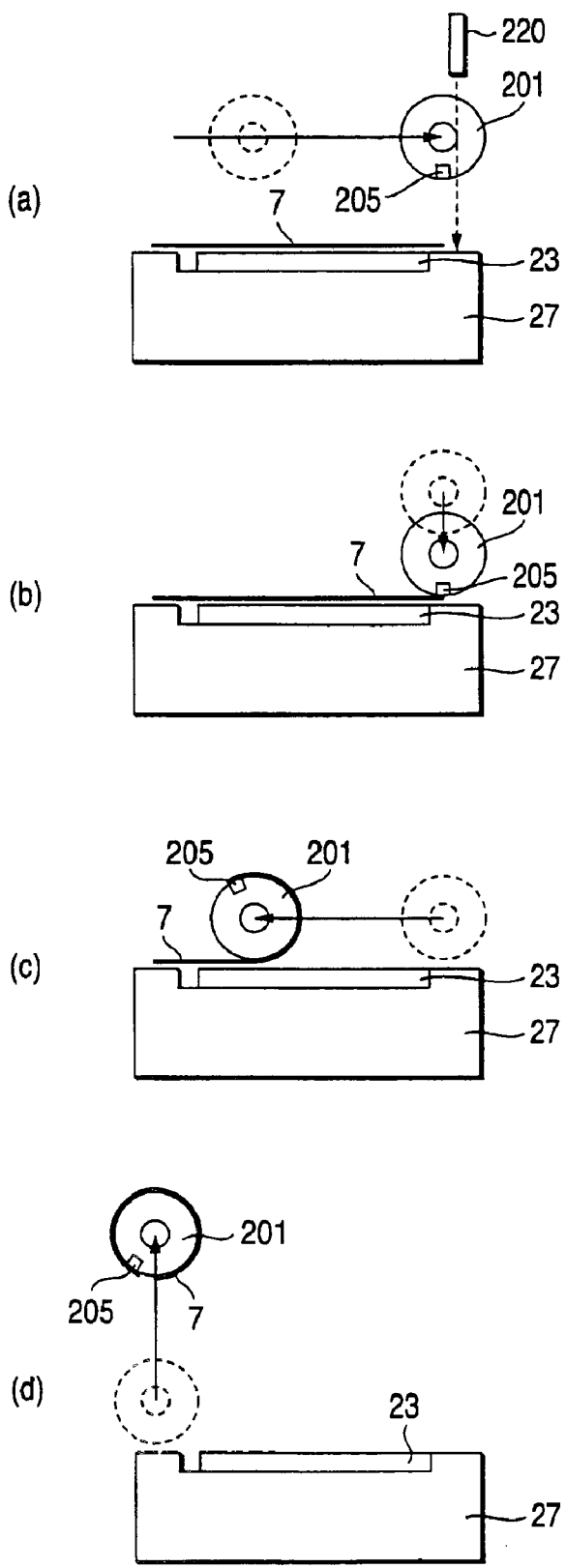
FIG. 24 is an explanatory view showing a process for the separating operation to be carried out by the separating roller in order of (a) to (d)

In the case in which the transfer sheet 7 used for the recording operation over the support member 23 is to be temporarily separated and held, first of all, the separating roller 201 is moved to the upper part of the starting end of the transfer sheet 7 as shown in FIG. 24(a). In that case, the signal of the position detecting sensor 220 is used for positioning. When the separating roller 201 is moved to the upper part of the starting end of the transfer sheet 7, the starting end adsorbing section 205 of the separating roller 201 (corresponding to a portion in which the sucking hole 203 to be a groove hole is formed) is positioned just above the starting end of the transfer sheet 7 and the separating roller 201 is moved downward in that state. As shown in FIG. 24(b), consequently, the starting end adsorbing section 205 of the separating roller 201 is caused to come in contact with the upper surface of the starting end of the transfer sheet 7. In this state, a vacuum sucking force is applied to the separating roller 201, thereby adsorbing the starting end of the transfer sheet 7.

Next, the separating roller 201 and the stage 27 are relatively moved in a Y direction at a speed corresponding to the circumferential speed of the separating roller 201 while the separating roller 201 is rotated in a winding direction in that state. As shown in FIG. 24(c), consequently, the transfer sheet 7 receives a sucking force from the outer peripheral surface of the separating roller 201 and is thereby wound upon the outer peripheral surface of the separating roller 201. When the whole length reaching a terminal end is adsorbed, the separating roller 201 is moved upward and is retreated to a storage position as shown in FIG. 24(d). In the storage state, almost all the sucking holes 202 are blocked by the transfer sheet 7, resulting in the maintenance of a state in which the sucking force is limited to be constant.

In such a separating operation, each of the sucking force of the separating roller 201 and the sucking force of the stage 27 (adsorbing the peripheral edge portion of the transfer sheet 7) is controlled to wind the transfer sheet 7 without strain. For example, the sucking force of the stage 27 is gradually reduced in accordance with the progress of the winding in a state in which the sucking force of the separating roller 201 is maximized. Thus, the transfer sheet 7 is wound up. Moreover, it is also possible to easily carry out the separation by using the separating click 131 together. In the case in which the mechanical chucking mechanism is used in place of a vacuum sucking type chucking mechanism, furthermore, chucking can easily be carried out by interlocking the fixation of the transfer sheet 7 at time of the start of the separation with the motion of the separating click 131.

Figure 25:
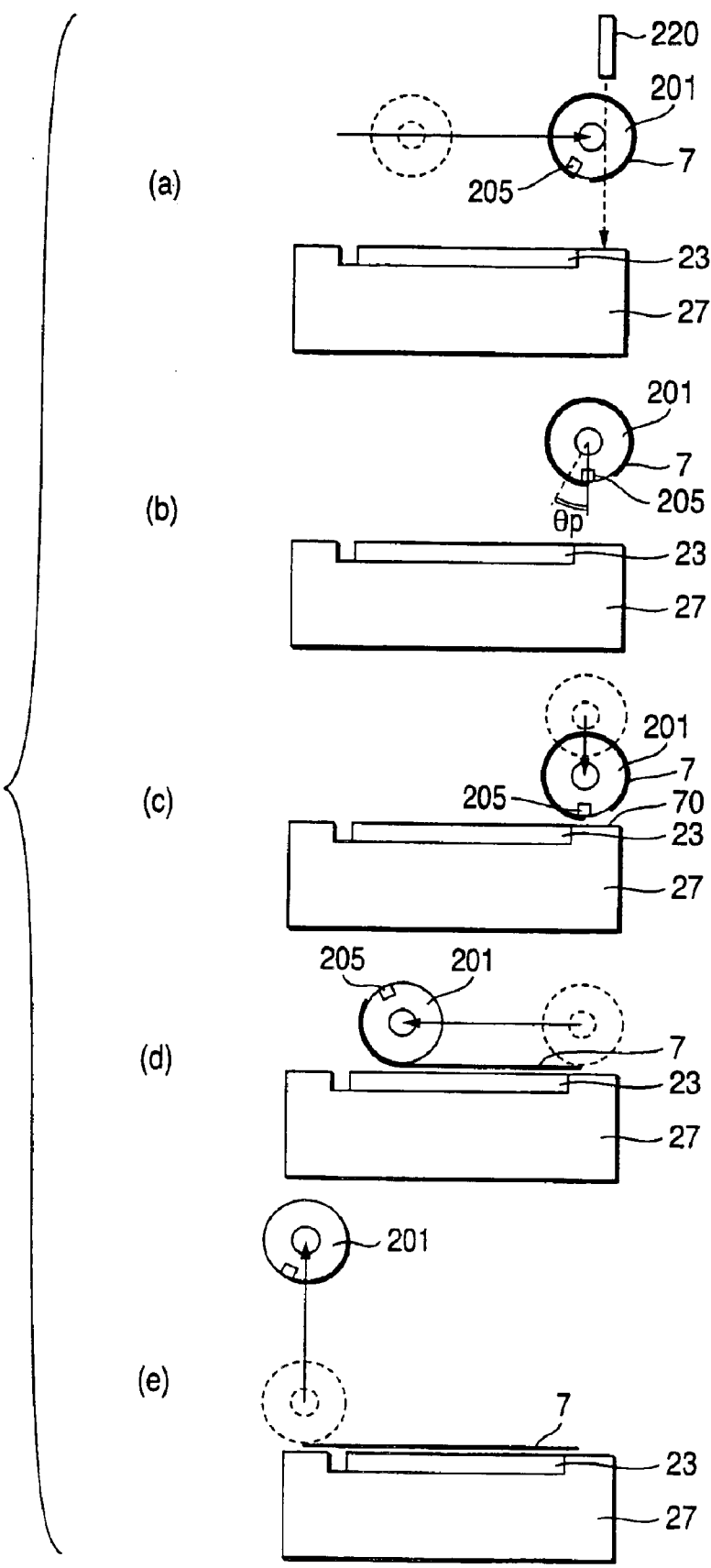
FIG. 25 is an explanatory view showing an operation to be carried out when the separated transfer sheet is superposed on the support member which is then delivered onto the stage in order of (a) to (e)

Next, in the case in which the transfer sheet 7 held on the outer peripheral surface of the separating roller 201 is to be returned to the upper surface of the support member 23 delivered newly onto the stage 27, the separating roller 201 is moved and stopped by using the position detecting sensor 220 provided above the starting end in a position on the stage 27 to which the transfer sheet 7 is to be returned as shown in FIG. 25(a). When the separating roller 201 is stopped, a rotating angle θp of the separating roller 201 is controlled in such a manner that the sucking hole 203 is set to be a lowermost portion. Thus, the starting end adsorbing section 205 adsorbing and holding the starting end of the transfer sheet 7 is positioned just above the position on the stage 27 to which the starting end of the transfer sheet 7 is to be returned. In this case, the position to which the starting end of the transfer sheet 7 is to be returned is the bank section 70 provided on the peripheral edge of the concave section 71 for accommodating the support member 23, and the sucking hole 77 is formed so that the transfer sheet 7 can be adsorbed.

In that state, next, the separating roller 201 is moved downward. As shown in FIG. 25(c), consequently, the starting end of the transfer sheet 7 wound and held on the outer periphery of the separating roller 201 is caused to come in contact with the starting end side portion (the right end in the drawing) of the stage 27. In this state, the vacuum sucking force is applied to the stage 27 to adsorb the starting end of the transfer sheet 7 onto the stage 27.

Subsequently, the sucking force of the separating roller 201 is gradually reduced, and at the same time, the separating roller 201 is rotated in a rewinding direction (=the same direction as the winding direction because the transfer sheet 7 is rewound from the starting end) as shown in FIG. 25(d), and furthermore, the separating roller 201 and the stage 27 are relatively moved in a Y direction at a speed corresponding to the circumferential speed of the separating roller 201. Consequently, the transfer sheet 7 is returned onto the support member 23. When carrying out the return up to the terminal end, the separating roller 201 is moved upward to stand by in the initial position as shown in FIG. 25(e).

When the transfer sheet 7 is to be returned on to the support member 23 delivered newly onto the stage 27, thus, the rotating angle of the separating roller 201 can be controlled with high precision. Consequently, it is possible to optionally return the transfer sheet 7 to almost the same position as that in previous separation or return the transfer sheet 7 by shifting a position in the circumferential direction (the longitudinal direction of the transfer sheet 7) as in the previous separation.

In the case in which a chucking mechanism of a mechanical type is used, it is preferable that the chucking of the transfer sheet 7 should be released to turn ON the suction of the stage 27 at time of the start of the return of the transfer sheet 7. In that case, if a pressing mechanism for pressing the starting end of the transfer sheet 7 is provided in a tip portion in a position on the stage 27 side to which the transfer sheet 7 is to be returned, the return can be carried out by a stabler operation.

For the control of the stoppage of the separating roller 201 in FIGS. 24(a) and 25(a), moreover, it is possible to employ any method of carrying out stoppage by mechanical knocking or by means of a limit switch or controlling a stop position by means of a linear position sensor in addition to the method using the position detecting sensor 220.

Figure 26:
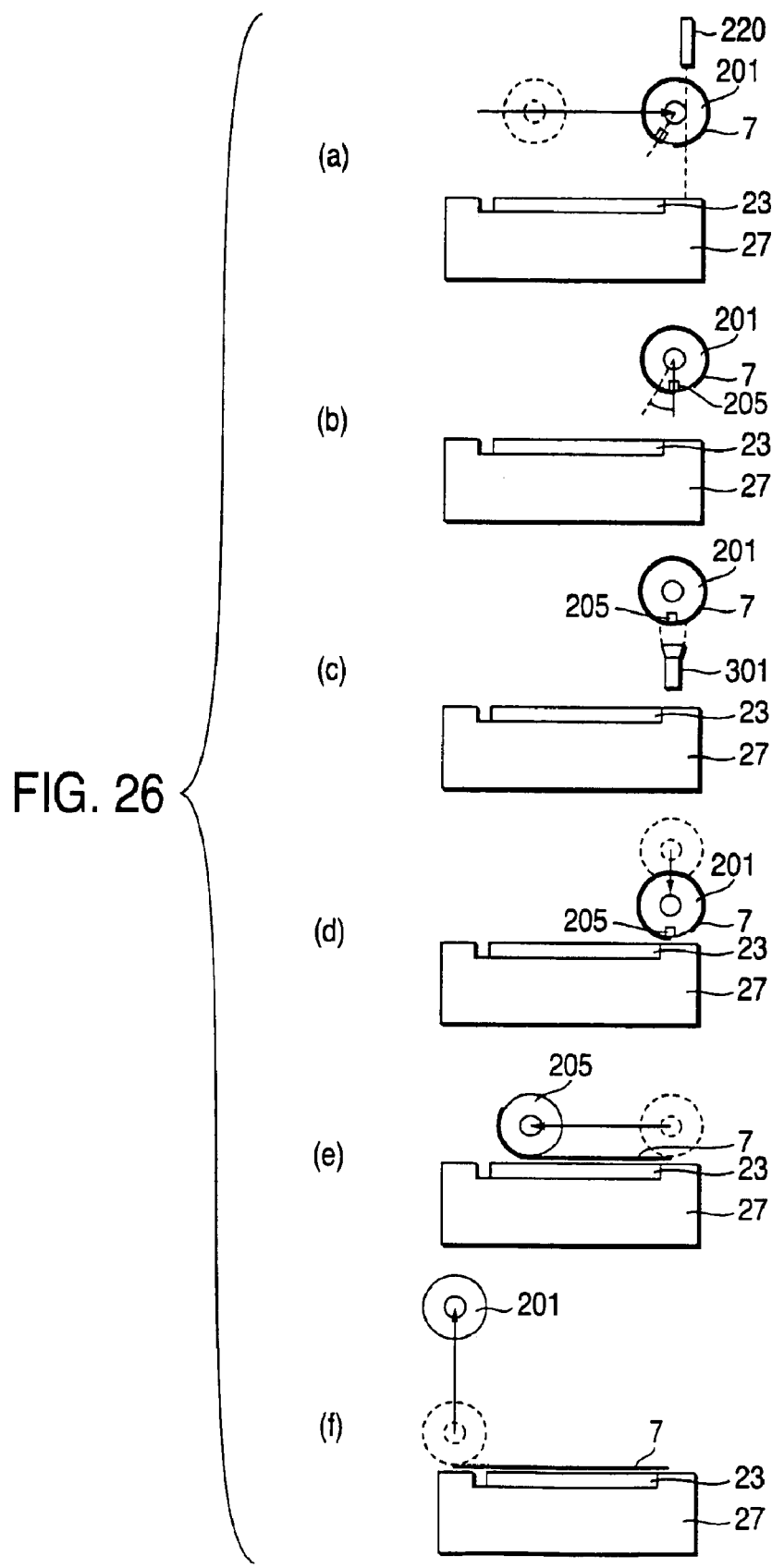
FIG. 26 is an explanatory view showing an operation to be carried out when the separated transfer sheet is superposed on the support member which is next delivered onto the stage in order of (a) to (f)

Next, in the case in which the transfer sheet 7 held on the outer peripheral surface of the separating roller 201 is to be returned to the upper surface of the support member 23 delivered newly onto the stage 27, the separating roller 201 is moved to the upper part of the starting end of the position on the stage 27 in which the transfer sheet 7 is to be returned as shown in FIG. 26(a). When the separating roller 201 is moved, the rotating angle of the separating roller 201 is controlled as shown in FIG. 26(b). Thus, the starting end adsorbing section 205 adsorbing and holding the starting end of the transfer sheet 7 is positioned just above the position on the stage 27 in which the starting end of the transfer sheet 7 is to be returned. In this case, the position in which the starting end of the transfer sheet 7 is to be returned is the bank section 70 provided on the peripheral edge of the concave section 71 for accommodating the support member 23, and the sucking hole 77 is formed so that the transfer sheet 7 can be adsorbed.

In that state, next, the image pick-up camera 301 is provided under the separating roller 201 as shown in FIG. 26(c) and the image on the periphery of the starting end of the transfer sheet 7 held by the separating roller 201 is thus picked up by means of the image pick-up camera 301. Based on the image data, a last recording position on the transfer sheet 7 held by the separating roller 201 is detected. Based on the result of the detection, next, the position of the separating roller 201 or the stage 27 is corrected and the separating roller 201 is moved downward in that state. As shown in FIG. 26(d), consequently, the starting end of the transfer sheet 7 wound and held on the outer periphery of the separating roller 201 is caused to come in contact with the starting end side portion (the right end in the drawing) of the stage 27. In this state, the vacuum sucking force is applied to the stage 27 to adsorb the starting end of the transfer sheet 7 onto the stage 27.

Subsequently, the sucking force of the separating roller 201 is gradually reduced, and at the same time, the separating roller 201 is rotated in a rewinding direction (=the same direction as the winding direction because the transfer sheet 7 is rewound from the starting end) in that condition as shown in FIG. 26(e), and furthermore, the separating roller 201 and the stage 27 are relatively moved in a Y direction at a speed corresponding to the circumferential speed of the separating roller 201. Consequently, the transfer sheet 7 is returned onto the support member 23. When carrying out the return up to the terminal end, the separating roller 201 is moved upward to stand by in the initial position as shown in FIG. 26(f).

When the transfer sheet 7 is to be returned onto the support member 23 which is newly delivered onto the stage 27, thus, the rotating angle of the separating roller 201 can be controlled with high precision. Consequently, it is possible to return the transfer sheet 7 to almost the same position as that in previous separation or to return the transfer sheet 7 by shifting a position in the circumferential direction (the longitudinal direction of the transfer sheet 7) as in the previous separation. In addition, the last recording position can be grasped accurately based on the image of the image pick-up camera 301. Therefore, it is possible to correct a shift from the reference position of the recording position and to then return the transfer sheet 7 onto the support member 23.

In the case in which the chucking mechanism of a mechanical type is used, it is preferable that the chucking of the transfer sheet 7 should be released to turn ON the suction of the stage 27 at time of the start of the return of the transfer sheet 7. In that case, if a pressing mechanism for pressing the starting end of the transfer sheet 7 is provided in a tip portion in a position on the stage 27 side to which the transfer sheet 7 is to be returned, the return can be carried out by a stabler operation.

For the control of the stoppage of the separating roller 201 in FIGS. 24(a) and 25(a), it is possible to employ any method of carrying out stoppage by mechanical knocking or by means of a limit switch or controlling a stop position by means of a linear position sensor in addition to the method of the position detecting sensor 220.

Next, description will be given to an example of a structure of a separating roller capable of shifting a position in the X direction and returning a transfer sheet held on an outer peripheral surface onto the stage 27.

Figure 27:
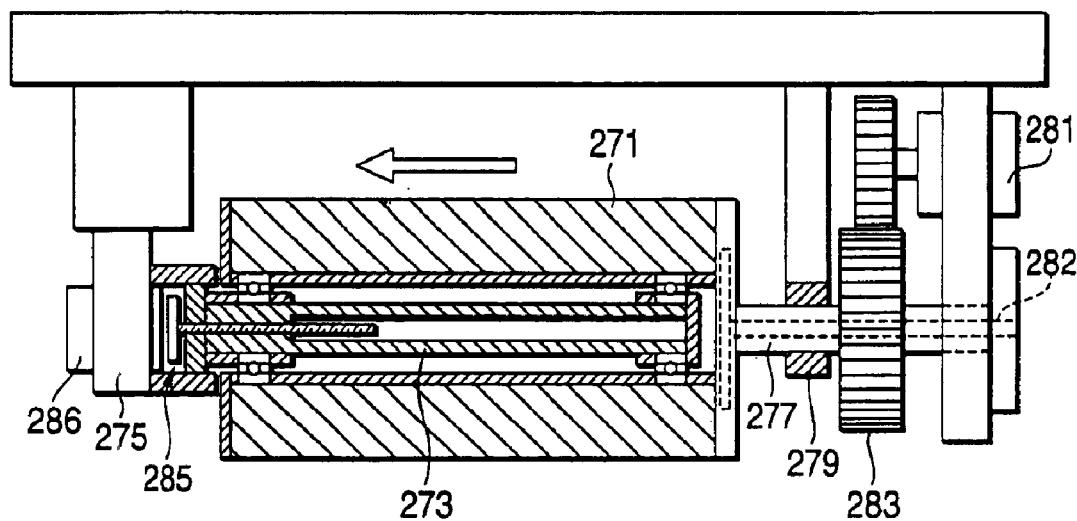
FIGS. 27(a) and 27(b) are views showing a structure according to an example of the separating roller constituted slidably in an axial direction.
Figure 27:
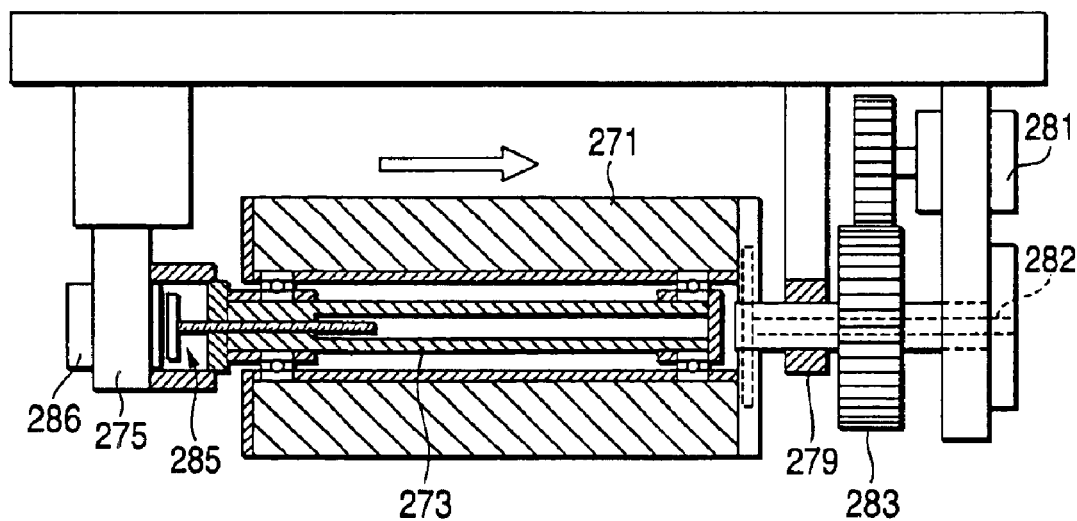

FIG. 27 shows an example of a separating roller 271 constituted slidably in its own axial direction. The separating roller 271 is attached rotatably to the periphery of a support shaft 273 inserted therein, and one of the ends of the support shaft 273 is fixed movably in an axial direction with respect to a bracket 275. Moreover, a shaft section 277 provided on the other end of the separating roller 271 is rotatably supported on the other bracket 279 to drive a motor 281 so that the separating roller 271 can be rotated through a gear 283. Moreover, 285 in the drawing denotes a slide driving section for displacing the support shaft 273 in an axial direction. By rotating a motor 286 of the slide driving section 285, it is possible to slide the separating roller 271 attached to the support shaft 273 in an axial direction between a left end position shown in FIG. 27(a) and a right end position shown in FIG. 27(b) (which corresponds to the separating roller axial direction movement driving section 216). In the case in which the vacuum sucking method is employed, an internal space 282 of the separating roller 271 is connected to a sucking source.

The support mechanism of the separating roller 271 is provided with the separating roller axial direction moving position detecting section 217 which is not shown. Thus, the separating roller 271 can be positioned and stopped in any position in an axial direction. For example, it is desirable to employ such a structure as to set at least stop positions of an initial position and a position placed apart from the initial position at one pitch and 1.5 pitches at the arrangement pitch of the stripe shape. Moreover, it is preferable that the stoppage can be carried out in any position in order to have a corresponding flexibility.

By using the mechanism described above, detailed description will be given to the recording method according to the invention in which one transfer sheet is used for plural recording operations.

In the recording method according to the invention, the transfer sheet 7 is separated from the support member 23 and the transfer sheet 7 thus separated is held, and a recording position at and before a last time in the transfer sheet thus held is detected and the separated transfer sheet 7 is returned and superposed on the recording surface of the support member 23 which is then delivered so that the returning position of the transfer sheet is changed based on the result of the detection of the recording position or image data to be recorded are changed, thereby carrying out the recording operation over the support member 23 by using an unrecorded section present between the recorded stripes of the transfer sheet 7.

Description will be given to some examples in which a shifting way for recording in an unrecorded section is varied and some examples in which a correcting way based on the result of the detection of a recording position at and before a last time is varied. The following description will be given on the assumption that a final image to be a forming object is a pattern image in which red, green and blue stripes having the same width are provided at an equal pitch in order and the red stripe is recorded, for example.

(First Recording Method)

Figure 28:
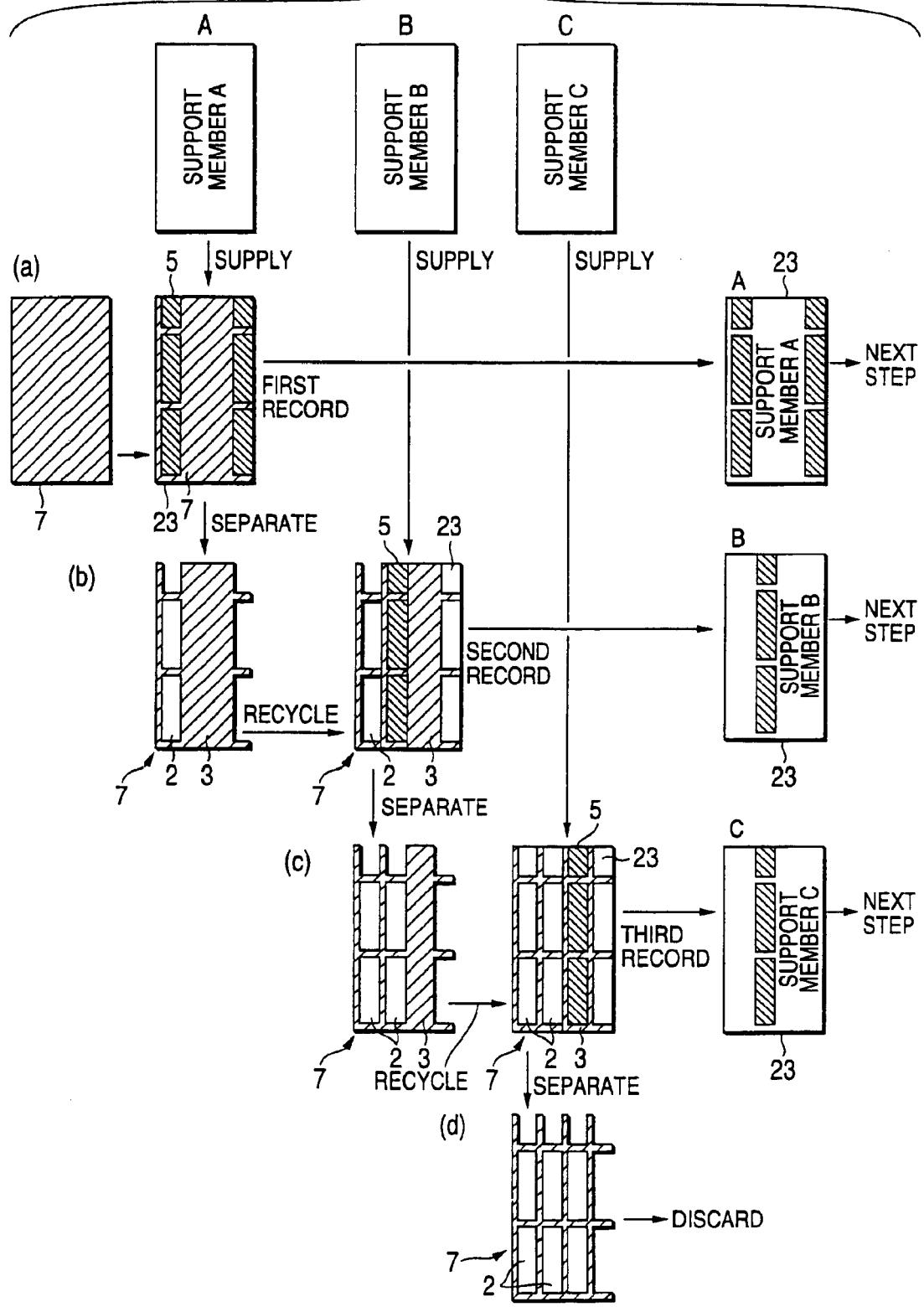
FIG. 28 is an explanatory view showing a first recording method of carrying out a recording operation by shifting a recording position at one arrangement pitch of a stripe shape.
Figure 29:
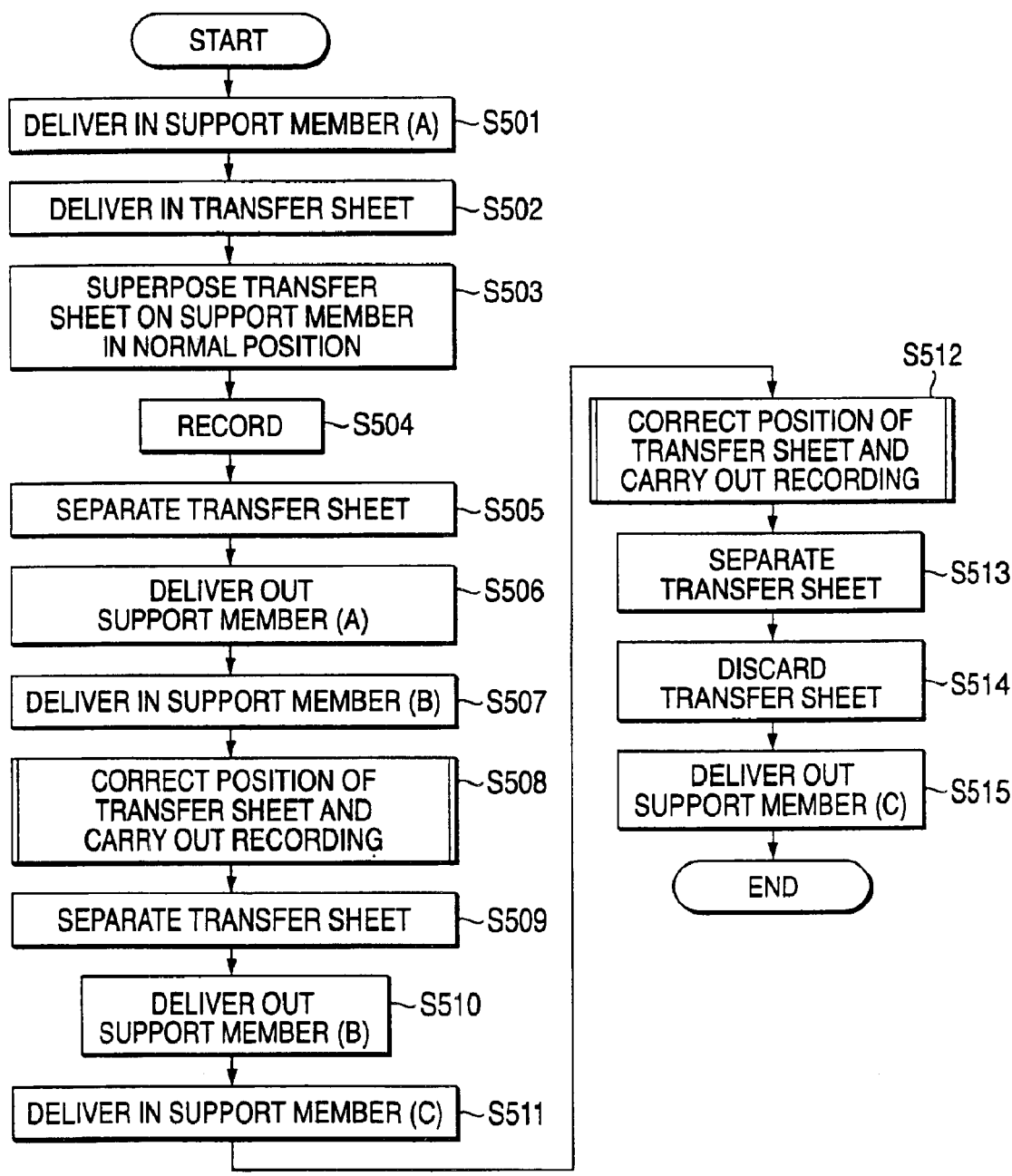
FIG. 29 is a flowchart showing operation order in the execution of the first recording method.
Figure 30:
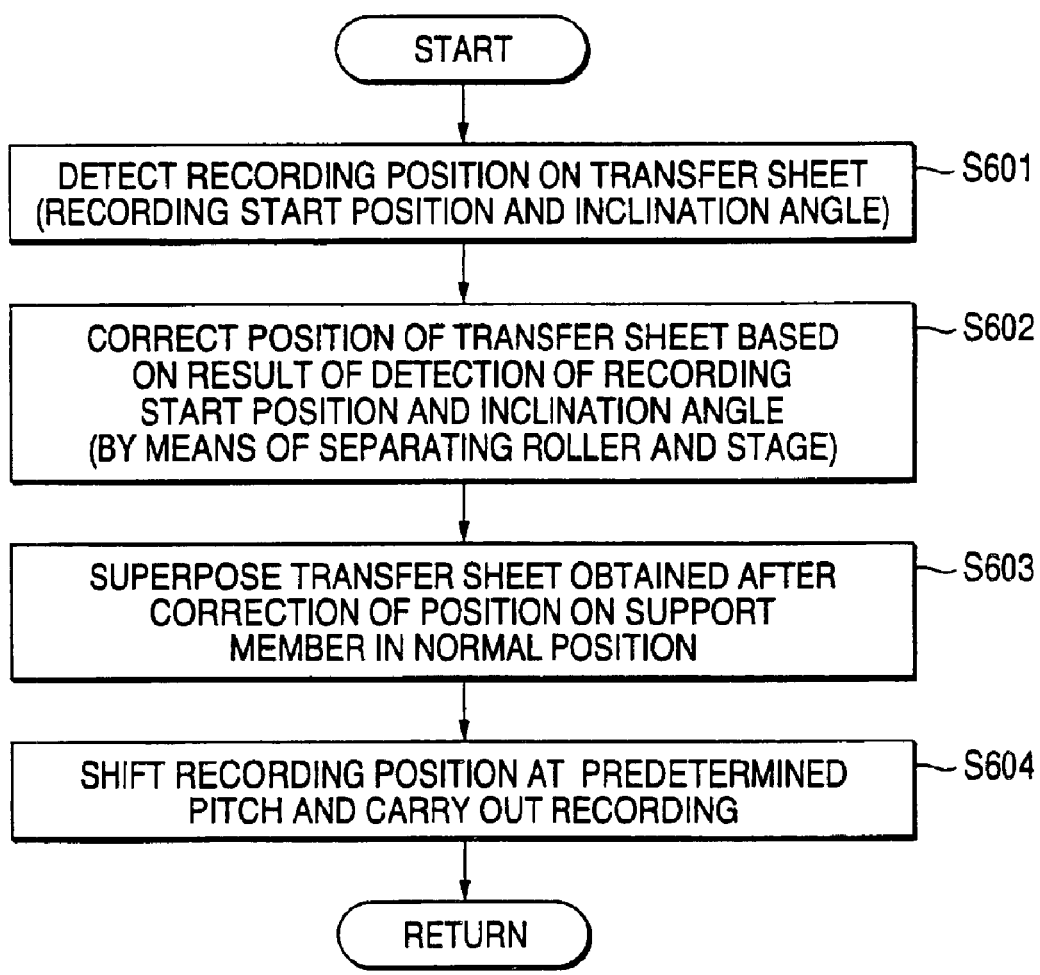
FIG. 30 is a flowchart showing the contents of the specific processings of S508 and S512 in FIG. 29.
Figure 31:
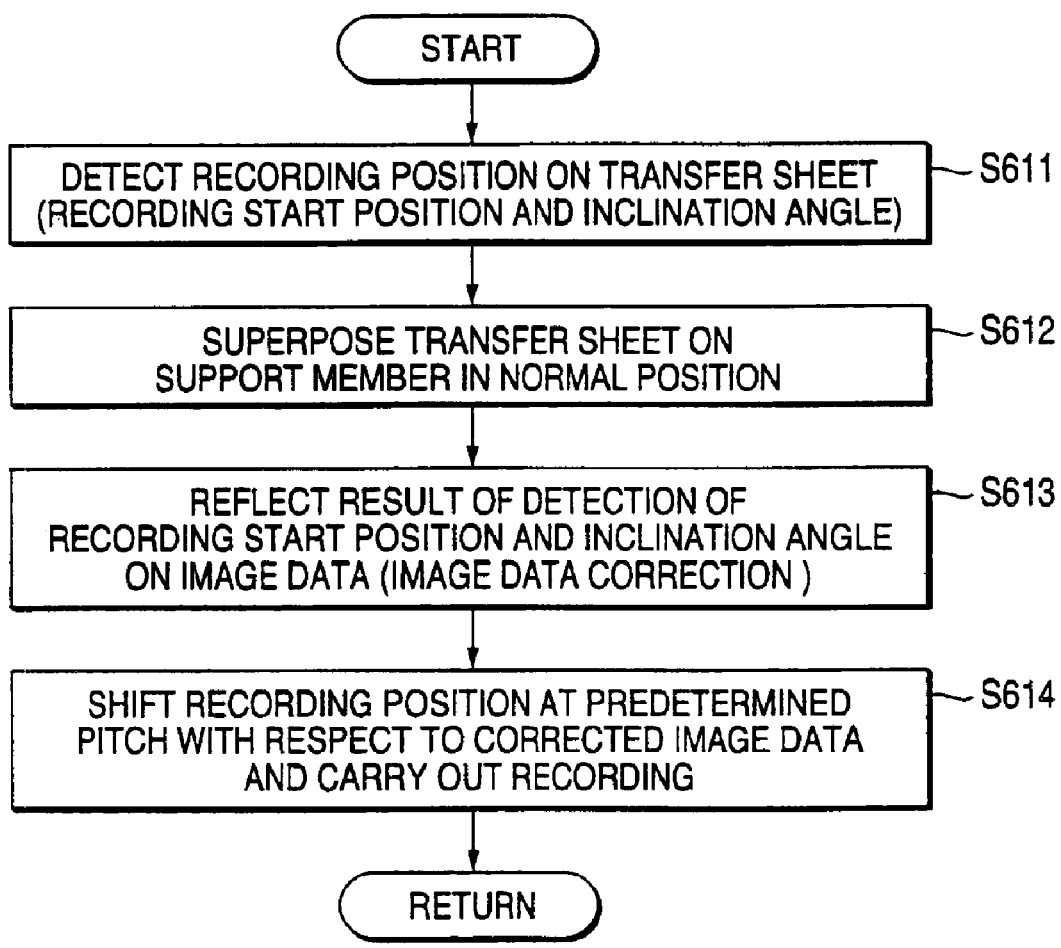
FIG. 31 is a flowchart showing the contents of other specific processings of the S508 and the S512 in FIG. 29.

FIG. 28 is an explanatory view showing a first recording method and FIGS. 29 to 31 are flowcharts showing operation order in the execution of the same method.

In the first recording method, the transfer sheet 7 is superposed on the recording surface of the support member (support member A) 23 to carry out a first recording operation as shown in FIG. 28(a). As a result, the transfer sheet 7 shown in FIG. 28(b) is obtained after separation from the support member A. An unrecorded section (a usable region) 3 having a larger size than an area corresponding to two stripes remains between the recorded stripe sections (decolorized and recorded sections 2) in the transfer sheet 7.

As shown in FIG. 28(b), in superposition on a next support member B, the separated and held transfer sheet 7 is returned in almost the same position as that set before the separation over the recording surface of the support member B and a recording position 5 is shifted at one pitch at the arrangement pitch of a stripe in a direction orthogonal to the longitudinal direction of a stripe shape (the lateral direction of the stripe=a transverse direction in the drawing), thereby carrying out the recording operation. More specifically, a correction is carried out over image data including the stripe shape in order to give an instruction for a translation corresponding to one pitch of a stripe width. Consequently, the recording position 5 is shifted a tone pitch to carry out a second recording operation. Thus, the recording operation is carried out over the support member B by using the unrecorded section 3 present between the recorded stripes.

When the transfer sheet 7 is separated from the support member A, the position of the transfer sheet 7 is shifted depending on the way of the separation. For this reason, it is necessary to previously grasp the range of the shift of the position. Alternatively, it is necessary to accurately grasp a last recording position in order to precisely perform a next recording operation. In the recording method, the image of the periphery of the starting end of the transfer sheet 7 is picked up by means of an image pick-up camera in a holding state on the outer periphery of the separating roller 201 as described above, and a last recording position is detected from the image thus picked up. Based on the result of the detection of the recording position, then, the returning position of the transfer sheet 7 to the next support member B and image data to be recorded are corrected to carry out the recording operation.

As a result of the second recording operation, thus, the transfer sheet 7 shown in FIG. 28(c) is obtained after the separation from the support member 23. The unrecorded section (the usable region) 3 having a larger size than an area corresponding to one stripe remains between recorded stripe sections (the decolorized and recorded sections 2) in the transfer sheet 7.

As shown in FIG. 28(c), at a third time, in superposition on a next support member C, the separated and held transfer sheet 7 is returned in almost the same position as that set before the separation over the recording surface of the support member C and the recording position 5 is then shifted at one more arrangement pitch of a stripe shape in a direction orthogonal to the longitudinal direction of the stripe shape (the lateral direction of the stripe shape=a transverse direction in the drawing), thereby carrying out the recording operation. Thus, the recording operation is carried out over the support member 23 by using the unrecorded section 3 remaining in the last two recording operations. Also in this case, the same correction as that in the last time is executed to carry out the recording operation.

When the third recording operation is ended, the unrecorded section of the transfer sheet 7 becomes narrower than the region of the stripe shape to be recorded as shown in FIG. 28(d). Based on the basic operation described above, that is, the basic operation using the sucker line 125 and the separating click 131, therefore, the transfer sheet 7 is discharged to the discarding box 37.

The transfer sheet 7 is not discarded till the stage in which the three recording operations are carried out over one transfer sheet 7 and the unrecorded region which can be used after the third recording operation is lessened. Consequently, the transfer sheet 7 can be used up efficiently. Thus, the transfer sheet 7 can be utilized effectively. As a result, moreover, the number of the transfer sheets 7 to be used can be decreased. Therefore, a manufacturing cost can be reduced.

In a state in which the transfer sheet 7 separated from the support member 23 is held, furthermore, the last recording position for the transfer sheet 7 is detected and the returning position of the transfer sheet 7 to the next support member 23 is changed and the image data to be recorded are varied based on the result of the detection of the recording position. Consequently, the next recording operation can be carried out in a proper position even if the position of the transfer sheet 7 is slightly shifted in the separation from the last support member 23. Accordingly, the recording operation using the unrecorded section 3 of the transfer sheet 7 can be carried out with high precision and a reliability can be enhanced when one transfer sheet 7 is used for the recording operation plural times.

Next, the operation will be described with reference to the flowchart of FIG. 29. First of all, a support member A to be subjected to a first recording operation is delivered onto the stage 27 at a step 501 (which will be hereinafter referred to as S501). Then, the transfer sheet 7 is delivered onto the support member A (S502) and is superposed on the support member A in a normal position (S503). In this state, the first recording operation is carried out (S504). For simplicity, the description of the delivery-in of an image receiving sheet will be omitted.

Next, the transfer sheet 7 is separated from the support member A after the first recording operation is ended (S505) and the recorded support member A is delivered out (S506). In a procedure for separating the transfer sheet 7, the separating roller 201 is used. When the first support member A is delivered out, a support member B to be subjected to a second recording operation is delivered onto the stage 27 (S507). Subsequently, the transfer sheet 7 held by the separating roller 201 is returned and superposed on the support member B and the second recording operation is carried out in this state (S508). In that case, the position of the transfer sheet 7 is corrected and the recording operation is then carried out. The specific contents of the processing at the step 508 are shown in FIG. 30 or 30.

In a routine shown in FIG. 30, first of all, a last recording position on the transfer sheet 7 held by the separating roller 201, that is, a recording start position and an inclination angle are detected (S601). Next, the position of the transfer sheet 7 is corrected based on the result of the detection (S602). The correction of a position may be carried out by controlling the separating roller 201 side or the stage 27 side as described above. In any case, the transfer sheet 7 is superposed on the support member B in a normal position in a state in which the correction of the position is executed (S603). Then, the recording operation is carried out in this state (S604). In that case, a recording position is shifted at one arrangement pitch of a stripe shape, thereby carrying out the recording operation.

On the other hand, in another routine shown in FIG. 31, a last recording position on the transfer sheet 7 held by the separating roller 201, that is, a recording start position and an inclination angle are first detected (S611). Next, the transfer sheet 7 is returned and superposed on the support member B in a normal position (S612). Then, image data to be recorded next are corrected in order to reflect the result of the detection of the recording start position and the inclination angle (S613). The correction processing is equivalent to the execution of the correction of the position of the transfer sheet 7. Subsequently, the recording operation is carried out based on the image data thus corrected (S614). In that case, addition and correction are carried out over the corrected image data with the recording position shifted at one more arrangement pitch of the stripe and the recording operation is thus executed.

Returning to FIG. 29, when the second recording operation is ended at S508, the transfer sheet 7 is separated from the support member B (S509) and the recorded support member B is delivered out (S510). When the second support member B is delivered out, a next support member C to be subjected to a third recording operation is delivered onto the stage 27 (S511). Next, the transfer sheet 7 held by the separating roller 201 is returned and superposed on the support member C and a third recording operation is carried out in this state (S512). In that case, in the same manner as in S508, a routine shown in FIG. 30 or 30 is executed. More specifically, the position of the transfer sheet 7 is corrected, and furthermore, the recording operation is carried out over the transfer sheet 7 with the recording position shifted at one more arrangement pitch of the stripe.

When the third recording operation is ended, the transfer sheet 7 is separated from the support member C based on the basic operation (S513), the transfer sheet 7 is discarded (S514) and the recorded support member C is delivered out (S515).

The third recording operation is carried out over one transfer sheet 7 and the transfer sheet 7 is discharged for the first time in a stage in which the unrecorded region which can be used after the third recording operation is lessened. Therefore, the transfer sheet 7 can be used up efficiently. Thus, the transfer sheet 7 can be utilized effectively. As a result, the number of the transfer sheets 7 to be used can be decreased. Consequently, a manufacturing cost can be reduced.

While there has been described the case in which the recording operation is carried out with the recording position shifted at one arrangement pitch of the stripe in the first recording method, the recording operation may be carried out by shifting the recording position corresponding to 1.5 pitches.

(Second Recording Method)

Figure 32:
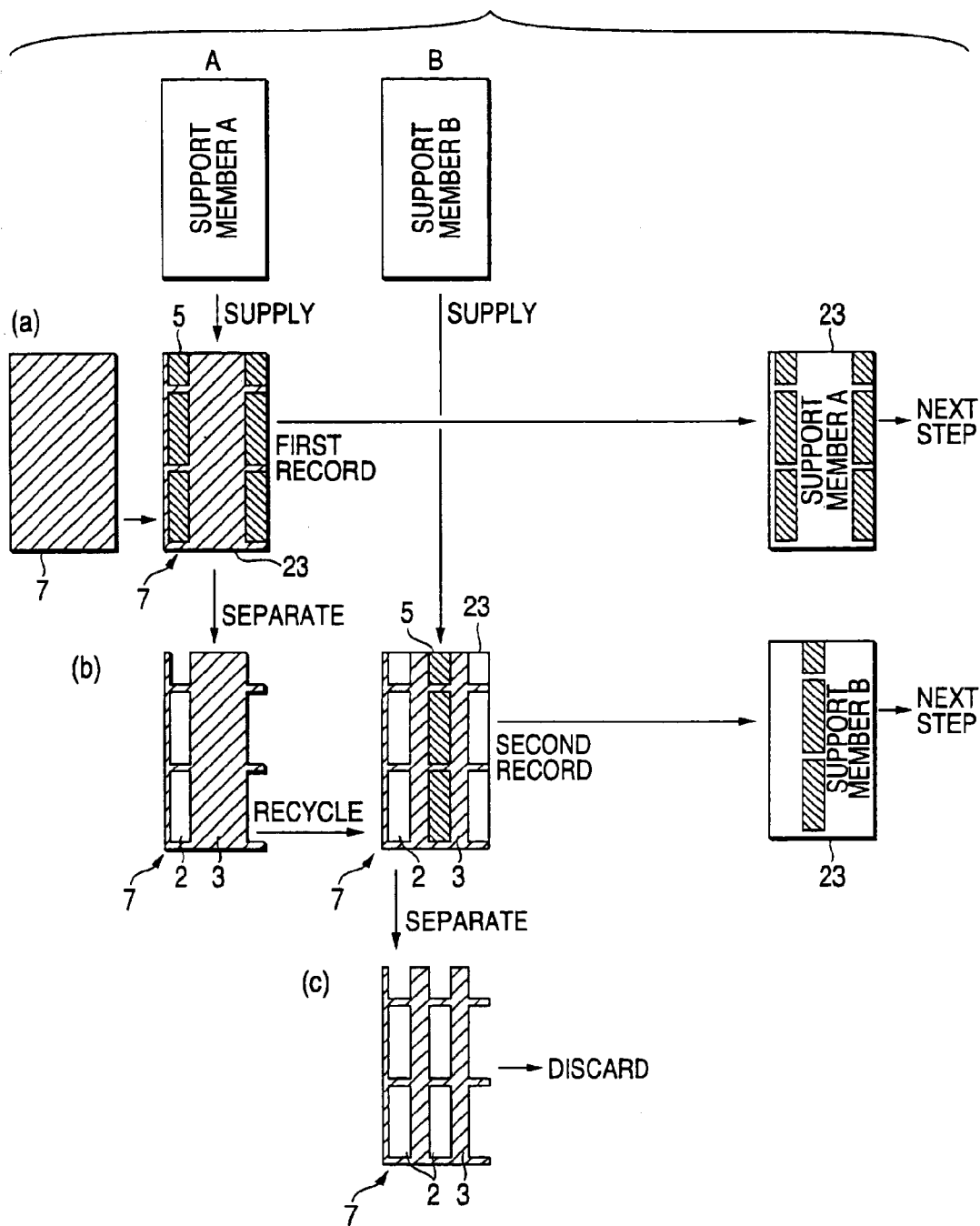
FIG. 32 is an explanatory view showing a second recording method of carrying out the recording operation by shifting the recording position at 1.5 arrangement pitches of the stripe shape.
Figure 33:
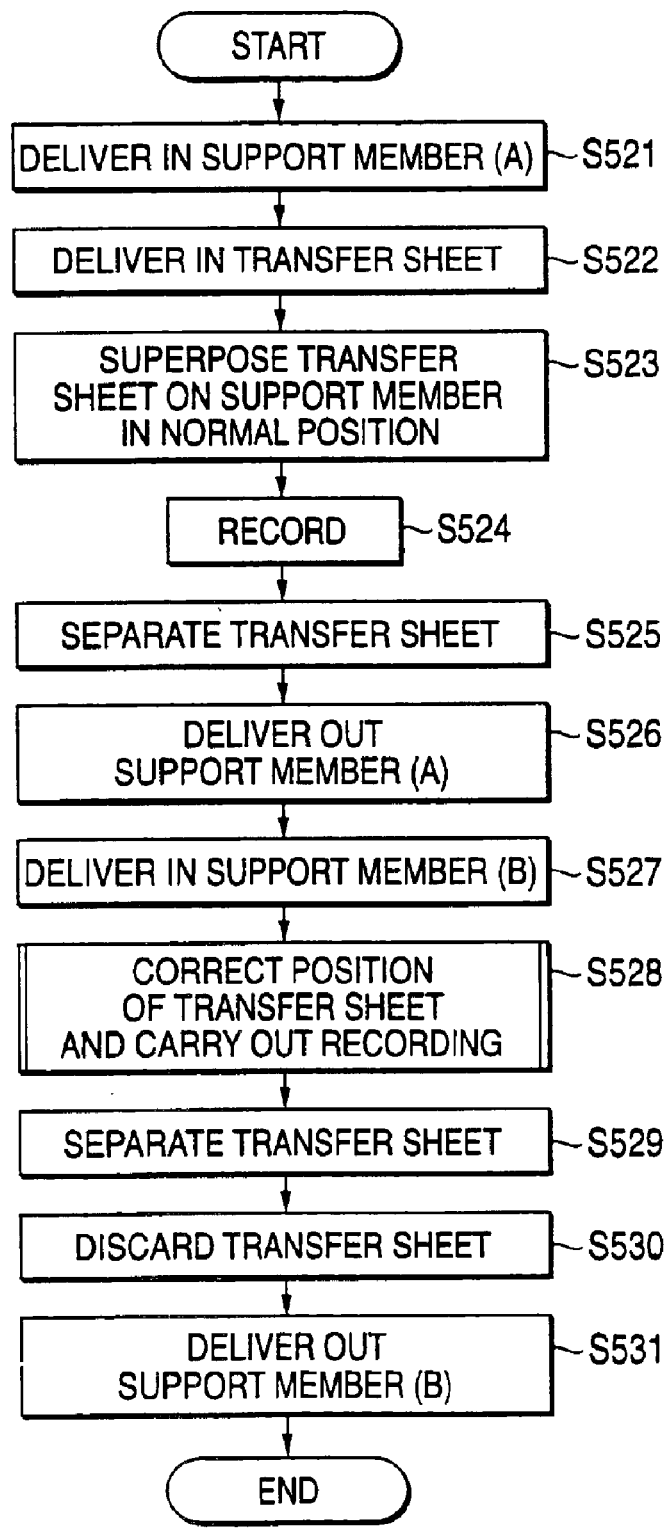
FIG. 33 is a flowchart showing operation order in the execution of the second recording method.

FIG. 32 is an explanatory view showing a second recording method of carrying out a recording operation by shifting a recording position at an arrangement pitch of a stripe corresponding to 1.5 pitches, and FIG. 33 is a flowchart showing operation order in the execution of the recording method.

In the second recording method, as shown in FIGS. 32(*a*) and 32(*b*), an unrecorded section (a region which can be used for recording) 3 having a larger size than an area corresponding to two stripes remains in the transfer sheet 7 obtained after a first recording operation. For this reason, a second recording operation is carried out with a positional margin.

As shown in FIG. 32(*b*), the transfer sheet 7 separated and held by the separating roller 201 is returned in almost the same position as that set before the separation over the recording surface of the support member (support member B) 23 and a recording position 5 is then shifted at the arrangement pitch of a stripe shape corresponding to 1.5 pitches in a direction orthogonal to the longitudinal direction of the stripe shape (the lateral direction of the stripe=a transverse direction in the drawing), thereby carrying out the recording operation. More specifically, a correction is carried out over image data including the stripe shape in order to give an instruction for a translation corresponding to 1.5 pitches of a stripe width. Consequently, the recording position 5 is shifted at 1.5 pitches to carry out a second recording operation. Thus, the recording operation can be carried out over the support member 23 by using the unrecorded section 3 present between the recorded stripe sections (the unrecorded sections 2).

As a result, the transfer sheet 7 shown in FIG. 32(*c*) is obtained after the separation from the support member 23. The unrecorded section 3 of the transfer sheet 7 is narrower than the stripe shape region to be recorded. Based on the basic operation described above, therefore, the transfer sheet 7 is discharged to the discarding box 37.

Thus, the recording operation is carried out twice by using one transfer sheet 7. Consequently, the transfer sheet 7 can be used up efficiently. Therefore, the transfer sheet 7 can be utilized effectively. As a result, moreover, the number of the transfer sheets 7 to be used can be decreased. Consequently, a manufacturing cost can be reduced. In this case, particularly, the number of uses is decreased. However, it is possible to obtain an advantage that precision in positioning of the returning position of the transfer sheet 7 can be relieved in the second recording operation. More specifically, in the case in which the recording operation is to be carried out with the shift of one pitch as described above, a spacing between a new recording position 5 and the recorded section 2 adjacent there to is reduced. For this reason, it is necessary to enhance precision to carry out the positioning when returning the transfer sheet 7 onto a next support member. In this respect, in the case in which the recording operation is to be carried out with the recording position shifted at 1.5 pitches, a recording operation corresponding to one stripe is performed over an unrecorded area for two stripes. Consequently, a positional margin can be obtained and the positioning can be carried out without a hindrance even if the precision in the positioning is not particularly high.

In this case, the operation is executed as shown in the flowchart of FIG. 33. A processing related to a third recording operation (for the support member C) is eliminated from the operation shown in FIG. 29.

While the recording position is sequentially shifted to carry out the recording operation over the next support member by using the unrecorded section of the transfer sheet 7 in the first and second recording methods, it is possible to obtain the same advantages by shifting the position of the transfer sheet and returning the transfer sheet onto the next support member without shifting the recording position. The direction of the shift in the shifting return may be set to be the circumferential direction of the separating roller 201 (which is parallel with the Y direction) or the axial direction (X direction) of the separating roller 201.

In the case in which the lateral direction of a stripe shape (which is orthogonal to a longitudinal direction) is coincident with the circumferential direction of the separating roller 201, it is preferable that the position of the starting end of the held transfer sheet 7 should be shifted and returned onto the support member with a shift of 1 to 1.5 pitches by the control of the rotating angle of the separating roller 201. In the case in which the lateral direction of the stripe shape (which is orthogonal to the longitudinal direction) is coincident with the axial direction of the separating roller 201, moreover, it is preferable that the mounting position of the held transfer sheet 7 should be shifted and returned onto the support member with a shift of 1 to 1.5 pitches by the control of a position in the axial direction of the separating roller 201.

When the position of the transfer sheet 7 is not shifted over the separating roller 201 but the transfer sheet 7 is received by the stage 27, furthermore, it is also possible to shift and return the transfer sheet 7 to the support member 23 in the same manner by shifting the position of the stage 27 from a position set before the separation. More specifically, when the transfer sheet 7 is to be returned from the separating roller 201 onto the next support member 23, the stage 27 is moved corresponding to 1 to 1.5 pitches of the stripe shape to receive the transfer sheet 7. Consequently, the transfer sheet 7 can be returned onto the support member 23 with a shift of a predetermined pitch. For the same operation, next, third and fourth recording methods will be described.

(Third Recording Method)

Figure 34:
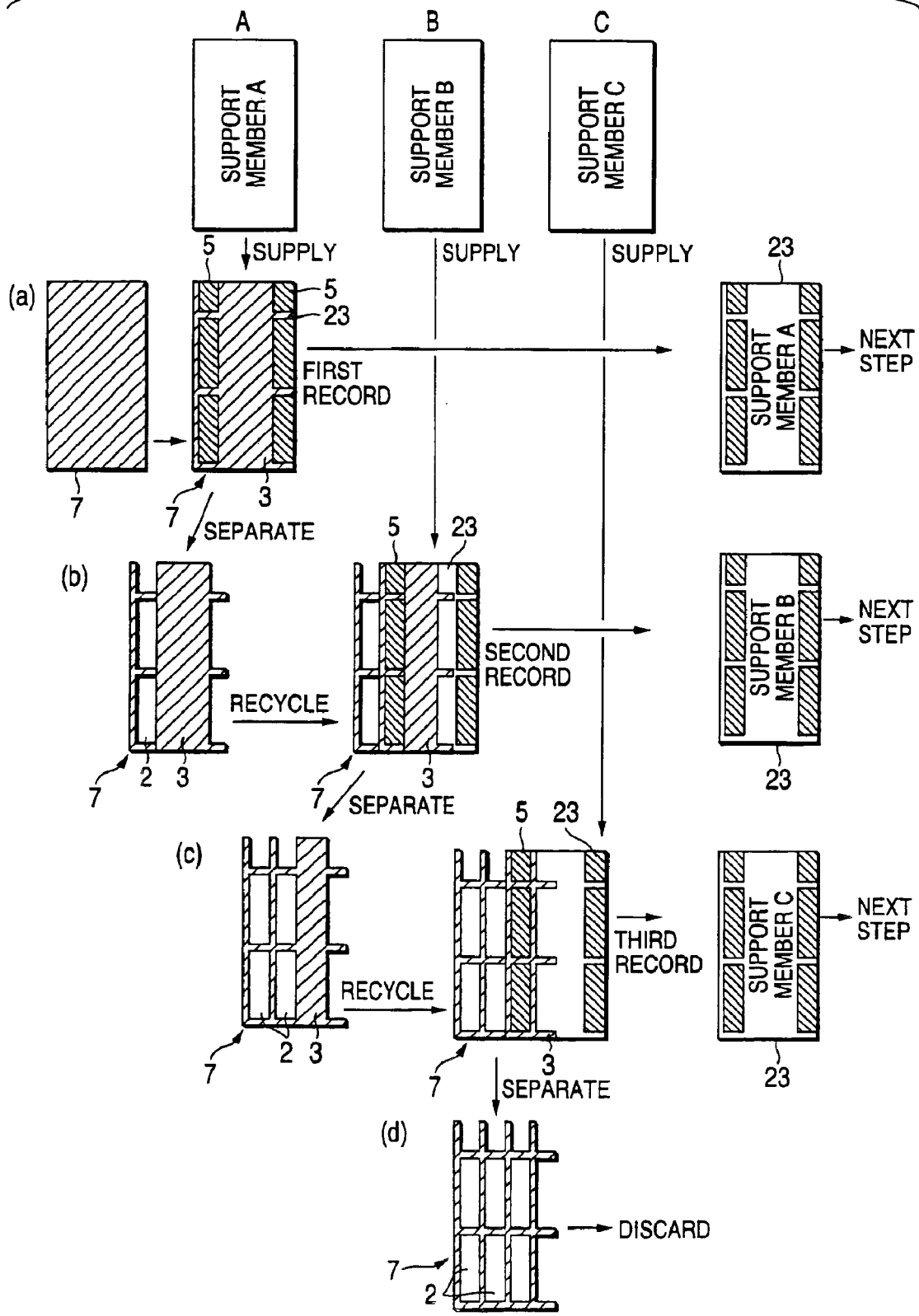
FIG. 34 is an explanatory view showing a third recording method of carrying out the recording operation by shifting the returning position of the transfer sheet at one arrangement pitch of the stripe shape.

FIG. 34 is an explanatory view showing a third recording method.

In the third recording method, when the transfer sheet 7 recorded in the recording position 5 and separated at a first time as shown in FIG. 34(*a*) is returned and superposed on the support member 23 at a second time, it is returned onto the recording surface of the support member (support member B) 23 with a shift at one arrangement pitch of a stripe from that set before the separation as shown in FIG. 34(*b*). Then, the recording position is set to be the same as that obtained before the separation and the recording operation is thus carried out. Consequently, the recording operation can be carried out over the support member 23 by using the unrecorded section 3 present between the recorded stripe sections (the recorded sections 2).

Similarly, when the transfer sheet 7 used for the second recording operation, separated and held is to be returned and superposed on a third support member C, it is further shifted at one arrangement pitch of a stripe shape from that set before the second separating operation and is thus returned onto the recording surface of the support member 23 as shown in FIG. 34(*c*). Then, the recording position is set to be the same as that set before the separation and the recording operation is thus carried out. Consequently, it is possible to carry out the recording operation over the support member 23 by using the unrecorded section 3 remaining in the two recording operations. Also in this case, when the third recording operation is ended, the unrecorded section of the transfer sheet 7 becomes narrower than the region of the stripe shape to be recorded as shown in FIG. 34(*d*). Therefore, the transfer sheet 7 is discharged to the discarding box 37 based on the basic operation described above.

The transfer sheet 7 is not discarded till the stage in which the three recording operations are carried out over one transfer sheet 7 and a region which can be used after the three recording operations is eliminated. Consequently, the transfer sheet 7 can be used up efficiently. Thus, the transfer sheet 7 can be utilized effectively. As a result, moreover, the number of the transfer sheets 7 to be used can be decreased. Therefore, a manufacturing cost can be reduced.

While there has been described the case in which the returning position of the transfer sheet 7 is sequentially shifted at one arrangement pitch of the stripe to carry out the recording operation in the third recording method, the returning position of the transfer sheet 7 may be shifted at 1.5 pitches to carry out the recording operation.

Figure 35:
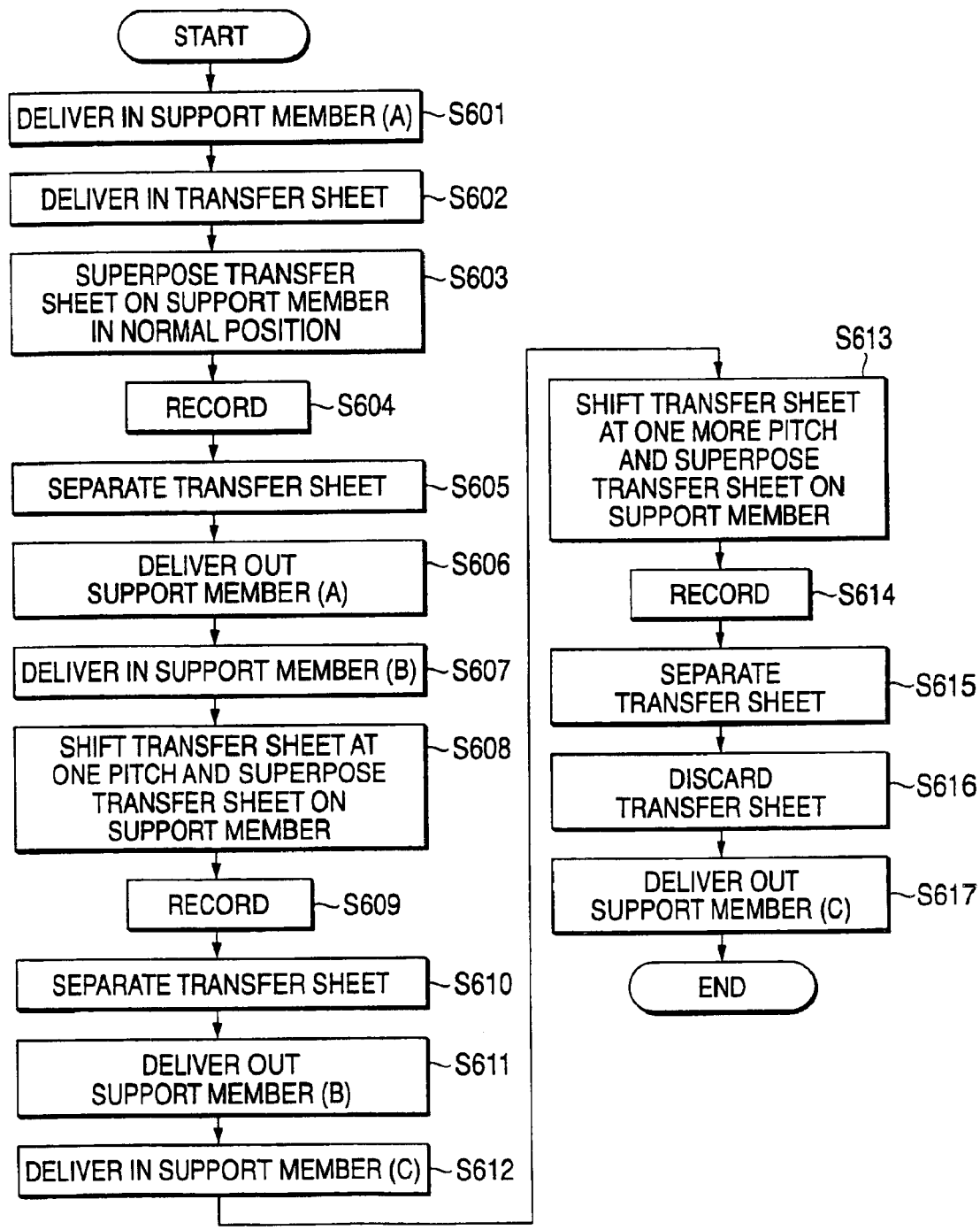
FIG. 35 is a flowchart showing a procedure for the third recording method.

Next, the operation will be described with reference to the flowchart of FIG. 35. First of all, a support member A to be subjected to a first recording operation is delivered onto the stage 27 (S601). Then, the transfer sheet 7 is delivered onto the support member A (S602) and is superposed on the support member A in a normal position (S603). In this state, the first recording operation is carried out (S604).

After the first recording operation is ended, the transfer sheet 7 is separated from the support member A (S605) and the recorded support member A is delivered out (S606). In a procedure for separating the transfer sheet 605, the separating roller 201 is used. When the first support member A is delivered out, a support member B to be subjected to a second recording operation is delivered onto the stage 27 (S607). Subsequently, the transfer sheet 7 held by the separating roller 201 is returned onto the support member B. In that case, the transfer sheet 7 is superposed on the support member B in a position shifted from the normal position (a position set before the separation) at the arrangement pitch of the stripe shape corresponding to one pitch (S608). In this state, the second recording operation is carried out (S609). In this case, the recording position is a normal position in which the pitch shift is not carried out.

After the second recording operation is ended, the transfer sheet 7 is separated from the support member B (S610) and the recorded support member B is delivered out (S611). When the second support member B is delivered out, a support member C to be subjected to a third recording operation is delivered onto the stage 27 (S612). Subsequently, the transfer sheet 7 held by the separating roller 201 is returned onto the support member C. In that case, the transfer sheet 7 is superposed on the support member C in a position shifted from the separating position for the second recording operation at the arrangement pitch of the stripe shape corresponding to one more pitch (a position shifted from the normal position by 2 pitches) (S613) In this state, a third recording operation is carried out (S614). In this case, the recording position is also the normal position in which the pitch shift is not carried out.

After the third recording operation is ended, the transfer sheet 7 is separated from the support member C based on the basic operation (S615), the transfer sheet 7 is discarded (S616) and the recorded support member C is delivered out (S617). Consequently, an operation for one cycle is ended. Thus, three recording operations are repetitively carried out as one cycle so that the transfer sheet 7 can be utilized effectively.

While there has been described the case in which the returning position of the transfer sheet 7 is sequentially shifted at the arrangement pitch of the stripe shape corresponding to one pitch and the recording operation is thus carried out in the third recording method, the recording operation may be carried out by shifting the returning position of the transfer sheet 7 at 1.5 pitches.

(Fourth Recording Method)

Figure 36:
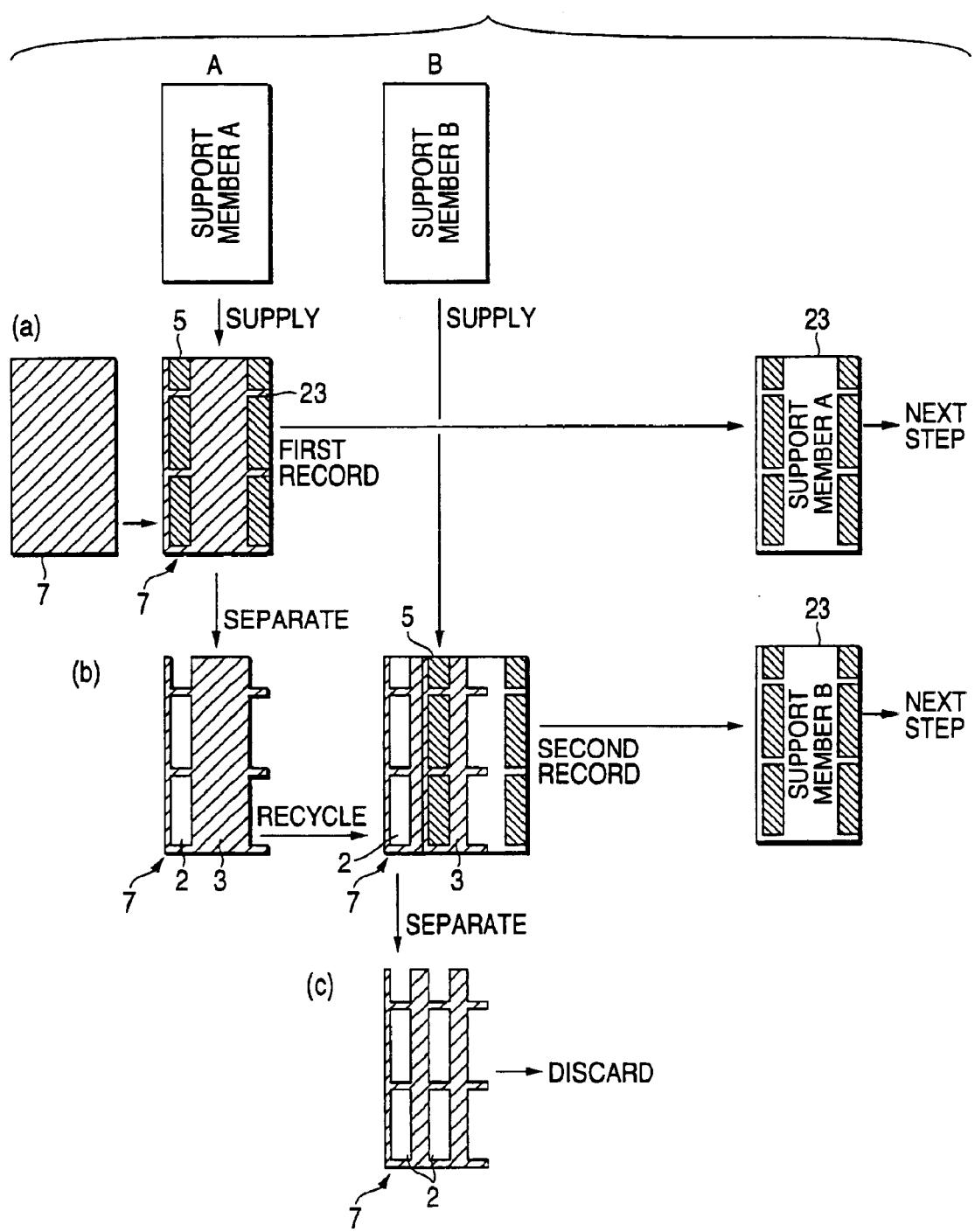
FIG. 36 is an explanatory view showing a fourth recording method of carrying out the recording operation by shifting the returning position of the transfer sheet at one arrangement pitch of the stripe shape.

FIG. 36 is an explanatory view showing a fourth recording method of carrying out a recording operation by shifting the returning position of a transfer sheet corresponding to 1.5 pitches.

In the fourth recording method, as shown in FIGS. 36(a) and 34(b), an unrecorded section 3 having a larger size than an area corresponding to two stripes remains in the transfer sheet 7 obtained after a first recording operation. For this reason, a second recording operation can be carried out with a positional margin.

As shown in FIG. 36(b), when the transfer sheet 7 separated and held is to be returned onto the recording surface of the next support member 23, a returning position is shifted at 1.5 arrangement pitches of the stripe shape in a direction orthogonal to the longitudinal direction of the stripe shape (the lateral direction of the stripe shape=a transverse direction in the drawing), thereby carrying out the returning operation. Then, the second recording operation is carried out in the same recording position. Consequently, the recording operation can be carried out over the support member 23 by using the unrecorded section 3 present between the recorded stripe sections (the recorded sections 2).

As a result, the transfer sheet 7 shown in FIG. 36(c) is obtained after the separation from the support member 23. The unrecorded section of the transfer sheet 7 is narrower than the stripe shape region to be recorded. Based on the basic operation described above, therefore, the transfer sheet 7 is discharged to the discarding box 37.

Thus, the recording operation is carried out twice by using one transfer sheet 7. Consequently, the transfer sheet 7 can be used up efficiently. Thus, the transfer sheet 7 can be utilized effectively. Moreover, the number of the transfer sheets 7 to be used can be decreased. Consequently, a manufacturing cost can be reduced. In this case, particularly, the number of uses is decreased. However, it is possible to obtain an advantage that precision in positioning of the returning position of the transfer sheet 7 can be relieved in the second recording operation.

The procedure for executing the third recording method is basically equivalent to a procedure shown in the flowchart of FIG. 29 and the procedure for executing the fourth recording method is basically equivalent to a procedure shown in the flowchart of FIG. 33. The processing is carried out in accordance with routines shown in FIGS. 37 and 38 in place of the contents of the position correcting and recording processings shown in FIGS. 30 and 31.

Figure 37:
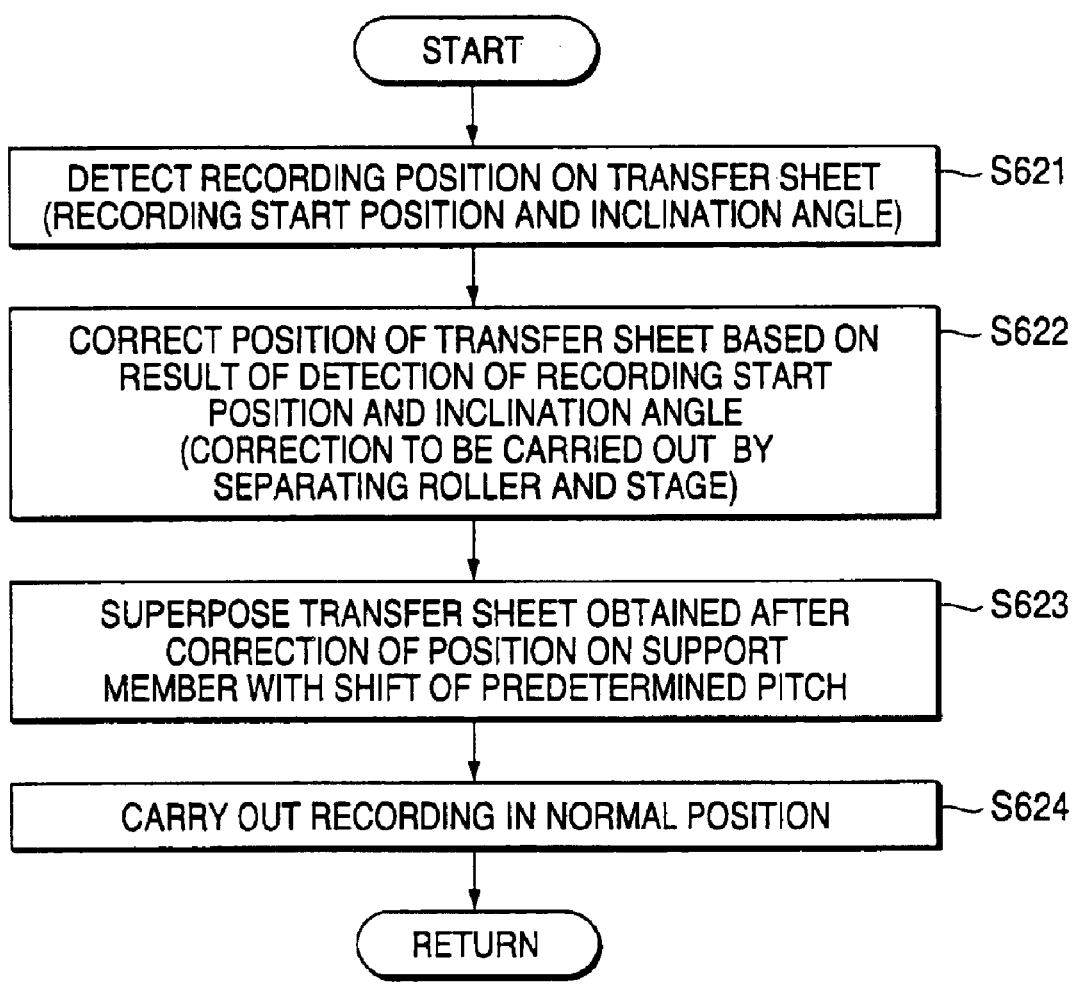
FIG. 37 is a flowchart showing a routine for defining a procedure for the main parts of recording methods according to third and fourth embodiments.

In the routine shown in FIG. 37, first of all, a last recording position on the transfer sheet 7 held by the separating roller 201, that is, a recording start position and an inclination angle are detected (S621). Next, the position of the transfer sheet 7 is corrected based on the result of the detection (S622). The correction of a position may be carried out by controlling the separating roller 201 side or the stage 27 side as described above. In any case, the transfer sheet 7 is returned and superposed on the support member 23 with a shift of an arrangement pitch of the stripe shape corresponding to one pitch or 1.5 pitches in a state in which the position correction is executed (S623). Then, the recording operation is carried out in this state (S624). In this case, the recording operation is carried out in a normal position without shifting the recording position.

Figure 38:
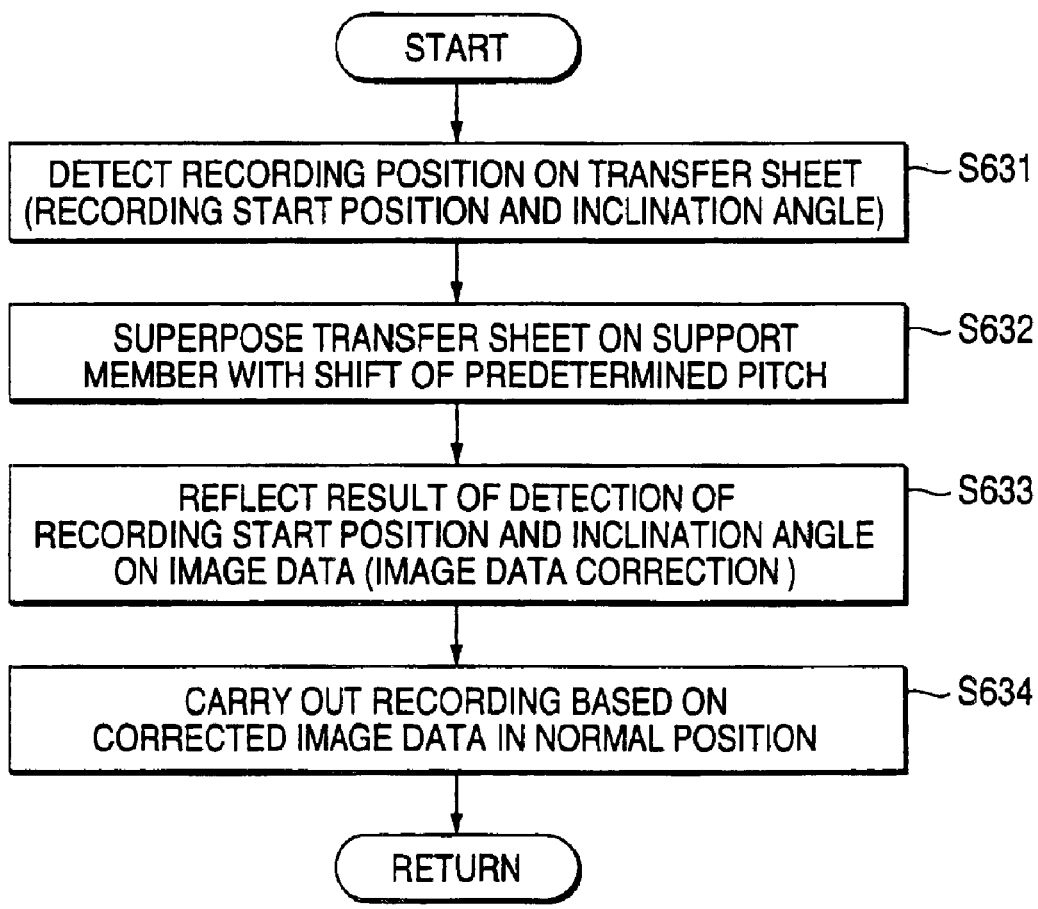
FIG. 38 is a flowchart showing another routine for defining the procedure for the main parts of the recording methods according to the third and fourth embodiments.

On the other hand, in a routine shown in FIG. 38, a last recording position on the transfer sheet 7 held by the separating roller 201, that is, a recording start position and an inclination angle are first detected (S631). Next, the transfer sheet 7 is shifted from the position before the separation at an arrangement pitch of the stripe shape corresponding to one pitch or 1.5 pitches, and is thus returned and superposed on the support member (S632). Then, image data to be recorded next are corrected in order to reflect the result of the detection of the recording start position and the inclination angle (S633). The correction is equivalent to the correction of the position of the transfer sheet 7. Subsequently, the recording operation is carried out based on the image data thus corrected (S634). Also in this case, the recording operation is carried out in a normal position without shifting a recording position.

As described above, there are the following kinds of shift amounts of the transfer sheet 7.

Figure 39:
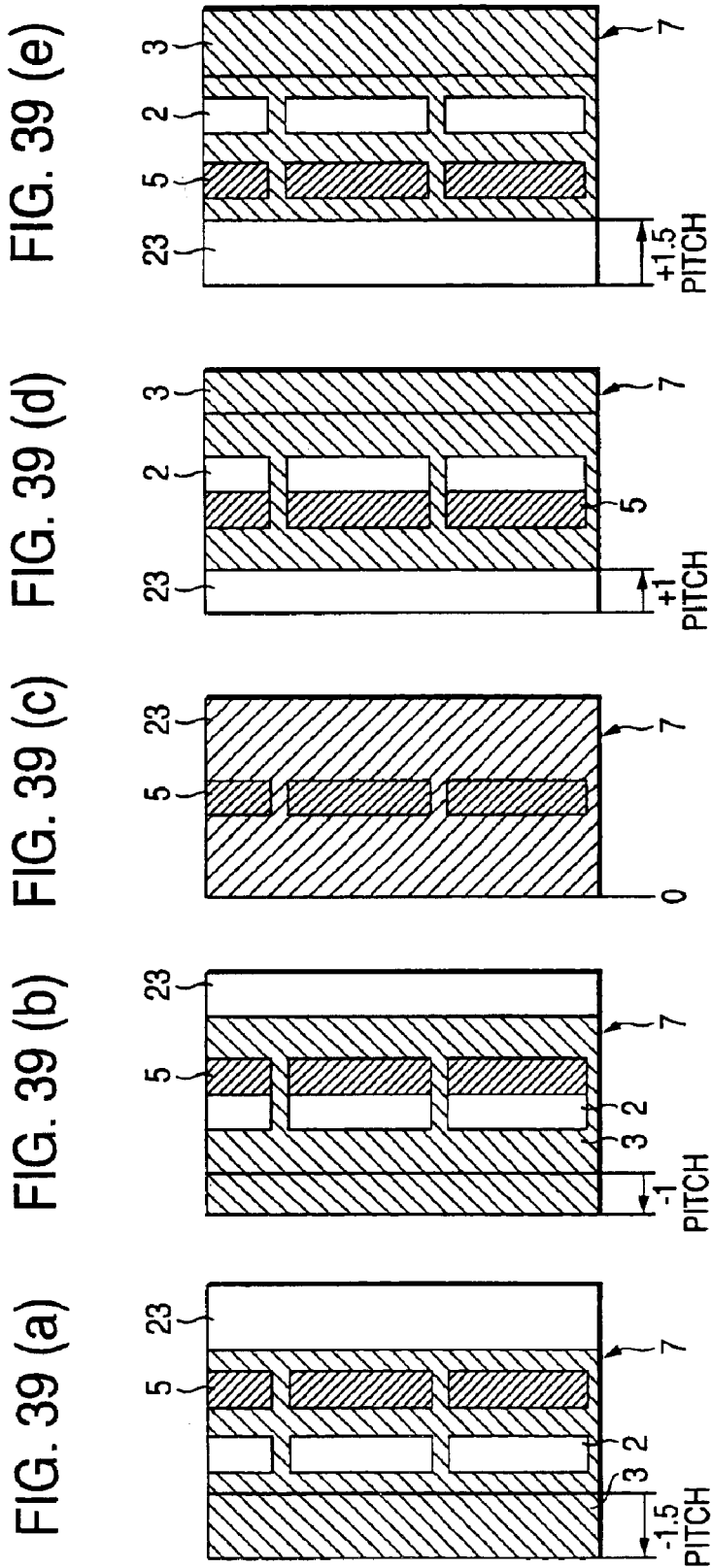
FIGS. 39(a) to 39(e) are explanatory views showing the relationship between a shift amount and a recording position in the case in which the transfer sheet is shifted at the arrangement pitch of the stripe shape, respectively.

FIG. 39 is an explanatory view illustrating the relationship between an amount of the shift pitch of the transfer sheet 7 in the case in which the recording position is set to be the normal position (a pitch=an arrangement pitch of a stripe shape) and the support member 23 and recording position 5. More specifically, a position in FIG. 39(c) is set to be an initial position, (a) showing the case in which the transfer sheet 7 is arranged with a leftward shift of 1.5 pitches, (b) showing the case in which the transfer sheet 7 is arranged with a leftward shift of one pitch, (d) showing the case in which the transfer sheet 7 is arranged with a rightward shift of one pitch, and (e) showing the case in which the transfer sheet 7 is arranged with a rightward shift of 1.5 pitches. Thus, the position in which the transfer sheet 7 is shifted and returned is predetermined so that a shifting operation can easily be controlled.

Second Embodiment

While the description has been given to the case in which the transfer sheet 7 having one color is used for the recording operation plural times, the transfer sheet having each color can be used plural times in the same manner when stripe-shaped patterns having a plurality of colors are to be formed.

Figure 40:
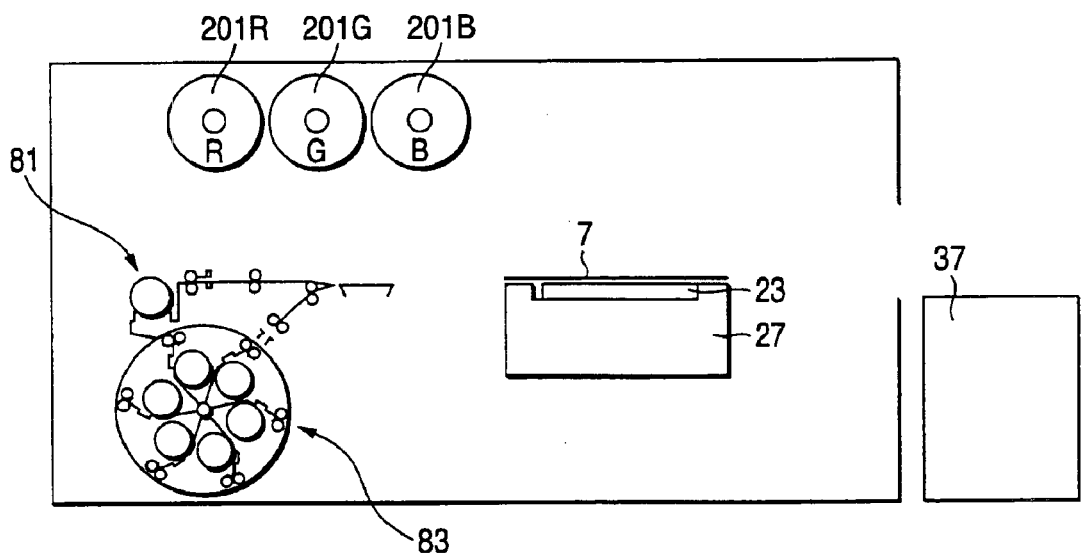
FIGS. 40(a) and 40(b) are views showing the structure of a recording apparatus comprising three separating rollers for respective colors.
Figure 40:
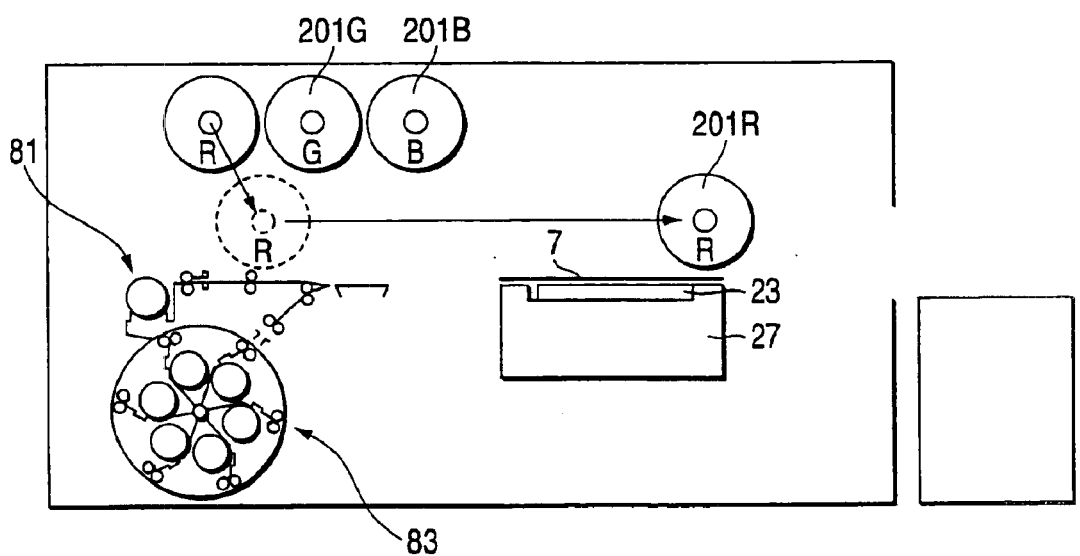

A recording apparatus according to a second embodiment shown in FIG. 40 comprises three separating rollers 201R, 201G and 201B for respective colors in such a manner that transfer sheets 7 having three colors can be used respectively. The separating rollers 201R, 201G and 201B can separately carry out moving, separating, holding and returning operations, respectively. As shown in (a), the separating rollers 201R, 201G and 201B standing by in initial positions are operated in order every time the transfer sheets 7 having the colors are used. (b) shows such a state that the separating roller 201R which is special for a red color is operated.

According to such a structure, the transfer sheet having the colors can efficiently be used up respectively and a recording operation can be thus carried out at a low cost.

Description will be given to some examples of an image pattern including a stripe shape. While a typical stripe pattern has been described above, the pattern is fabricated for various uses.

Figure 41:
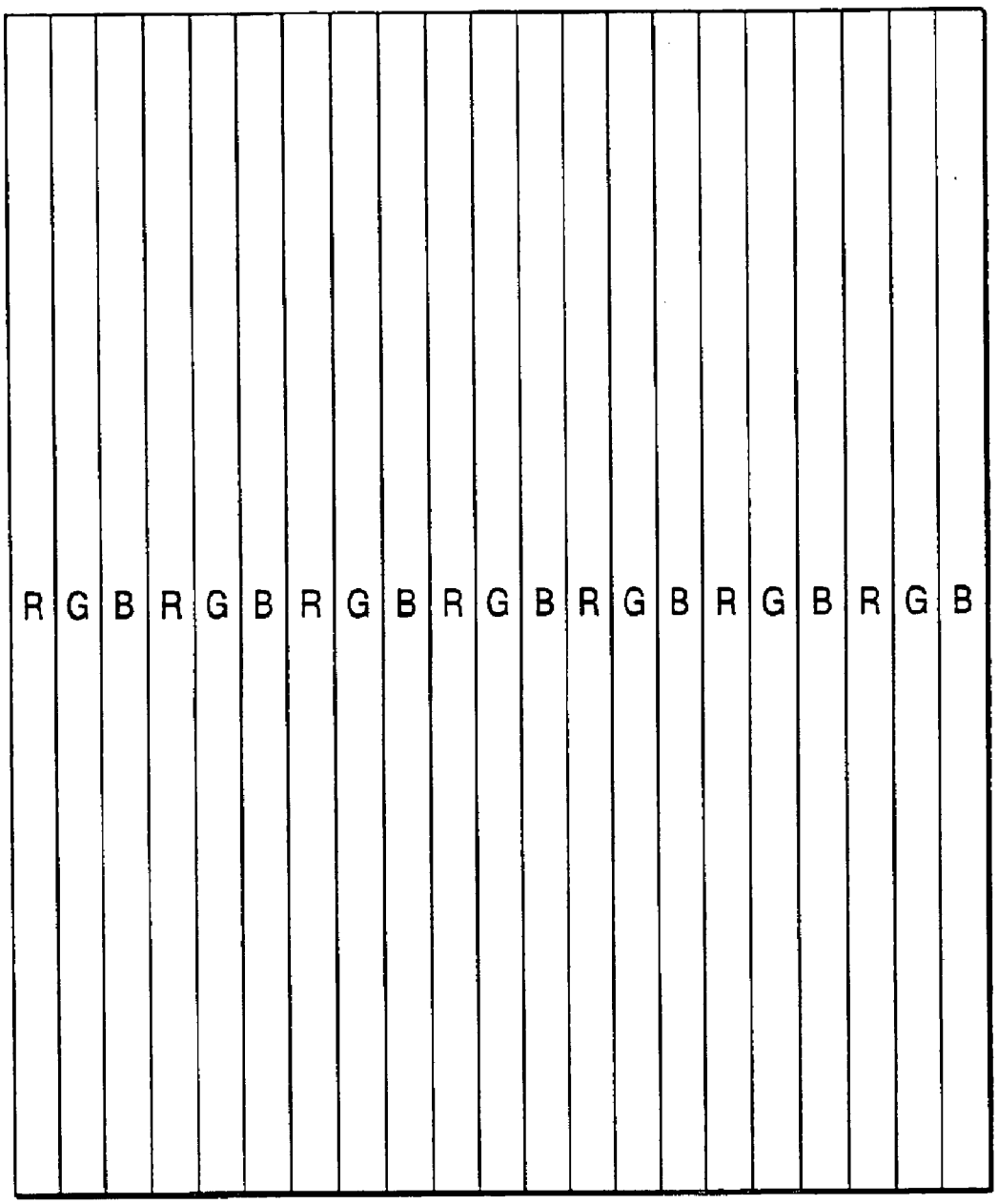
FIG. 41 is a view showing a first example of a pattern including a stripe shape.
Figure 42:
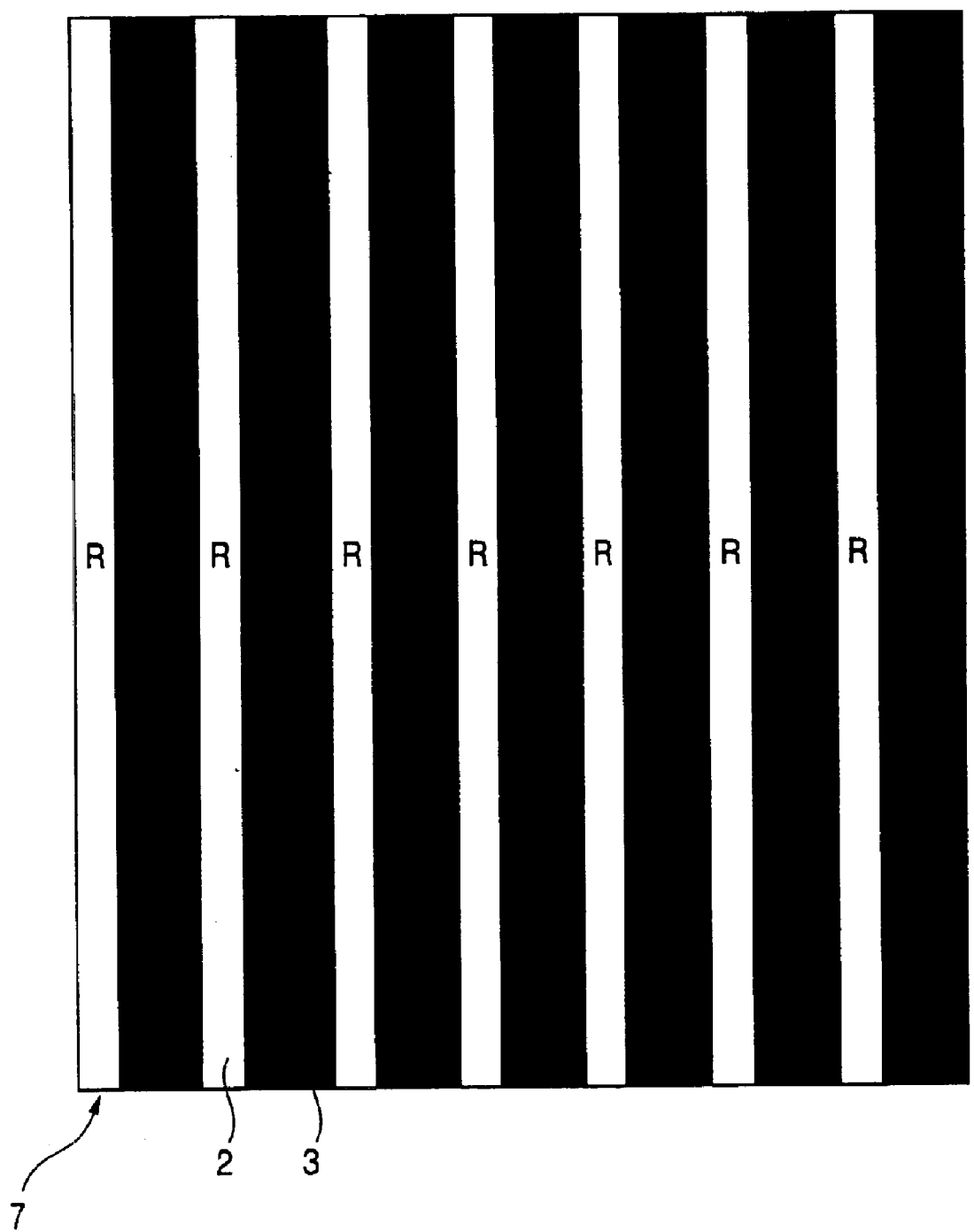
FIG. 42 is a view showing a transfer sheet obtained after one red (R) recording operation when the pattern in FIG. 41 is to be recorded.

FIG. 41 shows an example of an image pattern in which red (R), green (G) and blue (B) are arranged like a simple stripe in this order. The stripe pattern is used for a PDP (a plasma display) or an HDTV (a high-definition television), for example. The stripe pattern is characterized by a vertical stripe shape having a slightly smaller width than the width (or height) of a support member which is not oblong but continuous. In the case in which such an image pattern is to be obtained, for example, the transfer sheet 7 separated after the execution of a first recording operation is obtained as shown in FIG. 42 when the stripe-shaped image of the red (R) is first recorded by using the transfer sheet of the red (R). In other words, an unrecorded section (an unused region) 3 for two stripes corresponding to the positions of the green (G) and the blue (B) remains between the recorded stripe shapes (recorded sections 2) of the transfer sheet 7.

In a next recording operation, accordingly, a recording position is shifted relatively with the transfer sheet 7 corresponding to one arrangement pitch of the stripe shape every recording by using the recording method. Consequently, the red (R) can be sequentially recorded in the unrecorded section 3 on the transfer sheet 7 in the positions corresponding to the green (G) and the blue (B) in a first recording operation so that the transfer sheet 7 can be used three times in total. By shifting the recording position at 1.5 pitches, moreover, it is possible to record the red (R) in the unrecorded section 3 of the transfer sheet 7 for two stripes in the positions corresponding to the green (G) and the blue (B) in the first recording operation. Thus, the transfer sheet 7 can be used twice in total.

Figure 43:
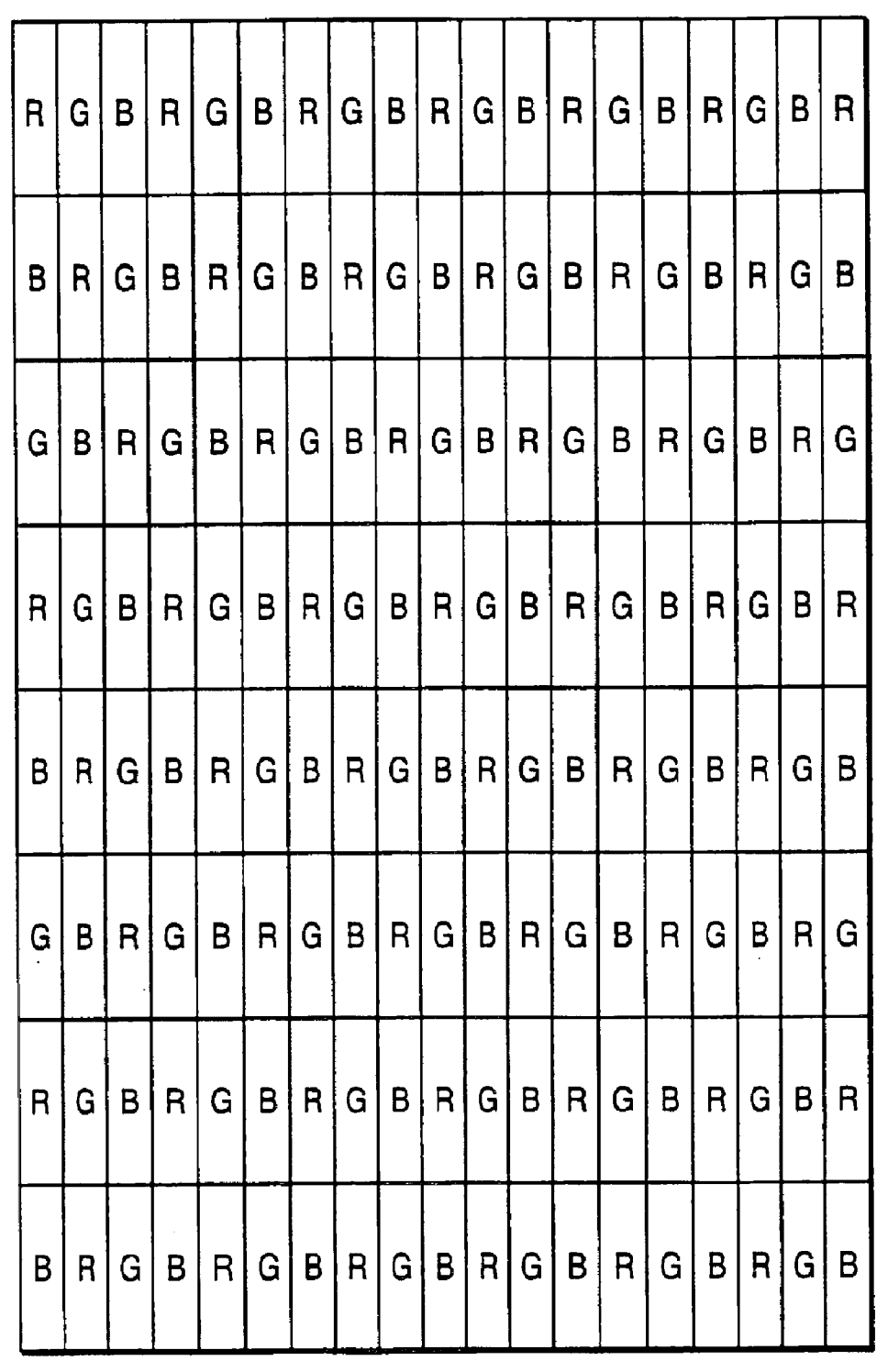
Figure 44:
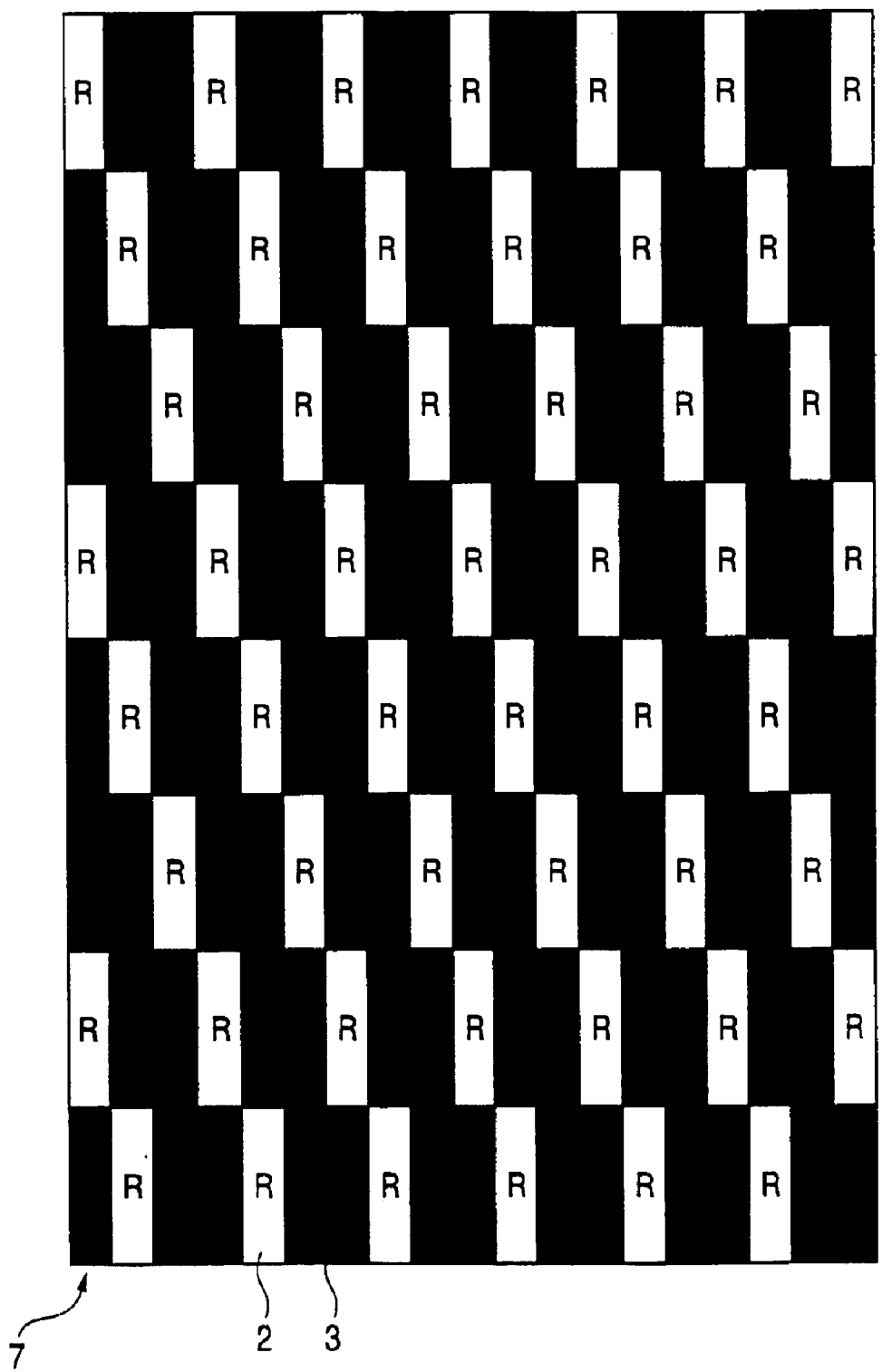
FIG. 44 is a view showing the transfer sheet obtained after one red (R) recording operation when the pattern in FIG. 43 is to be recorded.

FIG. 43 shows an example of a mosaic pattern in which the stripe shapes of the red (R), the green (G) and the blue (B) are arranged like a mosaic. This pattern is applied to small-sized apparatuses, for example, the finders of various apparatuses, the display section of a portable video photographing apparatus and a small-sized TV. In this pattern, the positions of the same color are shifted one by one vertically and horizontally. When the stripe-shaped image of the red (R) is recorded by using the transfer sheet of the red (R) in order to obtain such an image pattern, the transfer sheet 7 separated after the execution of the first recording operation is obtained as shown in FIG. 44. In the case in which the transfer sheet 7 is used for the recording operation plural times, accordingly, it is possible to employ at least one of a method of shifting a relative recording position at one pitch in a transverse direction in the drawing (a direction orthogonal to the longitudinal direction of the stripe shape) and a method of shifting a relative recording position at one pitch in a longitudinal direction of the drawing (a longitudinal direction of the stripe shape).

Figure 45:
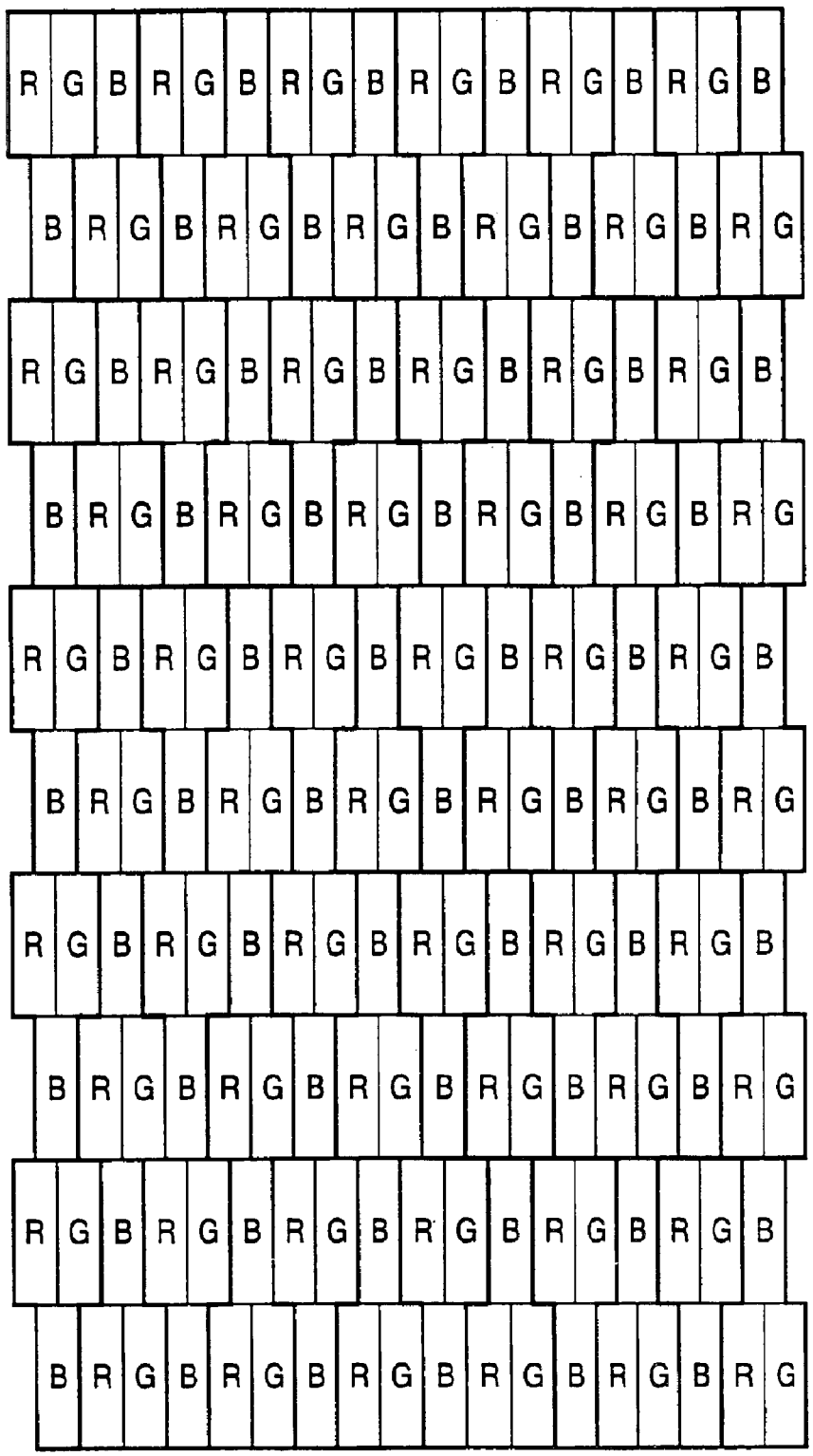
FIG. 45 is a view showing a third example of the pattern including the stripe shape.
Figure 46:
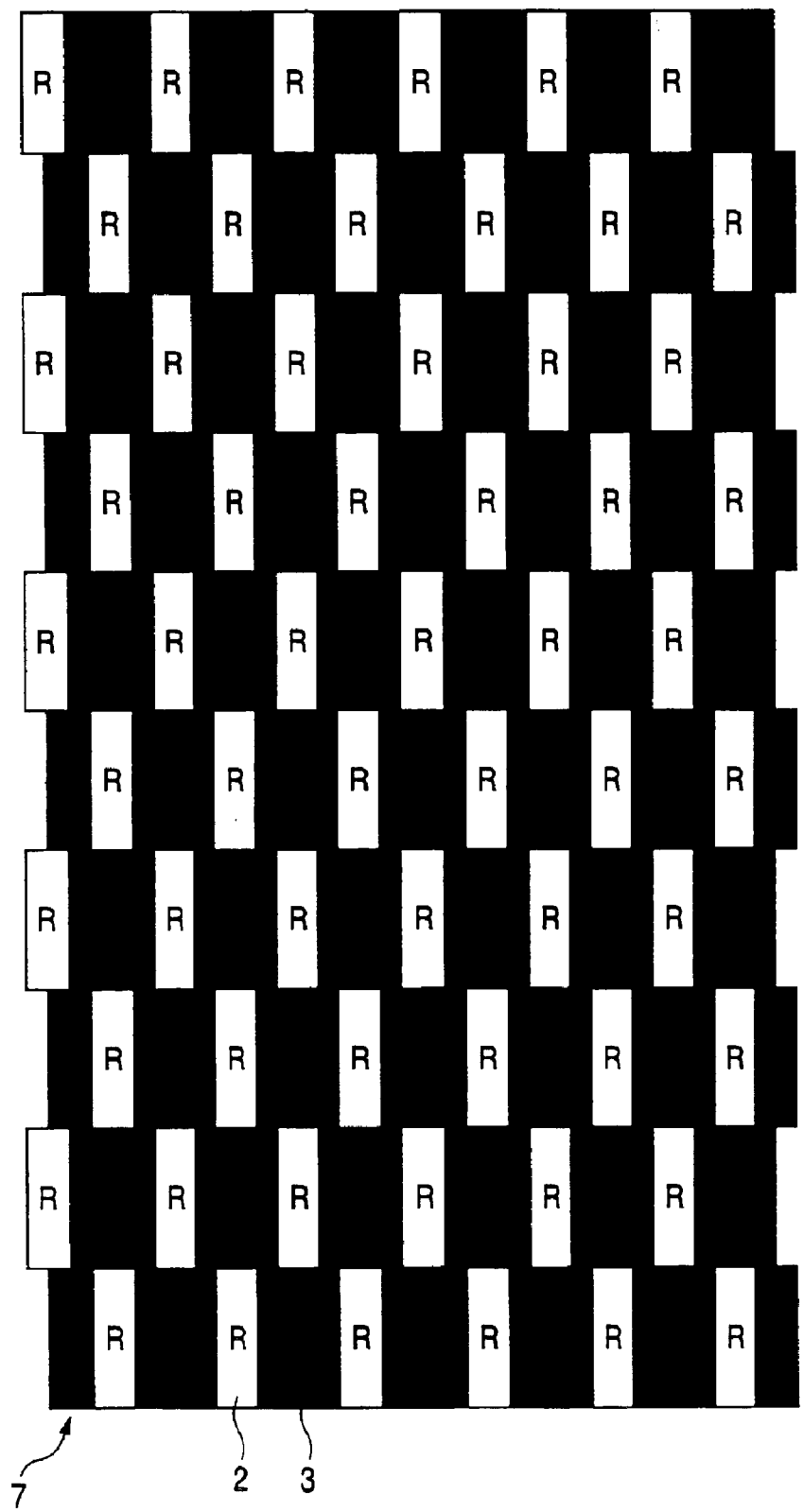
FIG. 46 is a view showing the transfer sheet obtained after one red (R) recording operation when the pattern in FIG. 45 is to be recorded.

FIG. 45 shows an example of a so-called delta pattern in which a triangle is shaped by the stripes of the red (R), the green (G) and the blue (B) and is patterned into a basic form (pixels having the same color are not adjacent to each other). This pattern is also employed for the same uses as those of the mosaic pattern. When the stripe-shaped image of the red (R) is recorded by using the transfer sheet of the red (R) in order to obtain such a pattern image, the transfer sheet 7 separated after the execution of the first recording operation is obtained as shown in FIG. 46. In the case in which the transfer sheet 7 is used for the recording operation plural times, accordingly, it is possible to employ at least one of a method of shifting a relative recording position at one pitch in a transverse direction in the drawing (a direction orthogonal to the longitudinal direction of the stripe shape) and a method of shifting a relative recording position at one pitch in a vertical direction of the drawing (a longitudinal direction of the stripe shape) and by a half pitch in a transverse direction.

Third Embodiment

While the description has been given to the case in which the transfer sheet 7 separated by the separating roller 201 is exactly held and stored by the separating roller 201 itself in each of the examples, the separating roller 201 can also be restricted to the separating and returning operations to store the separated transfer sheet 7 by another means. Consequently, it is possible to eliminate the necessity for mounting the separating roller 201 for each color, for example.

Figure 47:
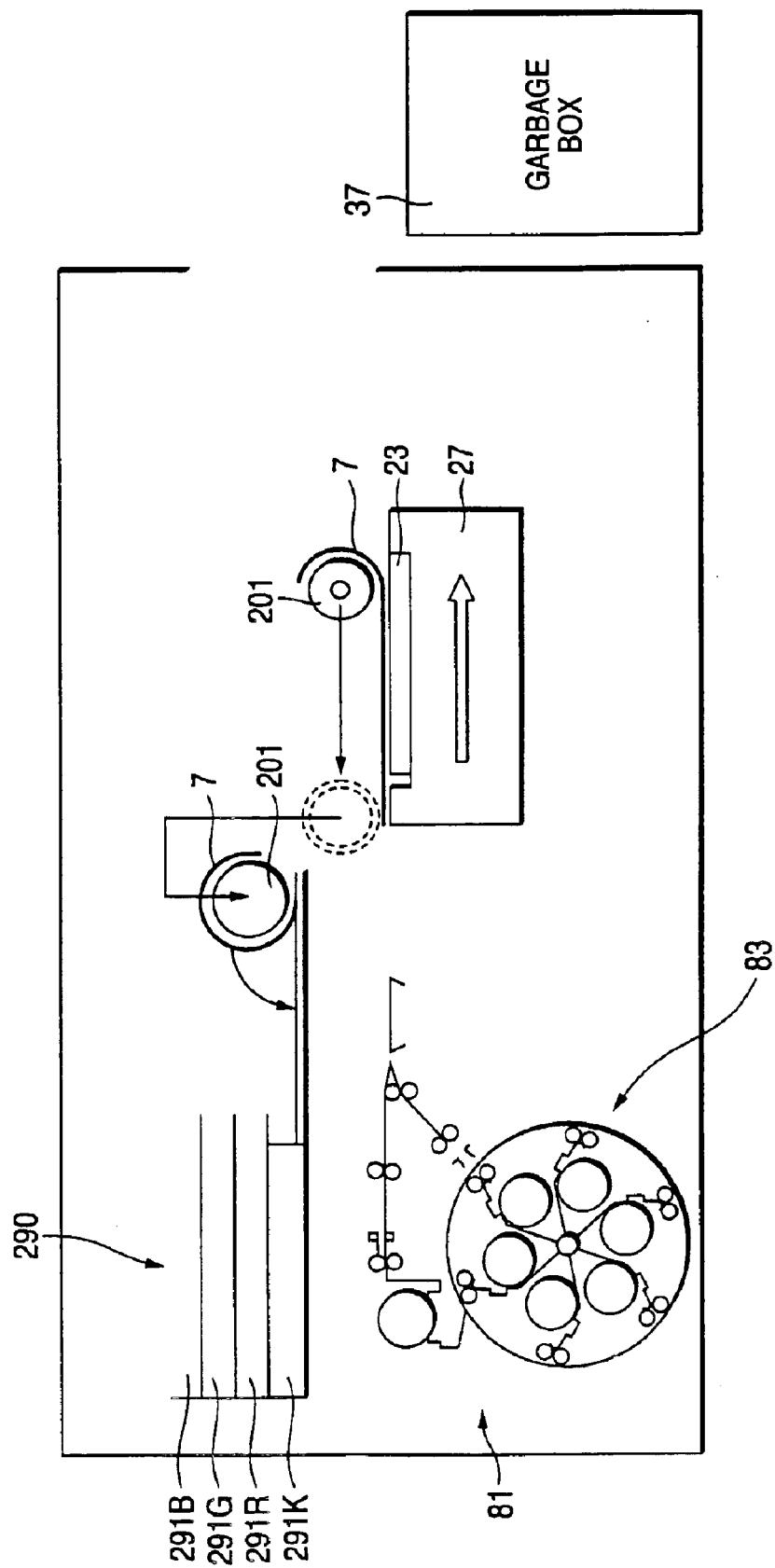
FIG. 47 is a view showing an example of a recording apparatus having a storage case for a separated transfer sheet.

FIG. 47 shows an example of a recording apparatus comprising a storage rack for the transfer sheet 7 thus separated. In FIG. 47, 290 denotes a storage case for temporarily storing the separated transfer sheet 7. The storage case 290 is provided with a plurality of storage racks 291K, 291R, 291G and 291B capable of separately storing the transfer sheets 7 having respective colors. The storage racks 291K, 291R, 291G and 291B can be drawn individually and can deliver the transfer sheet 7 together with the separating roller 201 in the drawing state.

The transfer sheet 7 is delivered in the same manner as the delivery between the stage 27 and the separating roller 201. The drawing and push-in operations of the storage racks 291K, 291R, 291G and 291B are automatically carried out interlockingly with the operation of the separating roller 201. In the case in which a monochromatic recording operation is to be carried out, the storage rack for each color is not always required. In the case in which the transfer sheet 7 is removed from the separating roller 201 and is then accommodated in the storage case 290, the storage rack (for example, 291K) for the accommodation is brought into a drawing state and the separating roller 201 is moved to the position of the storage rack 291K thus drawn, thereby stopping the vacuum adsorption of the transfer sheet 7 in the separating roller 201. Consequently, the transfer sheet 7 is mounted on the storage rack 291K. Then, the storage rack 291K is retreated to an initial position and is accommodated in the storage case 290.

Next, description will be given to a variant of the storage case shown in FIG. 47.

Figure 48:
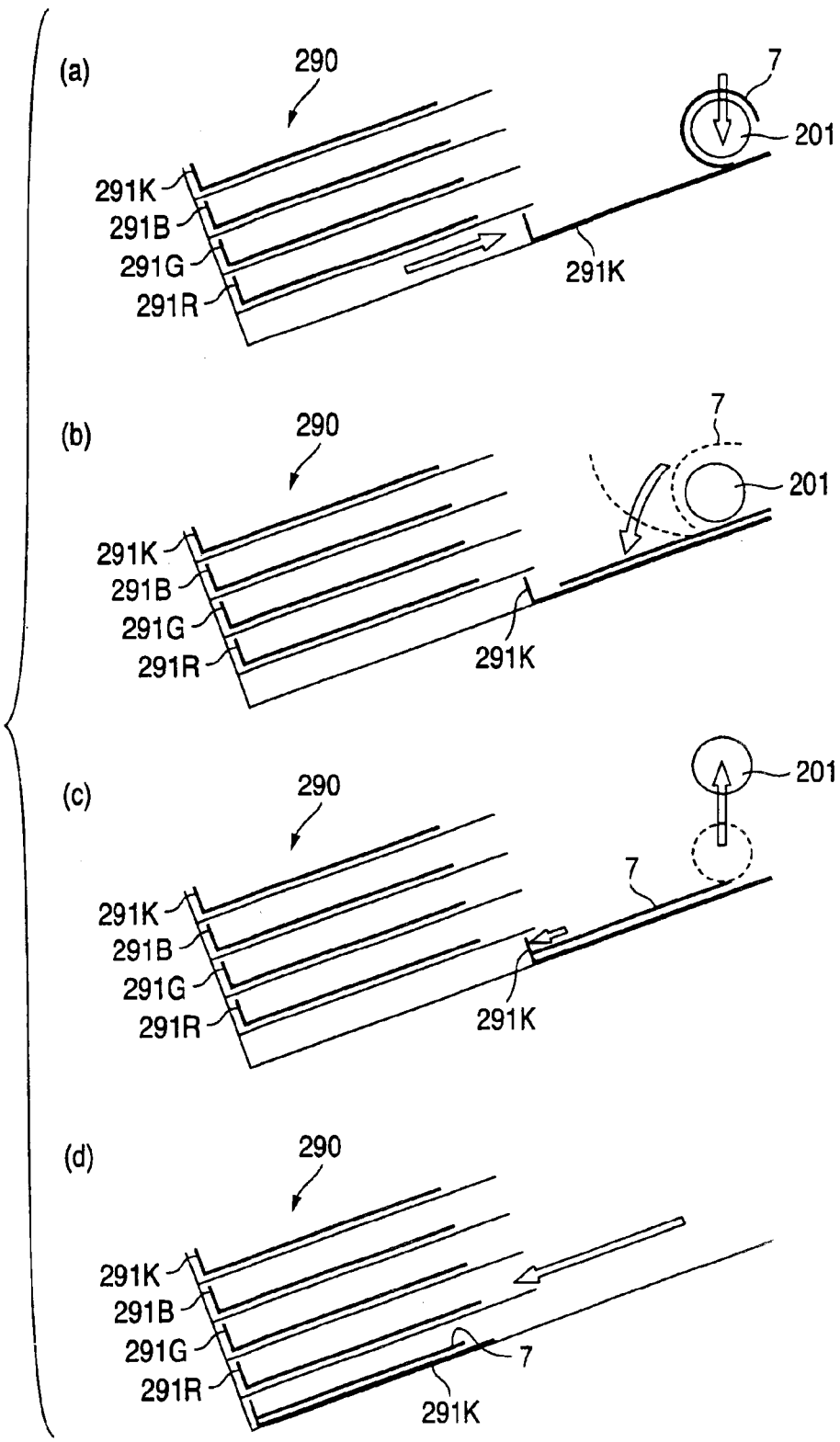
FIG. 48 is an explanatory view showing a state in which the transfer sheet is accommodated in the storage case of FIG. 47.

FIG. 48 shows an example in which the storage case 290 is provided with an inclination. Each of the storage racks 291K, 291R, 291G and 291B are slidably provided in a downward inclination state toward the inner side of the storage case 290. When the transfer sheet 7 is accommodated in the storage rack 291K as shown in FIGS. 48(*a*),

48(*b*) and 48(*c*), accordingly, the transfer sheet 7 is spontaneously mounted on the storage rack 291K by a deadweight, and is slid to an inner part by the inclination of the storage rack 291K and is then stopped. As shown in FIG. 48(*d*), consequently, it is possible to obtain an advantage that the transfer sheet 7 can be stored in an accommodation state in a constant position and the position of readsorption to the separating roller 201 in the take-out of the transfer sheet 7 can easily be set.

Fourth Embodiment

Figure 49:
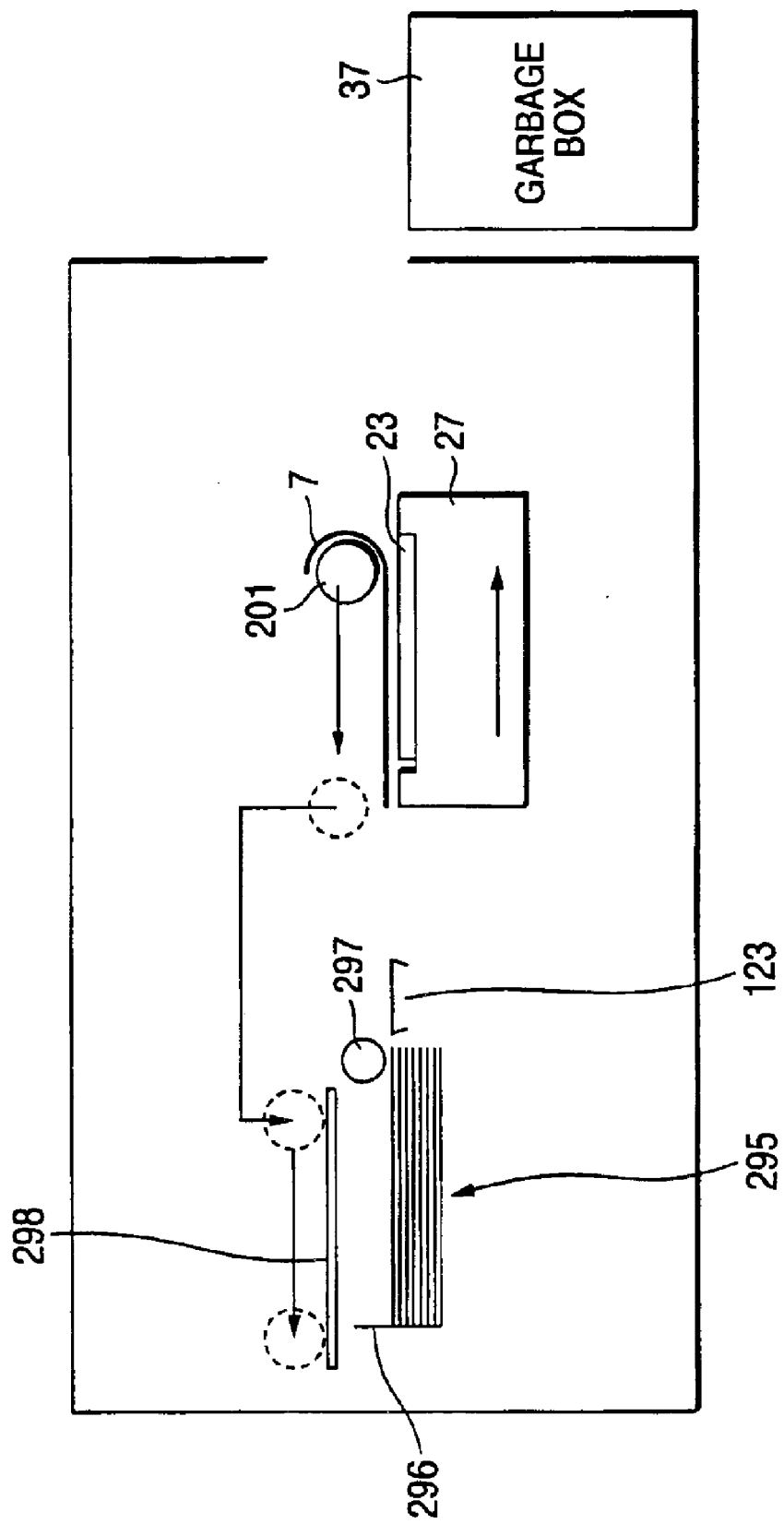
FIG. 49 is a view showing an example of the storage of the transfer sheet in which the invention is applied to a recording apparatus using a transfer sheet of a cut sheet type.

FIG. 49 shows an example of the case in which a transfer sheet 7 to be a recording medium is supplied in a cut sheet configuration. In FIG. 49, 295 denotes a transfer sheet supply section. In the transfer sheet supply section 295, the transfer sheet 7 is accommodated in a cassette 296 in a lamination state and is sequentially supplied toward the stage 27 by means of a pick-up roller 297 and a sucker line which is not shown. In the apparatus, moreover, a transfer sheet storage place 298 for temporarily storing the separated transfer sheet 7 is provided on the cassette 296 so that the transfer sheet 7 can be delivered between the transfer sheet storage place 298 and the separating roller 201. Even if the transfer sheet 7 has the cut sheet configuration, thus, a recording operation can be carried out in the same manner.

Figure 55:
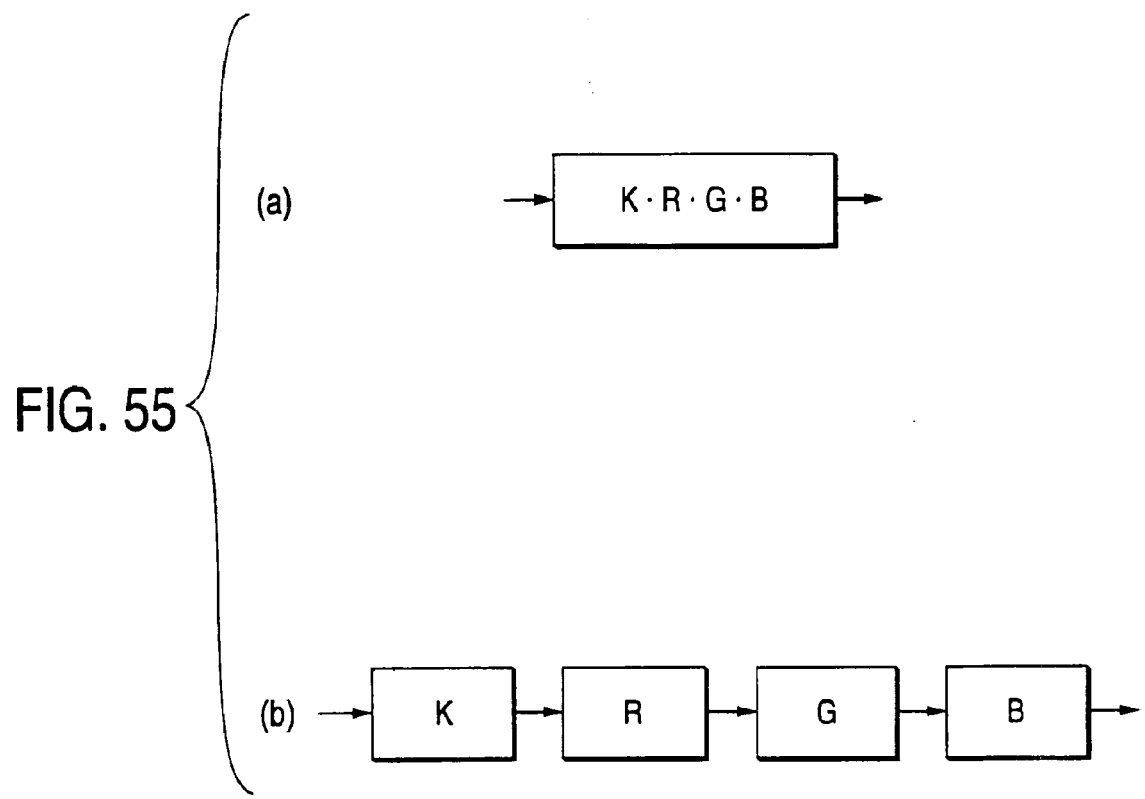
FIG. 55 is a block diagram showing the flows of the case (a) in which K, R, G and B are recorded in order by one apparatus and the case (b) in which a plurality of monochromatic recording apparatuses are provided to sequentially carry out a recording operation.

While the description has been given to the case in which a multicolor recording operation is carried out by one recording apparatus in each of the embodiments, a special recording apparatus for each color may be provided to carry out a recording operation for each color in order by means of each recording apparatus. FIG. 55 shows their distinction in a block.

FIG. 55(*a*) shows the case in which recording operations for black (K), red (R), green (G) and blue (B) are continuously carried out for one support member in order by one recording apparatus. FIG. 55(*b*) shows the case in which a recording operation for each color is carried out in order by a monochromatic recording apparatus which is special for each of the black (K), the red (R), the green (G) and the blue (B). An equipment cost can be reduced in the former method and a manufacturing task can be hastened in the latter method.

Figure 56:
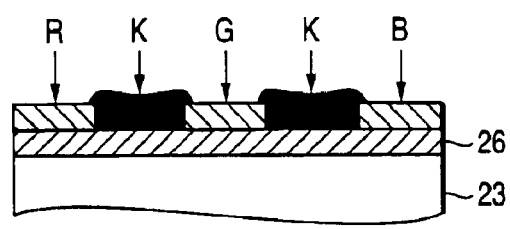
FIG. 56 is a sectional view showing a support member representing an image in which a black stripe is caused to overlap between color filters.
Figure 57:
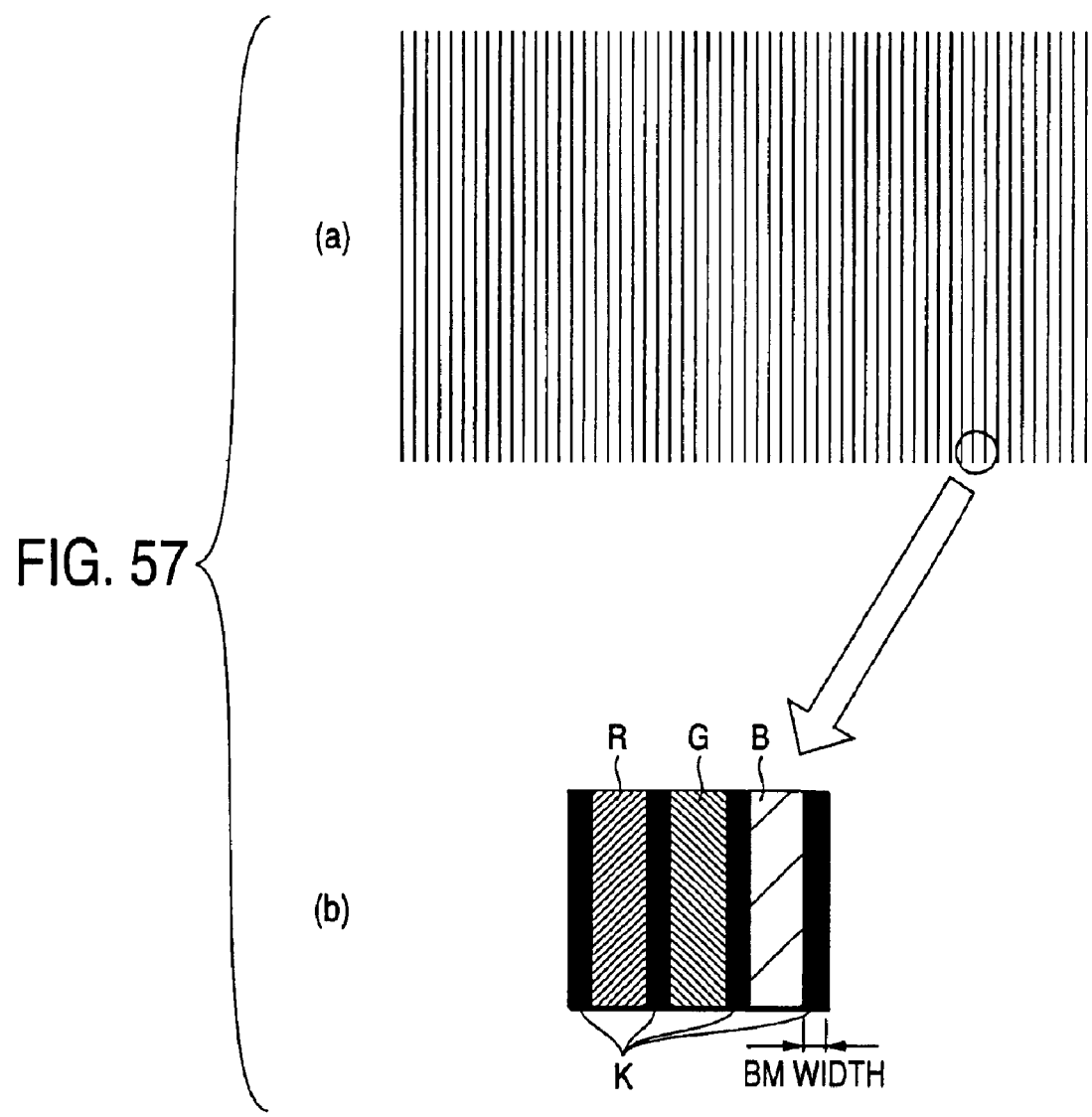
FIG. 57 is a plan view showing an example of the color filter, (a) being a general view showing the color filter and (b) being a partially enlarged view showing the same.
Figure 58:
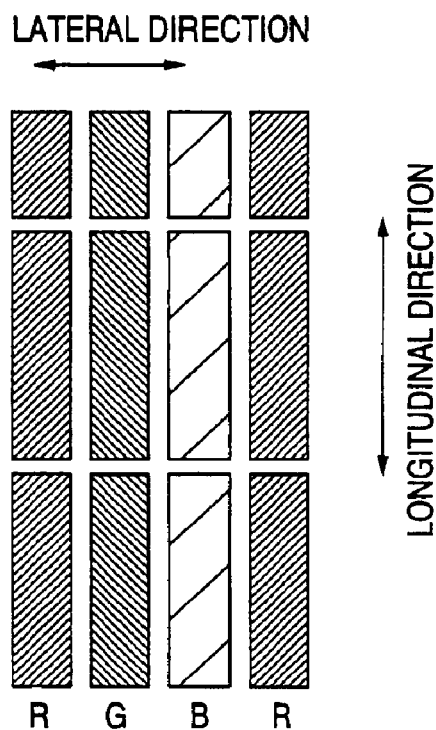
FIG. 58 is a plan view showing a pattern in which red (R), green (G) and blue (B) are arranged like a stripe in order.
Figure 59:
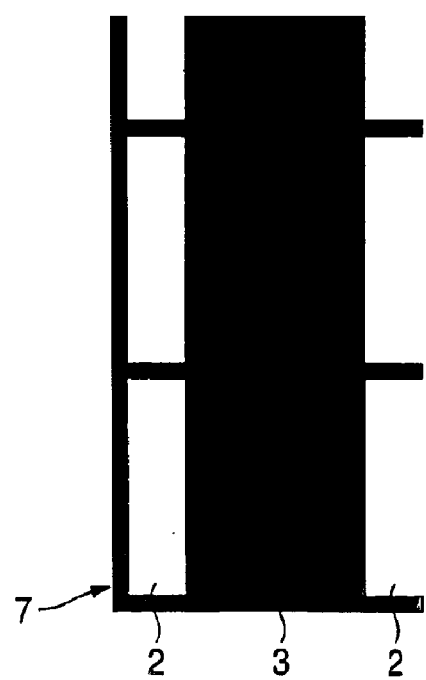
FIG. 59 is a partial plan view showing a transfer sheet subjected to one recording operation.

The order of the recording operations for the respective colors can optionally be changed. Usually, the recording operation is carried out in order of the black (K), the red (R), the green (G) and the blue (B). For example, as shown in FIG. 56, it is also possible to employ a method in which the recording operations for three colors of red, green and blue are carried out to form a color stripe and the recording operation for the black is finally carried out to form a black matrix. In this case, the black matrix can be formed in an overlap with the color stripe. Thus, it is possible to form a black matrix capable of reliably preventing a light from leaking out of a recording boundary section. Moreover, the number of the recording colors is not restricted to four but three colors of R, G and B or one of them may be used.

Fifth Embodiment

While the example of an XY stage type planar recording apparatus has been described in each of the embodiments, the invention can also be applied to a drum type recording apparatus for carrying out a recording operation over a support member having a flexibility.

Figure 50:
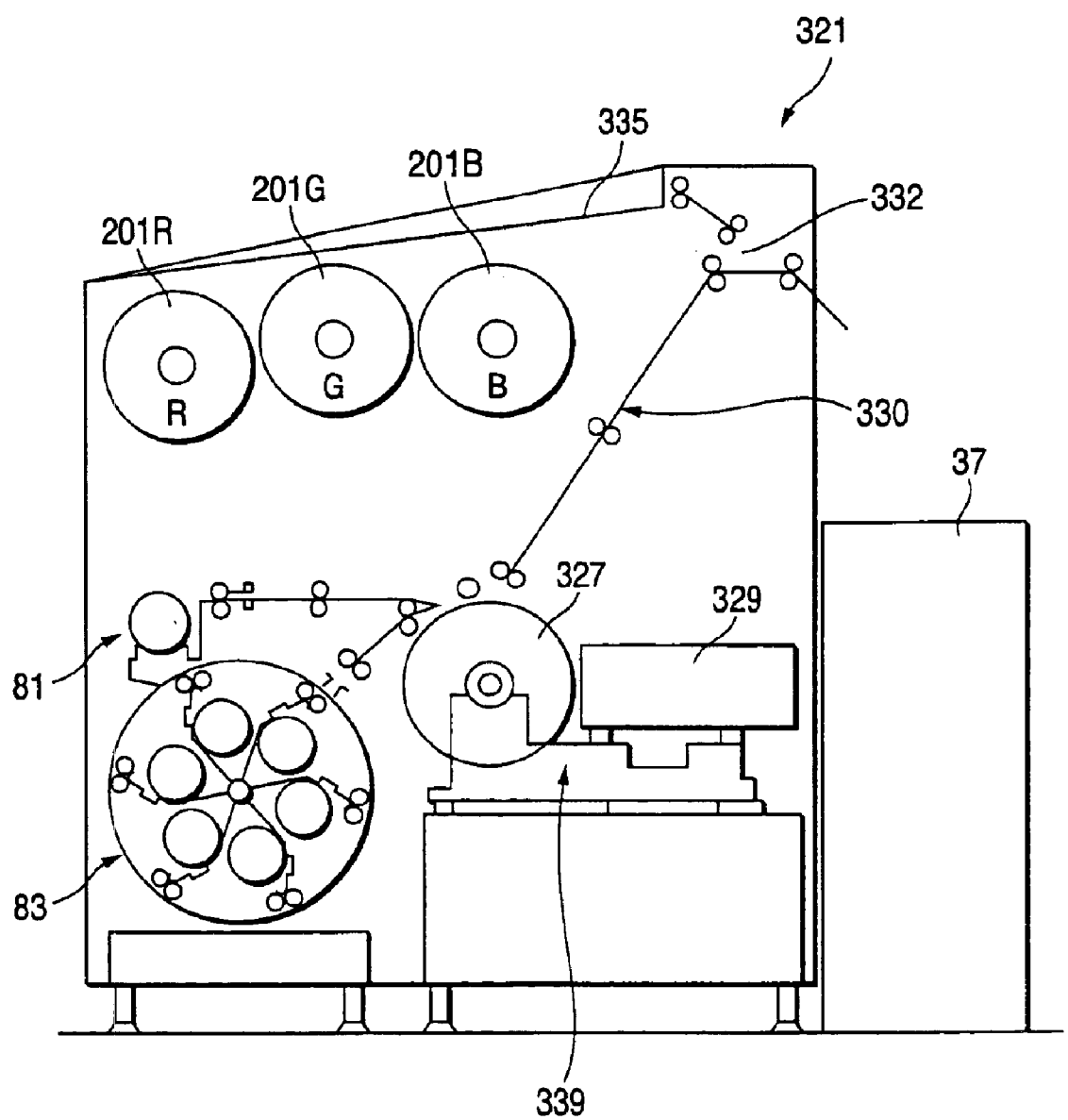
FIG. 50 is a side view showing an embodiment in which the invention is applied to a drum type recording apparatus
Figure 51:
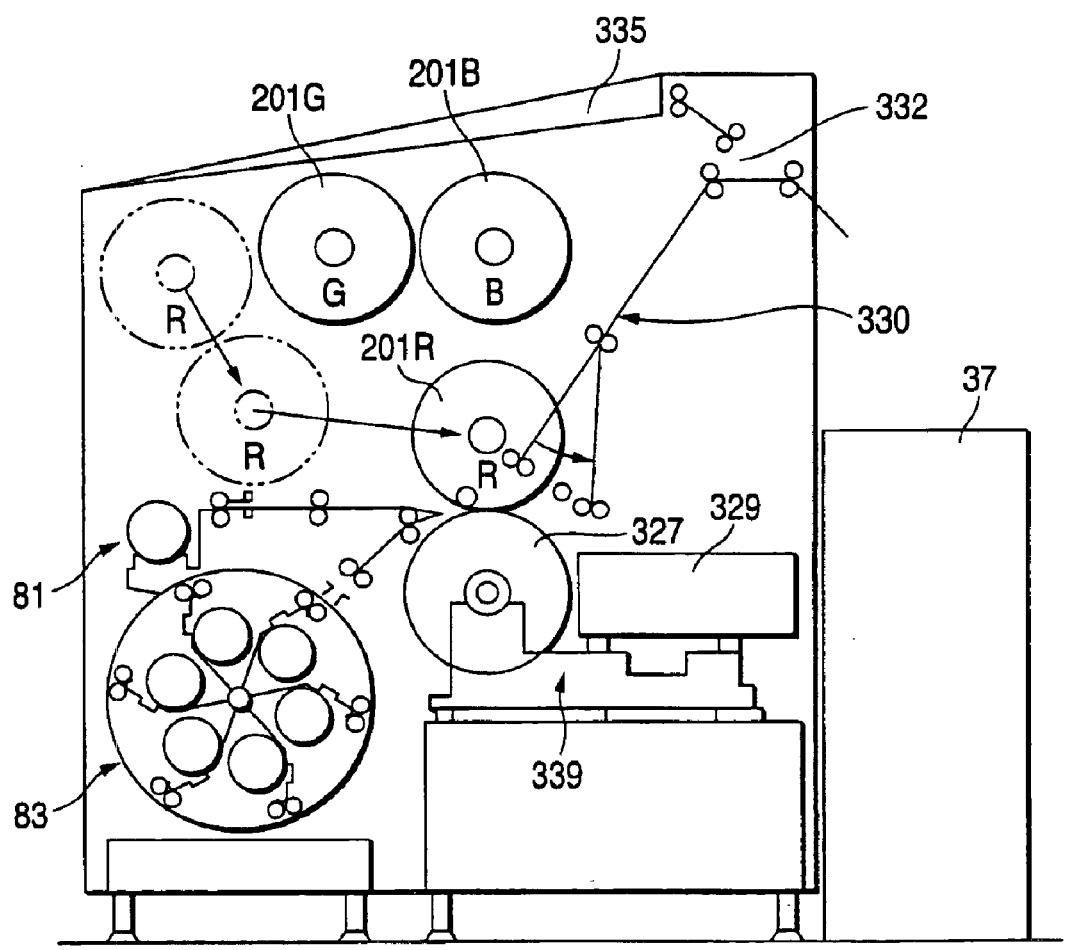
FIG. 51 is an explanatory view showing a path in the case in which a separating roller in the apparatus of FIG. 50 is moved to a separating position.

FIG. 50 shows an embodiment in which the invention is applied to a drum type recording apparatus 321 and FIG. 51 shows the motion of a separating roller in the case in which the separating roller is used in the same apparatus. In each of the drawings, 327 denotes a drum for holding a support member and 329 denotes a laser type recording head, and a recording section 339 is constituted by the drum 327 and the recording head 329 which correspond to the stage of the XY stage type recording apparatus. During recording, a laser beam scan is carried out by the rotation of the drum 327 (a fast scan) and the scan of the laser beam in the axial direction of the drum 327 by means of the recording head 329 (a slow scan). A support member to be a recording object is supplied onto the outer periphery of the drum 327 by means of a support member supply apparatus which is not shown. In this case, the support member is formed by a material which is deformed to be attached to the outer peripheral surface of the drum 327. An image receiving sheet and a transfer sheet which are recording media are supplied onto the support member disposed on the drum 327 by an image receiving sheet supply section 81 and a transfer sheet supply section 83.

A delivery path 330 for delivering a product and the recording media (the image receiving sheet and the transfer sheet) which are obtained after the recording operation is provided above the drum 327, and a distributing device 332 for distributing the product and wastes is provided on the terminal end of the delivery path 330. Moreover, separating rollers 201R, 201G and 201B to be utilized for using the transfer sheets for respective colors in plural recording operations are provided in the upper positions of the drum 327. The separating rollers 201R, 201G and 201B have the same functions as those in the embodiments described above.

In the recording apparatus having the structure described above, the recording operation is carried out in the following process.

First of all, a basic operation will be described. First of all, a support member is delivered onto the drum 327 and is adsorbed and held on the peripheral surface of the drum 327. Next, an image receiving sheet is delivered from the image receiving sheet supply section 81 and is hermetically bonded onto the support member. Then, when the image receiving sheet is separated to form an image receiving layer on the recording surface of the support member, the image receiving sheet thus separated is discharged to a discarding box 37 through the delivery path 330. Next, the transfer sheet is delivered from the transfer sheet supply section 83 and is superposed on the support member disposed on the drum 327. Then, exposure recording is carried out by the recording head 29 while the drum 327 is rotated at a high speed. In the basic operation, the transfer sheet obtained after the recording operation is separated from the support member and is then discarded to the discarding box through the delivery path 330. The transfer sheets for respective colors are superposed on the support member in order and the recording operation is thus carried out. After the recording operations for all the colors are completed, the support member is transmitted to a tray 335 through the delivery path 330. In order to separate the image receiving sheet and the transfer sheet, a well-known separating mechanism such as an adhesive roller for separation which is not shown is used.

Next, in the case in which the transfer sheet is to be used for the recording operation plural times in the recording apparatus 321, the separation is carried out by using the separating rollers 201R, 201G and 201B in the operation for separating the transfer sheet. In the case in which the transfer sheet disposed on the outer periphery of the drum 327 is to be separated by using these separating rollers 201R, 201G and 201B, the separating rollers 201R, 201G and 201B are moved to come in contact with the outer periphery of the drum 327. In that state, the separation can be carried out by rotating both of the separating rollers 201R, 201G and 201B and the drum 327. After the separation of the transfer sheet, the separating rollers 201R, 201G and 201B are caused to stand by in standby positions placed above the drum 327 until a next support member is delivered in. When the next support member is delivered in, the separating rollers 201R, 201G and 201B are caused to come in contact with the outer periphery of the drum 327 again and to return the transfer sheet toward the drum 327 side.

In the case in which the transfer sheet is to be separated or returned, the transfer sheet can be delivered by the control of a sucking force in the same manner as in the XY stage type recording apparatus. For a method of using the transfer sheet in plural recording operations, moreover, it is possible to employ the first to fourth recording methods described above. In the case in which the separating rollers 201R, 201G and 201B interfere with the delivery path 330 in a movement to the vicinity of the drum 327, they are properly moved to the standby positions as shown in FIG. 51.

Sixth Embodiment

The separating roller described in each of the embodiments can also be replaced with a flat separating plate in the drum type recording apparatus.

Figure 52:
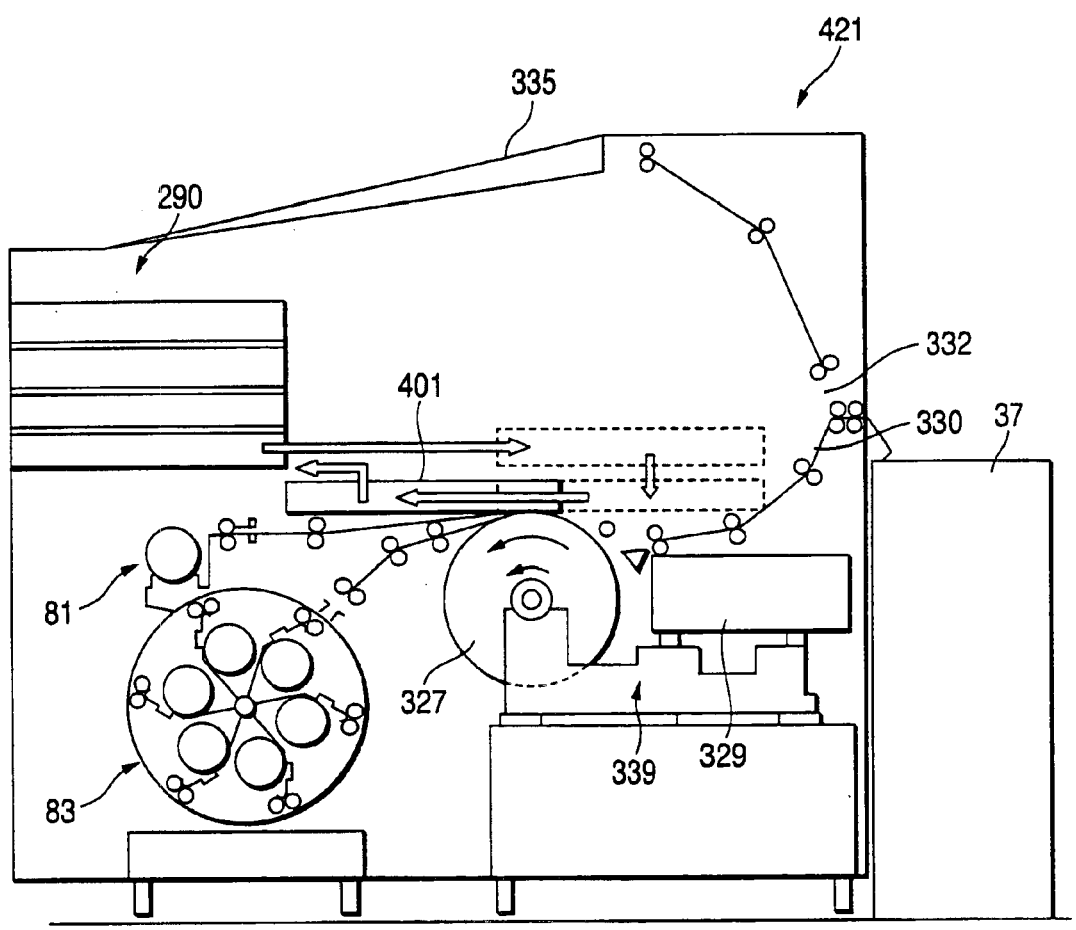
FIG. 52 is a side view showing an example in which the invention is applied to the drum type recording apparatus, and furthermore, a flat separating plate is used in place of the separating roller.
Figure 53:
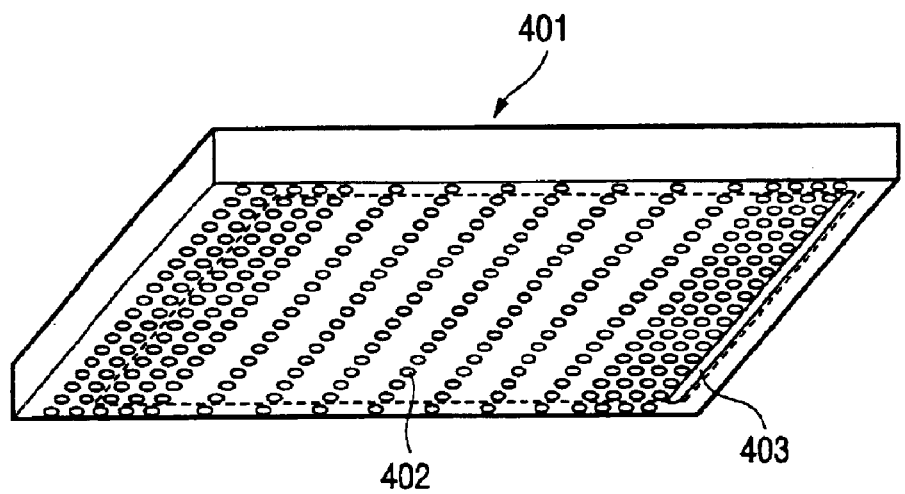
FIG. 53 is a perspective view showing an example of the separating plate.

FIG. 52 shows an example of a drum type recording apparatus 421 using the flat separating plate in place of the separating roller. The recording apparatus 421 comprises a flat separating plate 401 which can be slid in a contact state with the outer periphery of the drum 327. The separating plate 401 is constituted as a box body having an internal cavity as shown in FIG. 53, and has a large number of sucking holes 402 for adsorbing a transfer sheet onto a lower surface. In the distribution of the sucking holes 402, a portion for adsorbing an end in the longitudinal direction of the transfer sheet is dense and a portion for adsorbing a middle part in the longitudinal direction is sparse in the same manner as in the separating roller. Moreover, a sucking hole 403 in a portion for adsorbing a starting end is a slot.

The separating plate 401 is provided to be upward and downward movable and slidable in a horizontal direction, and is moved in such a position as to come in contact with the outer periphery of the drum 327 if necessary. In operations for separating and returning the transfer sheet, the drum 327 is rotated, and at the same time, the separating plate 401 is slid in the tangential direction of the drum 327 at a speed corresponding to the same rotation. Consequently, the transfer sheet is delivered between the drum 327 and the separating plate 401.

In case of the recording apparatus 421, only one separating plate 401 for separating the transfer sheet is provided. For this reason, a storage case 290 for storing the separated transfer sheet is provided. The storage case 290 is the same as that described above with reference to FIG. 41.

Figure 54:
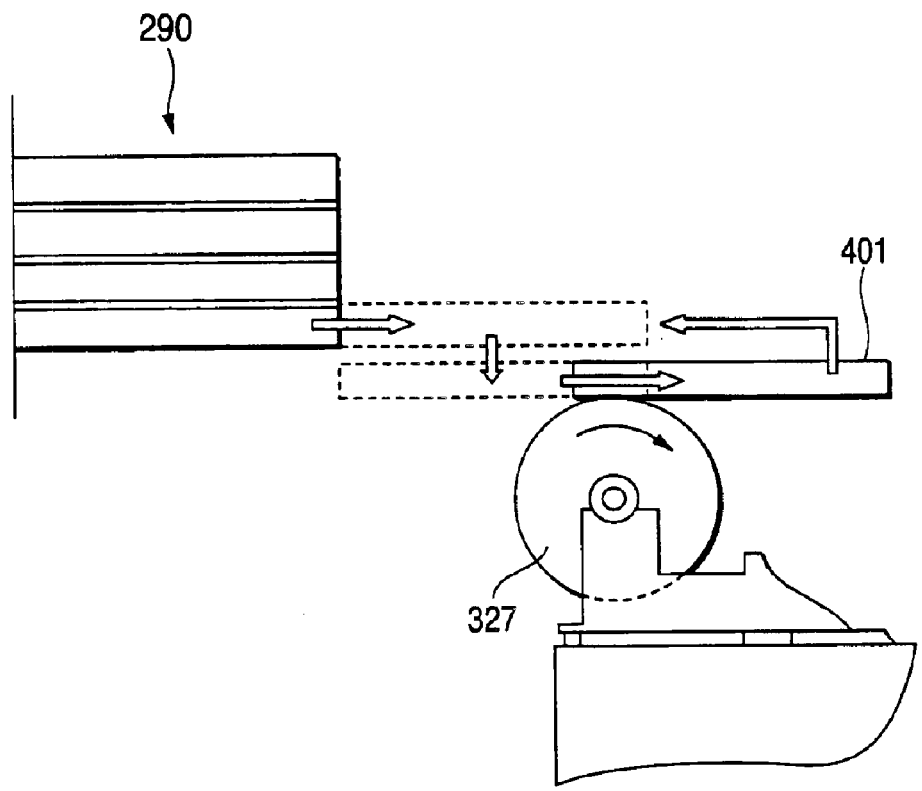
FIG. 54 is an explanatory view showing an operation to be carried out when a transfer sheet separated once in the apparatus of FIG. 52 is returned to the drum side.

FIG. 52 shows, in an arrow, the motion of the separating plate 401 in the separation of the transfer sheet and FIG. 54 shows, in an arrow, the motion of the separating plate 401 in the return of the transfer sheet. The rotating direction of the drum 327 and the sliding direction of the separating plate 401 are reversed during the separation and the return.

While the description has been given to the case in which a multicolor recording operation is carried out by one recording apparatus in each of the embodiments, a special recording apparatus for each color may be provided to perform a recording operation for each color in order by means of each recording apparatus. FIG. 49 shows their distinction in a block.

FIG. 49(a) shows the case in which recording operations for black (K), red (R), green (G) and blue (B) are continuously carried out for one support member in order by one recording apparatus. FIG. 49(b) shows the case in which a recording operation for each color is carried out in order by a monochromatic recording apparatus which is special for each of the black (K), the red (R), the green (G) and the blue (B). An equipment cost can be reduced in the former method and a manufacturing task can be hastened in the latter method.

The order of the recording operations for the respective colors can optionally be changed. Usually, the recording operation is carried out in order of the black (K), the red (R), the green (G) and the blue (B). For example, as shown in FIG. 50, it is also possible to employ a method in which the recording operations for three colors of red, green and blue are carried out to form a color stripe and the recording operation for the black is finally carried out to form a black matrix. In this case, the black matrix can be formed in an overlap with the color stripe. Thus, it is possible to form a black matrix capable of reliably preventing a light from leaking out of a recording boundary section. Moreover, the number of the recording colors is not restricted to four but three colors of R, G and B or one of them may be used.

As described above, according to the recording method in accordance with the invention, when a first recording operation is carried out by using one transfer sheet and second and succeeding recording operations are then carried out, the recording operation is performed over the support member by using an unrecorded section present between the recorded stripes of the transfer sheet. Thus, the transfer sheet can be used for the recording operation twice or more. As a result, the transfer sheet can be utilized effectively and the number of the transfer sheets to be used can be decreased. Consequently, a manufacturing cost can be reduced.

In the recording apparatus, the support member holding means, the transfer sheet supply means, the recording head and the separating and holding means are sequentially operated. Consequently, the recording operation is repetitively carried out over the support member by using the unrecorded section present between the recorded stripes of the transfer sheet. Thus, the transfer sheet can be used for the recording operation plural times. As a result, the transfer sheet can be utilized effectively and the number of the transfer sheets to be used can be decreased. Consequently, a manufacturing cost can be reduced.

As described above, according to the recording method in accordance with the invention, when a first recording operation is carried out by using one transfer sheet and second and succeeding recording operations are then carried out, the recording operation is performed over the support member by using an unrecorded section present between the recorded stripes of the transfer sheet. Thus, the transfer sheet can be used for the recording operation twice or more. As a result, the transfer sheet can be utilized effectively and the number of the transfer sheets to be used can be decreased. Consequently, a manufacturing cost can be reduced. In the case in which the transfer sheet is to be used for the recording operation twice or more, moreover, a last recording position on the transfer sheet separated from the support member is detected. Based on the result of the detection, a correction processing of changing the returning position of the transfer sheet to the next support member or changing image data to be recorded is carried out. Consequently, a next recording operation can be carried out in a proper position even if the position of the transfer sheet is slightly shifted at time of separation from the last support member.

According to the recording apparatus in accordance with the invention, moreover, the support member holding means, the transfer sheet supply means, the recording head and the separating and holding means are sequentially operated. Consequently, the recording operation is repetitively carried out over the support member by using the unrecorded section present between the recorded stripes of the transfer sheet. Thus, the transfer sheet can be used for the recording operation plural times. As a result, the transfer sheet can be utilized effectively and the number of the transfer sheets to be used can be decreased. Consequently, a manufacturing cost can be reduced. Moreover, the recording position of the transfer sheet held by the separating and holding means is detected by the holding state detecting section. Based on the result of the detection, therefore, the returning position of the transfer sheet to the next support member is changed or image data to be recorded are changed so that the recording position of the transfer sheet can be corrected. Accordingly, a next recording operation can be carried out in a proper position even if the position of the transfer sheet is slightly shifted in a stage in which the transfer sheet is held by the separating and holding means.

What is claimed is:

1. A recording method for superposing a transfer sheet having a separable image forming layer on a recording surface of a support member to record a pattern including a stripe shape and separating the transfer sheet from the recording surface of the support member after the recording operation, thereby transferring and forming the image forming layer on the recording surface of the support member like the pattern, wherein the transfer sheet separated from the support member is held and the support member obtained after the recording operation is delivered out, while when the separated transfer sheet is returned and superposed on the recording surface of the support member which is then delivered in, and the recording operation is carried out over the support member by using an unrecorded section present between recorded stripes of the transfer sheet.

2. The recording method according to claim 1, wherein the held transfer sheet is returned to almost the same position as that set before the separation over the recording surface of the support member, and the recording operation is carried out by shifting a recording position at an arrangement pitch of a stripe shape corresponding to 1 to 1.5 pitches in at least one of a longitudinal direction of the stripe shape and a direction orthogonal to the longitudinal direction.

3. The recording method according to claim 1, wherein the held transfer sheet is returned onto the recording surface of the support member with a shift at an arrangement pitch of a stripe shape corresponding to 1 to 1.5 pitches in at least one of a longitudinal direction of the stripe shape and a direction orthogonal to the longitudinal direction, and the recording operation is carried out in almost the same position as that set before the separation.

4. The recording method according to claim 1, wherein the transfer sheet is separated from the support member by using the separating roller and is thus held, and is shifted at an arrangement pitch of the stripe shape corresponding to 1 to 1.5 pitches in at least one of a circumferential direction of the separating roller and an axial direction of the separating roller and is thus returned onto the recording surface of the support member which is then delivered in.

5. The recording method according to any of claim 1, wherein when the unrecorded section of the transfer sheet obtained after the recording operation is narrower than a region of the stripe shape to be recorded, the transfer sheet is discharged.

6. A recording apparatus for superposing a transfer sheet having a separable image forming layer on a recording surface of a support member to record a pattern including a stripe shape and separating the transfer sheet from the recording surface of the support member after the recording operation, thereby transferring and forming the image forming layer on the recording surface of the support member like the pattern, the apparatus comprising:

support member holding means for movably supporting the recording surface of the support member;

transfer sheet supply means for supplying the transfer sheet onto the support member provided on the support member holding means;

a recording head for recording a desirable pattern onto the transfer sheet in cooperation with the support member holding means; and separating and holding means for separating the transfer sheet supplied to the support member holding means and recorded by the recording head from the support member and holding the transfer sheet, while supplying the held transfer sheet onto the recording surface of the support member which is then delivered in, wherein an unrecorded section present between recorded stripes of the transfer sheet is used to repetitively carry out the recording operation over the support member.

7. The recording apparatus according to claim 6, wherein the separating and holding means holds the transfer sheet by vacuum suction.

8. The recording apparatus according to claim 6, wherein the separating and holding means is provided corresponding to at least the number of colors of the transfer sheet to be used and holds the transfer sheet for each of the colors.

9. The recording apparatus according to claim 6, wherein the separating and holding means is a separating roller for holding the transfer sheet on a peripheral surface of a cylinder.

10. The recording apparatus according to claim 9, further comprising a rotating direction position detecting section for detecting a position in a rotating direction of the separating roller.

11. The recording apparatus according to claim 9, wherein a driving source for controlling a rotating angle of the separating roller is connected to the separating roller.

12. The recording apparatus according to claim 9, further comprising an axial direction moving position detecting section for detecting a position in an axial direction of the separating roller.

13. The recording apparatus according to claim 9, further comprising an axial direction movement driving section for controlling a movement of the separating roller in the axial direction of the separating roller.

14. The recording apparatus according to claim 13, wherein the axial direction movement driving section has stop positions in a plurality of places which are provided apart from each other at a predetermined interval in at least the axial direction.

15. A recording method for superposing a transfer sheet having a separable image forming layer on a recording surface of a support member to record a pattern including a stripe shape and separating the transfer sheet from the recording surface of the support member after the recording operation, thereby transferring and forming the image forming layer on the recording surface of the support member like the pattern, wherein the transfer sheet separated from the support member is held and the support member obtained after the recording operation is delivered out, while when a recording position of the held transfer sheet is to be detected and the transfer sheet obtained after the separation is to be returned onto the recording surface of the support member which is then delivered in, a returning position of the transfer sheet is changed and superposed based on a result of the detection of the recording position or is superposed on almost the same position as that set before the separation to change image data to be recorded based on the result of the detection of the recording position, and the recording operation is thereafter carried out over the support member by using an unrecorded section present between recorded stripes of the transfer sheet.

16. The recording method according to claim 15, wherein a recording start position and an inclination angle of the transfer sheet are corrected to return the transfer sheet obtained after the separation onto the support member based on the result of the detection of the recording position, and the recording position is shifted at an arrangement pitch of the stripe shape corresponding to 1 to 1.5 pitches in at least one of a longitudinal direction of the stripe shape and a direction orthogonal to the longitudinal direction.

17. The recording method according to claim 15, wherein the held transfer sheet is shifted at an arrangement pitch of the stripe shape corresponding to 1 to 1.5 pitches in at least one of a longitudinal direction of the stripe shape and a direction orthogonal to the longitudinal direction, and a recording start position and an inclination angle of the transfer sheet are corrected to return the transfer sheet onto the recording surface of the support member based on the result of the detection of the recording position and the recording operation is carried out in almost the same position as that set before the separation of the transfer sheet.

18. The recording method according to claim 15, wherein the held transfer sheet is returned to almost the same position as that set before the separation over the recording surface of the support member, and the recording position is shifted at an arrangement pitch of the stripe shape corresponding to 1 to 1.5 pitches in at least one of a longitudinal direction of the stripe shape and a direction orthogonal to the longitudinal direction, and a recording start position and an inclination angle of the image data to be recorded on the transfer sheet are corrected to carry out the recording operation based on the result of the detection of the recording position.

19. The recording method according to claim 15, wherein the held transfer sheet is shifted at an arrangement pitch of the stripe shape corresponding to 1 to 1.5 pitches in at least one of a longitudinal direction of the stripe shape and a direction orthogonal to the longitudinal direction and is thus returned onto the recording surface of the support member, and a recording start position and an inclination angle of the image data to be recorded on the transfer sheet are corrected to carry out the recording operation based on the result of the detection of the recording position.

20. The recording method according to claim 15, wherein when the unrecorded section of the transfer sheet obtained after the recording operation is narrower than a region of the stripe shape to be recorded, the transfer sheet is discharged.

21. A recording apparatus for superposing a transfer sheet having a separable image forming layer on a recording surface of a support member to record a pattern including a stripe shape and separating the transfer sheet from the recording surface of the support member after the recording operation, thereby transferring and forming the image forming layer on the recording surface of the support member like the pattern, the apparatus comprising:

support member holding means for movably supporting the recording surface of the support member;

transfer sheet supply means for supplying the transfer sheet onto the support member provided on the support member support means;

a recording head for recording a desirable pattern onto the transfer sheet in cooperation with the support member holding means;

separating and holding means for separating the transfer sheet supplied to the support member holding means and recorded by the recording head from the support member and holding the transfer sheet, while supplying the held transfer sheet onto the recording surface of the support member which is then delivered in; and a holding state detecting section for detecting a recording start position and a recording inclination angle of the transfer sheet held by the separating and holding means, wherein a position is corrected depending on a result of the detection obtained by the holding state detecting section and an unrecorded section present between recorded stripes of the transfer sheet is used to repetitively carry out the recording operation over the support member.

22. The recording apparatus according to claim 21, wherein the holding state detecting section includes an image pick-up camera for picking up an image of the transfer sheet held by the separating and holding means.

23. The recording apparatus according to claim 21, wherein the separating and holding means is a separating roller for holding the transfer sheet on a peripheral surface of a cylinder.

24. The recording apparatus according to claim 23, wherein the separating roller includes a rotating direction position detecting section for detecting a position in a rotating direction of the separating roller.

25. The recording apparatus according to claim 21, wherein the separating roller connects a driving source for controlling a rotating angle.

26. The recording apparatus according to claim 21, wherein the separating roller includes an axial direction position detecting section for detecting a position in an axial direction of the separating roller.

27. The recording apparatus according to claim 21, further comprising an axial direction slide mechanism for moving the separating roller in the axial direction of the separating roller.

28. The recording apparatus according to claim 27, wherein the axial direction slide mechanism has stop positions in two places which are provided a part from each other at a predetermined interval in at least the axial direction.

* * * * *